(12) United States Patent
Lee et al.

(10) Patent No.: US 9,688,240 B2
(45) Date of Patent: Jun. 27, 2017

(54) SEAT BELT RETRACTOR

(71) Applicant: ASHIMORI INDUSTRY CO., LTD., Osaka-shi, Osaka (JP)

(72) Inventors: Jongrin Lee, Settsu (JP); Young Jae Kang, Settsu (JP); Tomonari Matsunaga, Settsu (JP); Satoshi Suminaka, Settsu (JP); Takayoshi Ijiri, Settsu (JP)

(73) Assignee: ASHIMORI INDUSTRY CO., LTD., Osaka-shi, Osaka (JP)

( * ) Notice: Subject to any disclaimer, the term of this patent is extended or adjusted under 35 U.S.C. 154(b) by 109 days.

(21) Appl. No.: 14/456,555

(22) Filed: Aug. 11, 2014

(65) Prior Publication Data
US 2015/0224958 A1    Aug. 13, 2015

(30) Foreign Application Priority Data

Feb. 10, 2014  (JP) ................................ 2014-023574

(51) Int. Cl.
*B60R 22/405*   (2006.01)

(52) U.S. Cl.
CPC ................................. *B60R 22/405* (2013.01)

(58) Field of Classification Search
CPC ....... B60R 22/34; B60R 22/405; B60R 22/41; B60R 22/3416; B60R 22/35
See application file for complete search history.

(56) References Cited

U.S. PATENT DOCUMENTS

| | | | | |
|---|---|---|---|---|
| 3,632,058 A | * | 1/1972 | Stoffel | B60R 22/41 242/383.1 |
| RE29,594 E | * | 3/1978 | Takada | B60R 22/405 242/383.4 |
| 4,856,728 A | * | 8/1989 | Schmidt | B60R 22/44 242/384.1 |
| 5,441,209 A | * | 8/1995 | Fujimura | B60R 22/405 242/384 |
| 5,480,105 A | * | 1/1996 | Fujimura | B60R 22/405 242/383.2 |
| 5,484,118 A | * | 1/1996 | Fujimura | B60R 22/405 242/381.1 |

(Continued)

FOREIGN PATENT DOCUMENTS

JP    10-181530 B2    7/1998

*Primary Examiner* — Sang Kim
(74) *Attorney, Agent, or Firm* — Sughrue Mion, PLLC

(57) ABSTRACT

A seat belt retractor instantly switchable between only winding of a webbing to winding and drawing-out of the webbing. Operation member 61 moves from a non-operation position E1 to an operation position E2, and locking mechanism 9 stops rotation of a winding drum in a drawing-out direction "P". Movement member 70 moves an arrangement member 62 to a first position F1 or a second position F2, and arrangement member 62 arranges the operation member at the non-operation position E1 or the operation position E2. Urging means 63 urges the arrangement member 62 toward the first position F1. While winding a webbing 2, a second maintaining portion 77 of the movement member 70 maintains the arrangement member 62 at the second position F2. Release portion 78 of member 70 releases the arrangement member 62 toward a first portion 74, where the member 62 is kept at the first position F1.

15 Claims, 37 Drawing Sheets

(56) References Cited

U.S. PATENT DOCUMENTS

| | | | | |
|---|---|---|---|---|
| 6,290,160 B1* | 9/2001 | Strobel | B60R 22/34 | 180/268 |
| 6,648,260 B2* | 11/2003 | Webber | B60R 22/3413 | 242/379.1 |
| 2005/0284978 A1* | 12/2005 | Zolkower | B60R 22/3413 | 242/382.4 |
| 2006/0237573 A1* | 10/2006 | Boelstler | B60R 22/405 | 242/383.2 |
| 2006/0243844 A1* | 11/2006 | Kosugi | B60R 22/36 | 242/374 |
| 2007/0246592 A1* | 10/2007 | Yamada | B60R 22/38 | 242/383.2 |
| 2008/0203807 A1* | 8/2008 | Yoshioka | B60R 22/3413 | 297/478 |
| 2009/0057469 A1* | 3/2009 | Choi | B60R 22/405 | 242/382 |
| 2011/0089282 A1* | 4/2011 | Guillem | B60R 22/405 | 242/383.1 |
| 2012/0111985 A1* | 5/2012 | Specht | B60R 22/41 | 242/383.1 |
| 2012/0303219 A1* | 11/2012 | Osada | B60R 22/405 | 701/45 |
| 2013/0140869 A1* | 6/2013 | Uchibori | B60R 22/38 | 297/476 |
| 2014/0117138 A1* | 5/2014 | Egawa | B60R 22/40 | 242/384.2 |
| 2014/0203132 A1* | 7/2014 | Yamada | B60R 22/36 | 242/382.1 |
| 2015/0158457 A1* | 6/2015 | Ijiri | B60R 22/341 | 242/382 |
| 2015/0217722 A1* | 8/2015 | Osada | B60R 22/41 | 242/384.1 |
| 2015/0224958 A1* | 8/2015 | Lee | B60R 22/405 | 242/382 |
| 2015/0224959 A1* | 8/2015 | Suminaka | B60R 22/4633 | 242/383.4 |
| 2015/0360642 A1* | 12/2015 | Lee | B60R 22/405 | 242/383.2 |

* cited by examiner

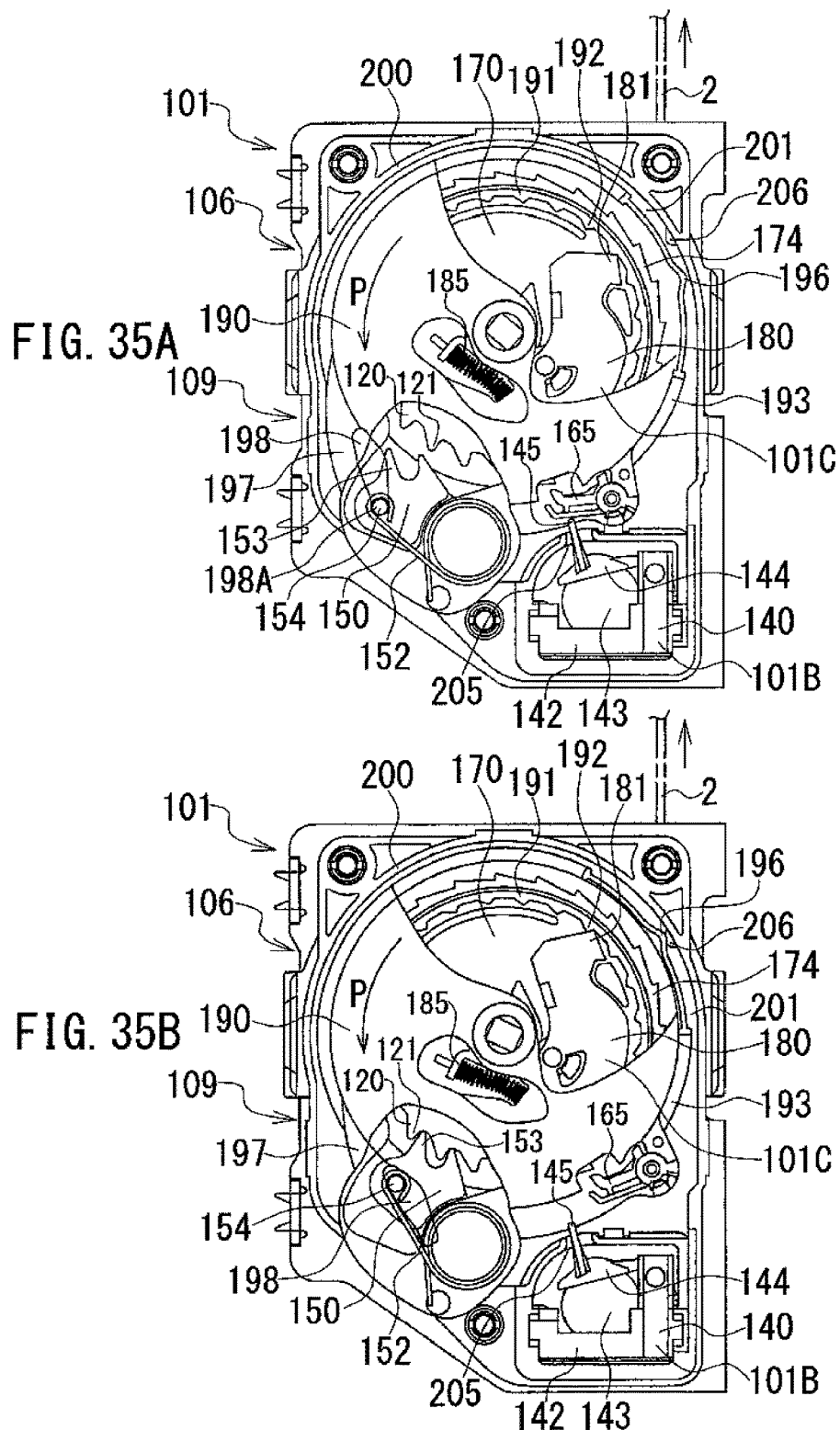

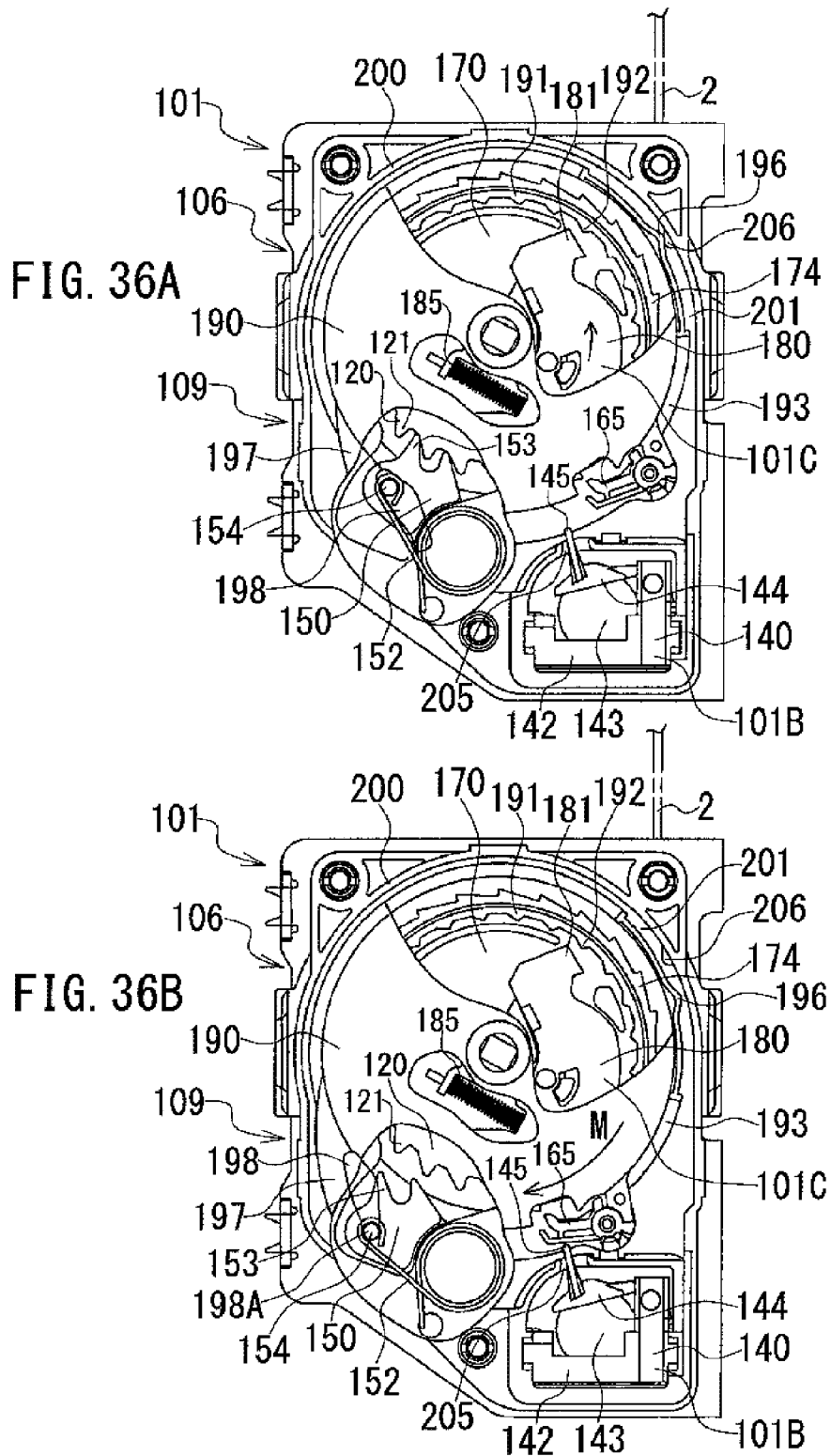

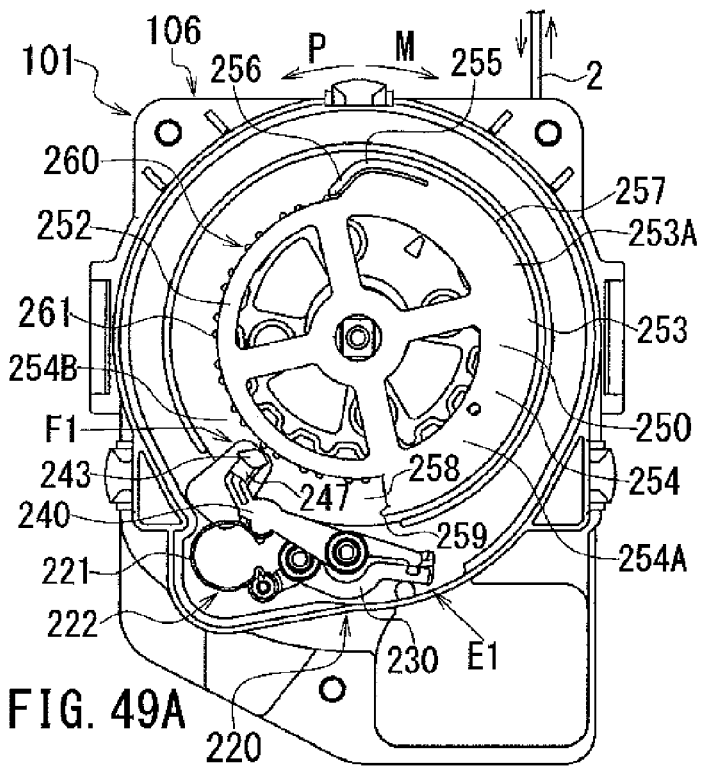
FIG. 49A
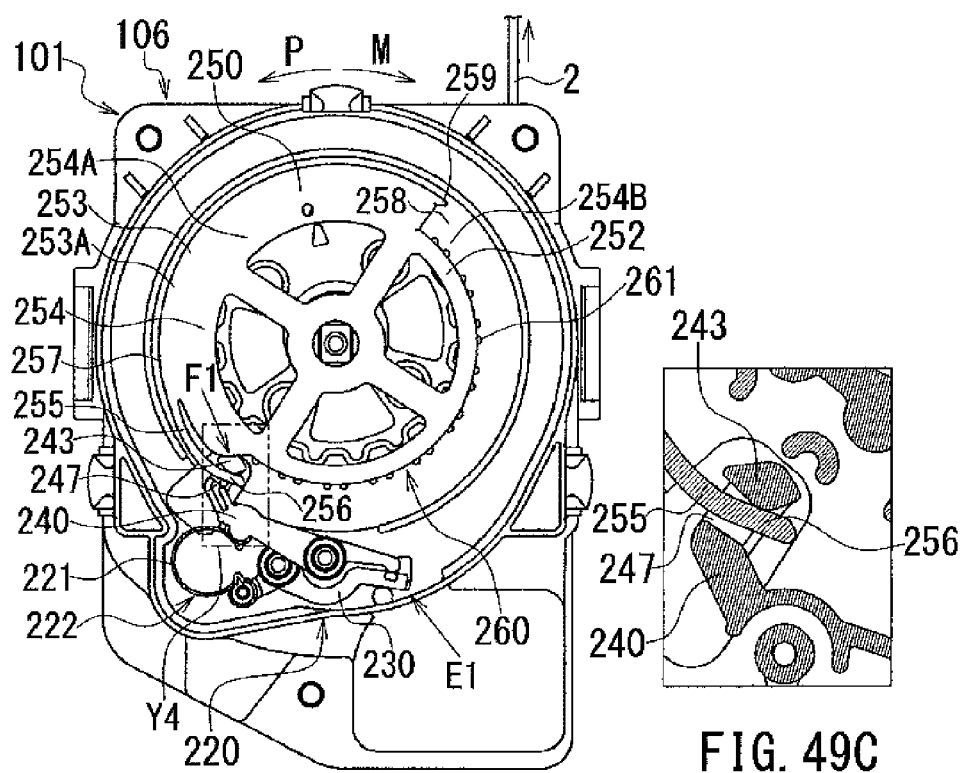
FIG. 49B
FIG. 49C

SEAT BELT RETRACTOR

BACKGROUND OF THE INVENTION

Field of the Invention

The present invention relates to a seat belt retractor capable of winding a webbing of a seat belt on a rotatable winding drum.

Related Background of the Invention

A seat belt device including a retractor is generally mounted in a vehicle such a car in order to protect an occupant seated on a seat. The occupant wears a webbing (seat belt) drawn out from a winding drum of the retractor and is restrained on the seat with the use of the webbing. As to the seat belt retractor, conventionally, a retractor capable of switching between an automatic locking retractor (ALR) state and an emergency locking retractor (ELR) state is known (refer to Patent Literature 1).

When the retractor is switched to the ALR state, the webbing cannot be drawn out and can only be wound. The ALR state is used when, for example, a child seat or luggage is fixed onto the seat. In contrast to this, when the retractor is switched to the ELR state, normally, the winding and drawing-out of the webbing are possible so as not to disturb a movement of the webbing. However, when the vehicle encounters an emergency, rotation of the winding drum in the drawing-out direction is stopped and the drawing-out of the webbing is stopped, by a locking mechanism of the retractor.

As described above, according to the conventional retractor described in the Patent Literature 1, the state of the retractor can be switched in accordance with the intended use. However, in performing a switch action when switching the retractor from the ALR state to the ELR state, the webbing is required to be wound by a predetermined length, on the winding drum. Thus, the retractor cannot be promptly switched from the ALR state to the ELR state, and from the start to the completion of the switching, the retractor is put into an unstable state. Accordingly, the occupant may be embarrassed and confused by an operation of the seat belt. Therefore, to eliminate the unstable state of the retractor, prompt switching from the ALR state to the ELR state is demanded.

PRIOR ART

Patent Literature

Patent Literature 1: The publication of Japanese Patent No. 3640284

SUMMARY OF THE INVENTION

Problems to be Solved by Invention

The present invention has been made in view of the above described, conventional problems, and an object thereof is to instantly switch a seat belt retractor from a state where only the winding of a webbing is possible to a state where the winding and drawing-out of the webbing are possible, thereby performing prompt switching of the state.

Means for Solving Problems

The present invention is a seat belt retractor including a winding drum capable of rotating in a winding direction and a drawing-out direction of a webbing; a locking mechanism that stops only rotation in the drawing-out direction of the winding drum; and an operation member that moves to a non-operation position where the locking mechanism is not operated or an operation position where the locking mechanism is operated. The seat belt retractor further includes an arrangement member that moves the operation member to thereby arrange the operation member at the non-operation position or the operation position; a movement member that is rotated by interlocking with rotation of the winding drum to thereby move the arrangement member to a first position where the operation member is arranged at the non-operation position or a second position where the operation member is arranged at the operation position; and arrangement member urging means configured to urge the arrangement member toward the first position. The movement member includes a first maintaining portion to maintain the arrangement member at the first position until a predetermined length of the webbing being drawn out from the winding drum, a movement portion to move the arrangement member from the first position to the second position when winding the webbing onto the winding drum after the predetermined length of the webbing being drawn out from the winding drum, a second maintaining portion to maintain the arrangement member at the second position while winding the webbing onto the winding drum, and a release portion to release the arrangement member from the second maintaining portion to the first maintaining portion, to thereby move the arrangement member from the second position to the first position.

Advantages of Invention

According to the present invention, the seat belt retractor can be instantly switched from the state where only the winding of the webbing is possible to the state where the winding and drawing-out of the webbing are possible, to thereby being able to perform prompt switching of the state.

BRIEF DESCRIPTION OF THE DRAWINGS

FIGS. 35A and 35B illustrate actions of a locking mechanism.

FIGS. 36A and 36B illustrate actions of the locking mechanism.

FIGS. 49A to 49C illustrate actions of switching means by rotation of the movement member.

DESCRIPTION OF THE PREFERRED EMBODIMENTS

With reference to drawings, an embodiment of a seat belt retractor (hereinafter, referred to as a retractor) according to the present invention will be described.

The retractor of the present embodiment is a webbing winding device for winding a webbing of a seat belt and is provided in a seat belt device for a vehicle. The seat belt device including the retractor is mounted in the vehicle and protects an occupant seated on a seat with the webbing (seat belt).

First Embodiment

Figure 1:
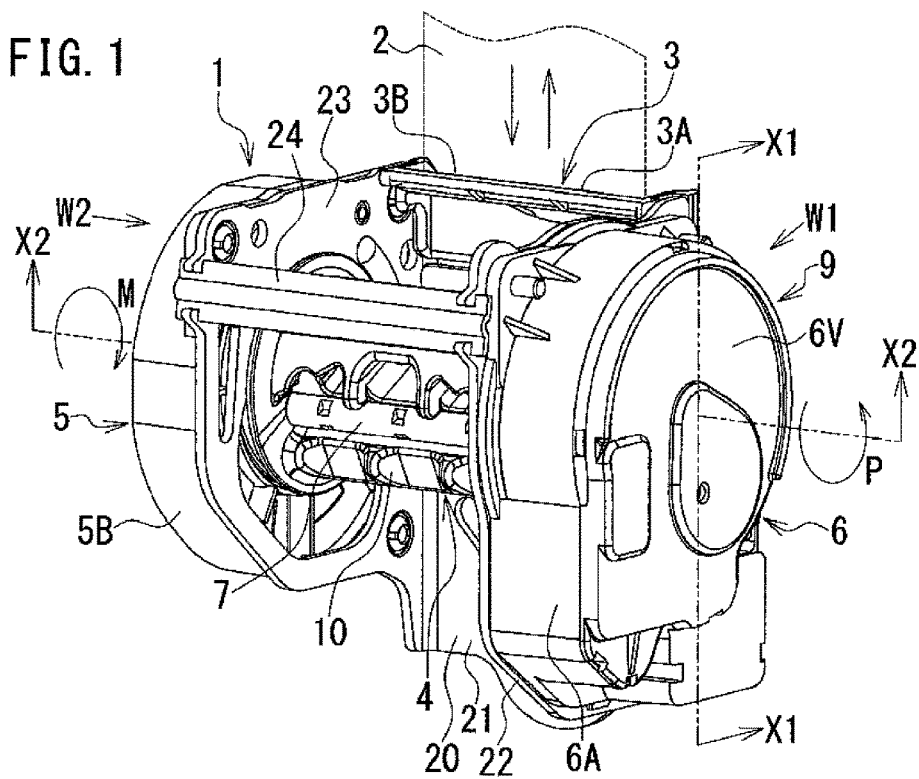
FIG. 1 is a perspective view of a seat belt retractor of a first embodiment.
Figure 2:
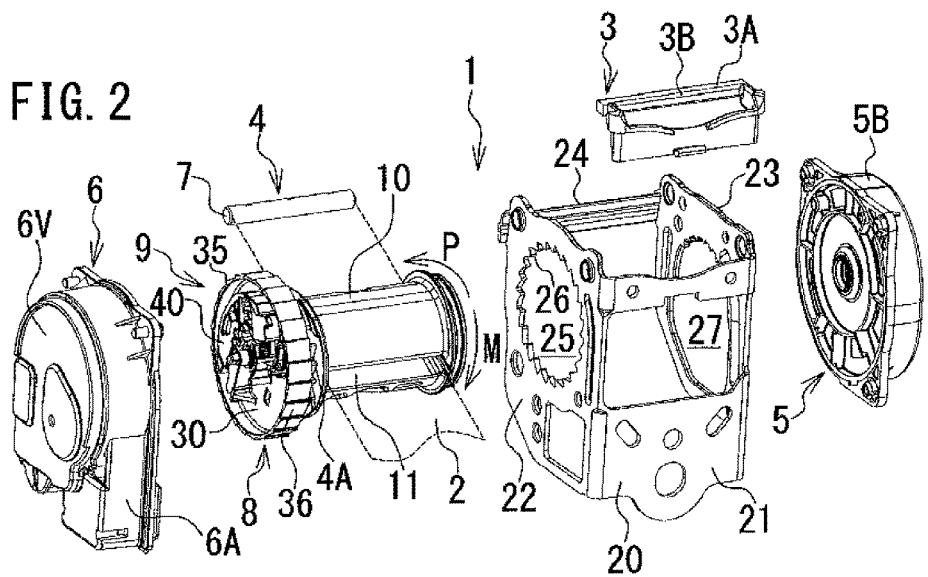
FIG. 2 is a perspective view of the seat belt retractor that is exploded.

FIG. 1 is a perspective view of a retractor 1 of the first embodiment. FIG. 2 is a perspective view of the retractor 1 that is exploded, viewed in a W1 direction illustrated in FIG. 1, and illustrates the retractor 1 that is exploded into a plurality of units. FIGS. 1 and 2 show, by dotted lines, a webbing 2 in a belt-like shape.

As illustrated in FIGS. 1 and 2, the retractor 1 includes a housing unit 3, a winding drum unit 4 having a winding drum 10, a winding spring unit 5, a mechanism cover unit 6, and a stopper pin 7 fixed to an end portion of the webbing 2.

In a state where the winding drum 10 is arranged in the housing unit 3, the winding spring unit 5 and the mechanism cover unit 6 are fixed to each of side faces of the housing unit 3. The winding spring unit 5 and the mechanism cover unit 6 cover both end portions of the winding drum unit 4 in a shaft direction, outside the housing unit 3 and rotatably support the winding drum unit 4. Furthermore, the webbing 2 is inserted into an insertion portion 11 of the winding drum 10, and a stopper pin 7 prevents the webbing 2 from coming off from the insertion portion 11. Therefore, the end portion of the webbing 2 is mounted to the winding drum 10.

The winding spring unit 5 is winding means for winding the webbing 2 onto the winding drum 10, and rotates the winding drum 10 in a rotational direction (referred to as a "winding direction") "M" when the webbing 2 is wound. The webbing 2 is wound on the rotating winding drum 10 and stored in the retractor 1. From the state described above, the webbing 2 is drawn out from the retractor 1 while the winding drum 10 rotates in a rotational direction (referred to as an "drawing-out direction") "P" at the time of drawing-out of the webbing 2.

The winding drum unit 4 includes a clutch unit 8 and rotates in the winding direction "M" and the drawing-out direction "P" in the retractor 1. The winding drum 10 normally rotates together with the clutch unit 8, but in an emergency, it rotates independently from the clutch unit 8. The mechanism cover unit 6 covers the clutch unit 8 of the winding drum unit 4 and is included in a locking mechanism 9 for stopping rotation of the winding drum 10 together with the clutch unit 8. The locking mechanism 9 is lock means for locking the winding drum 10 rotating in the drawing-out direction "P". In response to a sudden drawing-out of the webbing 2 and a sudden change of a speed of a vehicle, the rotation in the drawing-out direction "P" of the winding drum 10 is stopped by the locking mechanism 9. By an operation of the locking mechanism 9, drawing-out of the webbing 2 is stopped.

Figure 3:
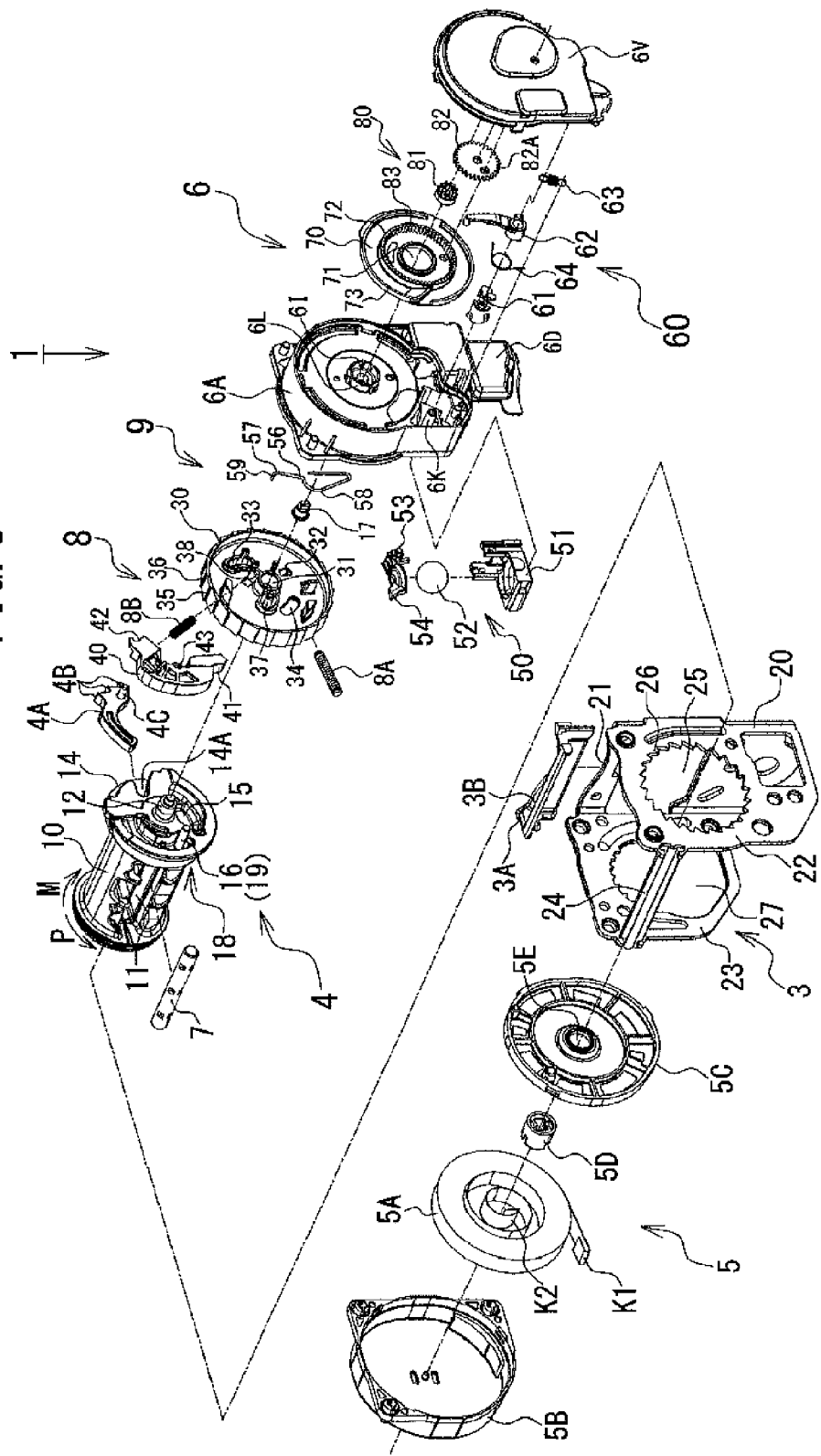
FIG. 3 is a perspective view of the seat belt retractor that is completely exploded.
Figure 4:
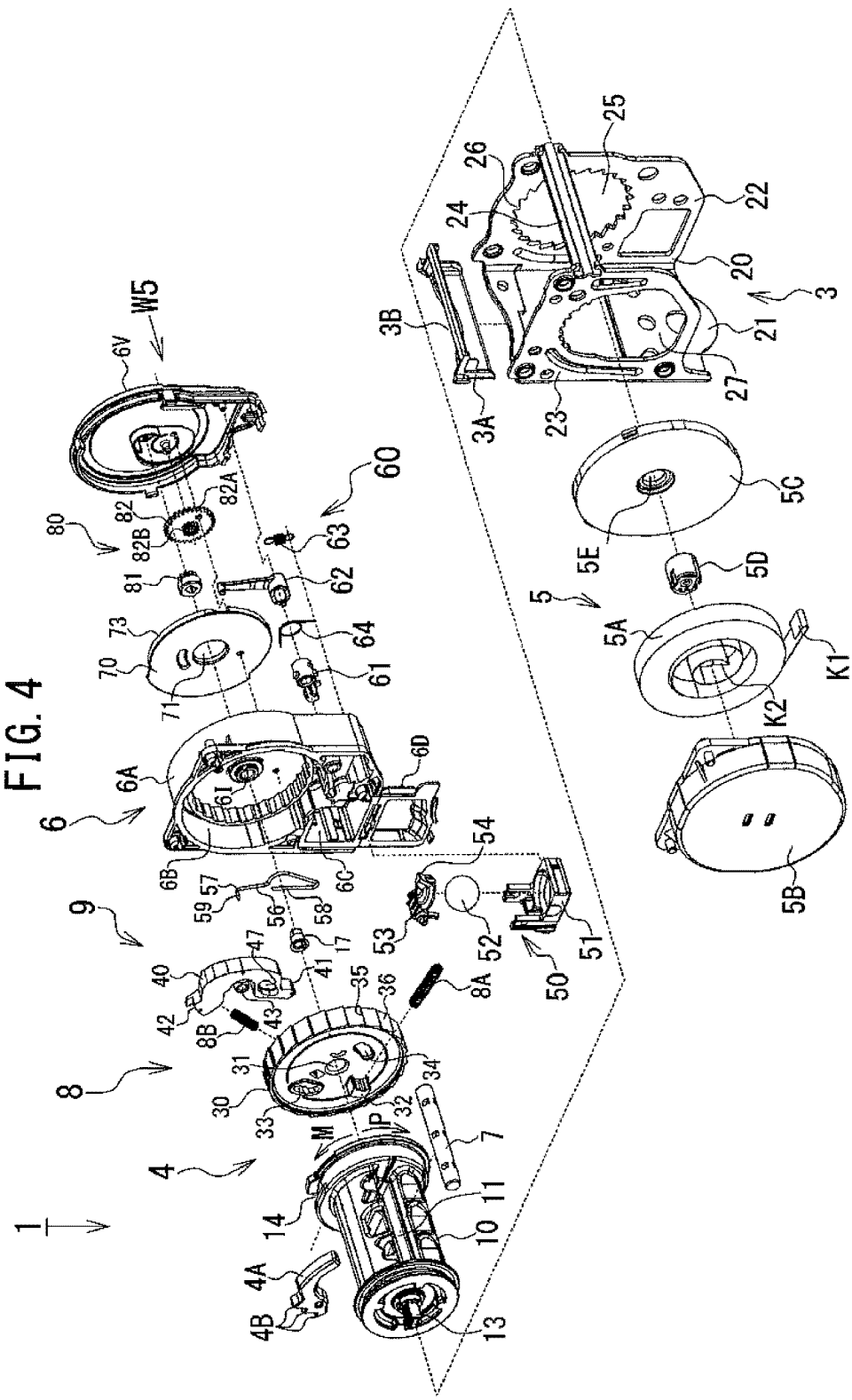
FIG. 4 is a perspective view of the seat belt retractor that is completely exploded.

FIGS. 3 and 4 are perspective views of the retractor 1 that is completely exploded, and illustrate the retractor 1 viewed in different directions from each other. FIG. 3 illustrates the retractor 1 viewed in the same direction as that in FIG. 1. FIG. 4 illustrates the retractor 1 viewed in a W2 direction illustrated in FIG. 1.

As illustrated in FIGS. 3 and 4, by combining a plurality of components, units 3, 4, 5 and 6 of the retractor 1 are assembled. Furthermore, by uniting a plurality of units 3, 4, 5 and 6, the retractor 1 can be manufactured. Hereinafter, each portion of the retractor 1 will be sequentially described in detail.

The housing unit 3 includes a housing 20 storing the winding drum 10, and a protector 3A formed of a synthetic resin. The housing 20 includes a back-plate portion 21 to be fixed to a car body, a pair of side wall portions 22 and 23 (first side wall portion 22 and second side wall portion 23) protruding from each of both side edge portions of the back-plate portion 21, and a fixed plate 24 fixed to the pair of the side wall portions 22 and 23. The protector 3A includes a passage hole 3B for the webbing 2, and is mounted to an upper edge portion of the back-plate portion 21. The webbing 2 passes through the passage hole 3B of the protector 3A, and then passes through the passage hole 3B at the time of winding and drawn out.

The housing 20 includes a circular first opening portion 25 formed in the first side wall portion 22, a plurality of locking teeth 26 protruding inward in the first opening portion 25, and a second opening portion 27 formed in the second side wall portion 23. The plurality of locking teeth 26 is each formed in a triangular shape, and is formed over an entire inner periphery of the first opening portion 25. When a movable pawl 4A of the winding drum unit 4 is engaged with locking teeth 26, the winding drum 10 is locked and thus the rotation of the winding drum 10 in the drawing-out direction "P" is stopped. The second opening portion 27 is formed larger than the first opening portion 25 and faces the first opening portion 25.

The winding drum 10 is inserted into the first opening portion 25 and is stored in the housing 20. Furthermore, both end portions of the winding drum 10 are arranged in the first opening portion 25 and the second opening portion 27 respectively, and the clutch unit 8 is arranged at aside of the first side wall portion 22. In the state described above, the mechanism cover unit 6 is mounted onto the first side wall portion 22, and the winding spring unit 5 is mounted onto the second side wall portion 23.

Figure 5:
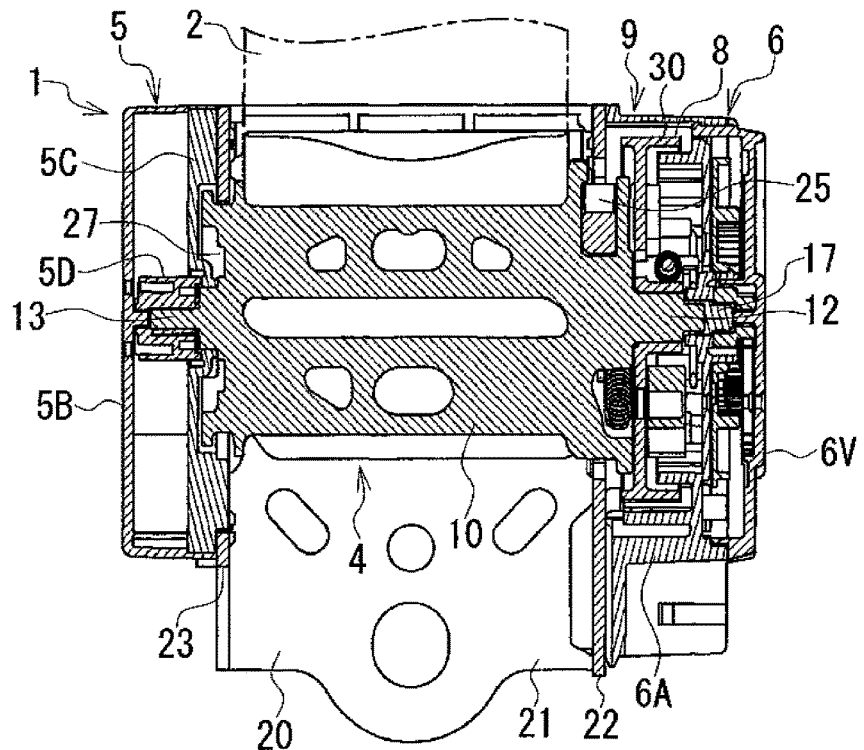
FIG. 5 is a cross-sectional view of the seat belt retractor taken along the line X1-X1 illustrated in FIG. 1, viewed in an arrow direction.
Figure 6:
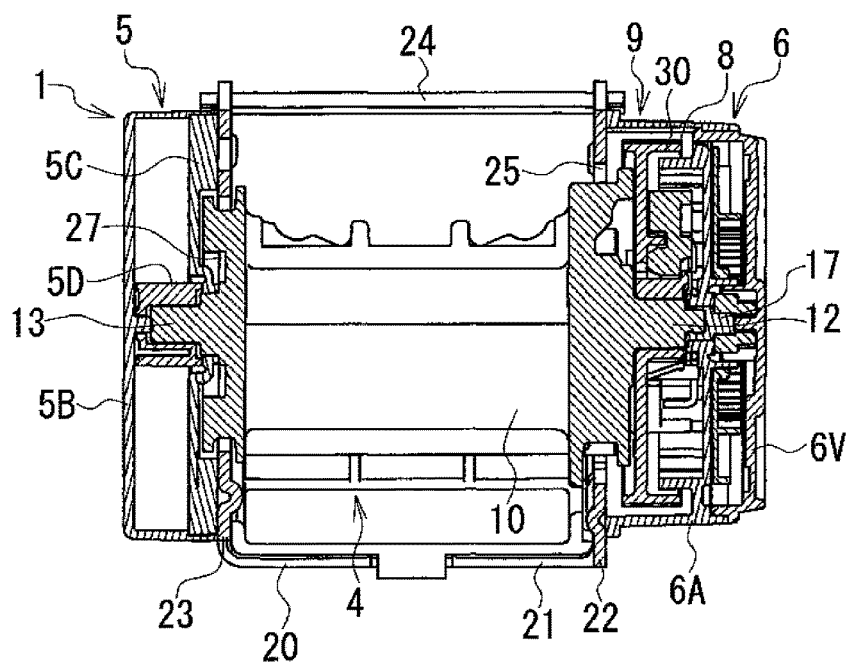
FIG. 6 is a cross-sectional view of the seat belt retractor taken along the line X2-X2 illustrated in FIG. 1, viewed in an arrow direction.

FIG. 5 is a cross-sectional view of the retractor 1 taken along the line X1-X1 illustrated in FIG. 1, viewed in an arrow direction, and FIG. 6 is a cross-sectional view of the retractor 1 taken along the line X2-X2 illustrated in FIG. 1, viewed in an arrow direction.

As illustrated in FIGS. 5 and 6, in a state where an axis line of the winding drum 10 is aligned with a center of the first opening portion 25, the winding drum 10 is rotated in the housing 20, the first opening portion 25, and the second opening portion 27. Furthermore, the winding drum 10 includes a pair of shafts 12 and 13 (first shaft 12 and second shaft 13) protruding laterally along the axis line. The mechanism cover unit 6 is combined with the clutch unit 8 to thereby rotatably support the first shaft 12. The winding spring unit 5 is coupled with the second shaft 13 to thereby rotatably support the second shaft 13.

The winding spring unit 5 (refer to FIGS. 3 and 4) includes a spiral spring 5A, a spring case 5B storing the spiral spring 5A, a spring seat 5C in contact with the second side wall portion 23 of the housing 20, and a spring shaft 5D. An outer end K1 of the spiral spring 5A is fixed to the spring case 5B, and an inner end K2 of the spiral spring 5B is fixed to the spring shaft 5D. The spring seat 5C is mounted to the spring case 5B to cover the spiral spring 5A in the spring case 5B. In the state described above, the spring shaft 5D is rotatably mounted to the spring case 5B and the spring seat 5C. The second shaft 13 of the winding drum 10 is inserted into a support hole 5E, and rotatably supported by the spring seat 5C and also fixed to the spring shaft 5D.

The spring shaft 5D is rotated integrally with the winding drum 10 of the winding drum unit 4, and transmits an urging force of the spiral spring 5A to the winding drum 10. By the spiral spring 5A, the winding spring unit 5 always urges the winding drum 10 in the winding direction "M" of the webbing 2. Furthermore, when the webbing 2 is drawn out, the spiral spring 5A is wound by rotation of the winding drum 10. When the webbing 2 is wound, by the urging force of the spiral spring 5A, the winding drum unit 4 and the winding drum 10 are rotated in the winding direction "M" to thereby wind the webbing 2 on the winding drum 10.

Figure 7:
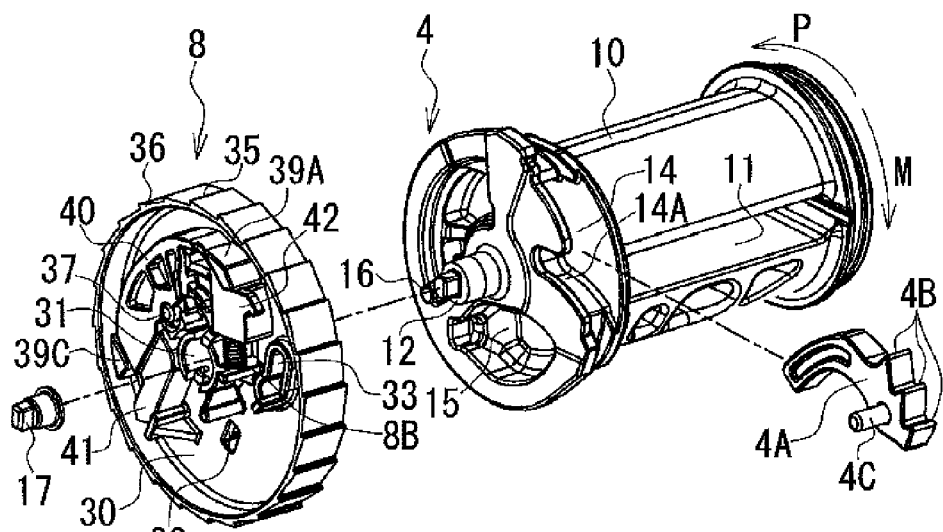
FIG. 7 is a perspective view of a winding drum unit that is exploded.
Figure 8:
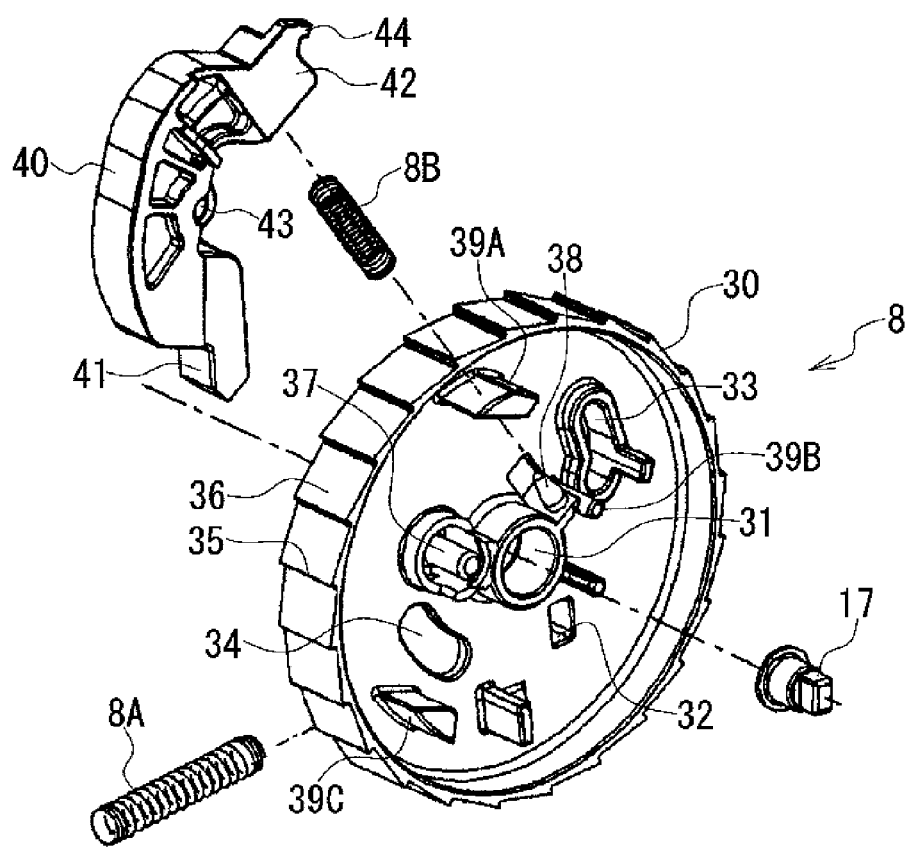
FIG. 8 is a perspective view of a clutch unit that is exploded.

FIG. 7 is a perspective view of the winding drum unit 4 that is exploded, and illustrates the winding drum 10 and the clutch unit 8 viewed in the same direction as that in FIG. 2. FIG. 8 is a perspective view of the clutch unit 8 that is exploded, and an enlarged view of the clutch unit 8 illustrated in FIG. 3.

As illustrated in FIGS. 7 and 8, the winding drum unit 4 includes the winding drum 10 that is rotatable in the winding direction "M" and the drawing-out direction "P" of the webbing 2, the movable pawl 4A to be engaged with locking teeth 26 of the housing 20, the clutch unit 8, and a cap 17. The movable pawl 4A includes engagement teeth 4B for engaging the locking teeth 26 and an interlocking pin 4C laterally protruding. When the movable pawl 4A is stored in the pawl storage portion 14 formed at the end portion of the winding drum 10, the interlocking pin 4C protrudes toward the clutch unit 8 from a guide portion (pass-through portion) 14A of the pawl storage portion 14.

Figure 9:
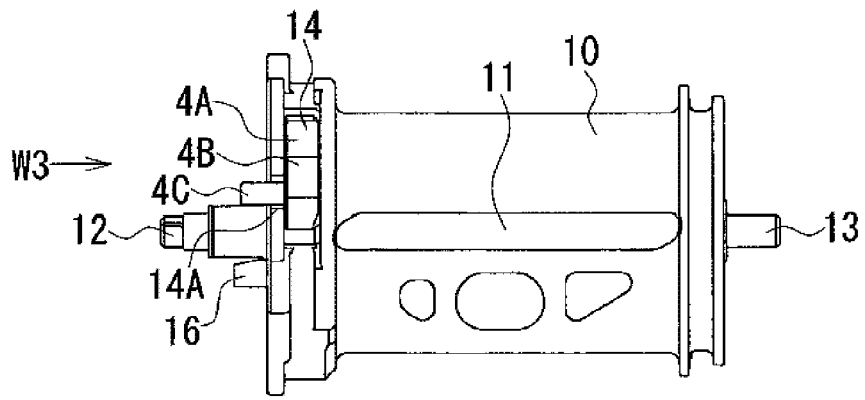
FIG. 9 is a front view of a winding drum storing a movable pawl.
Figure 10A:
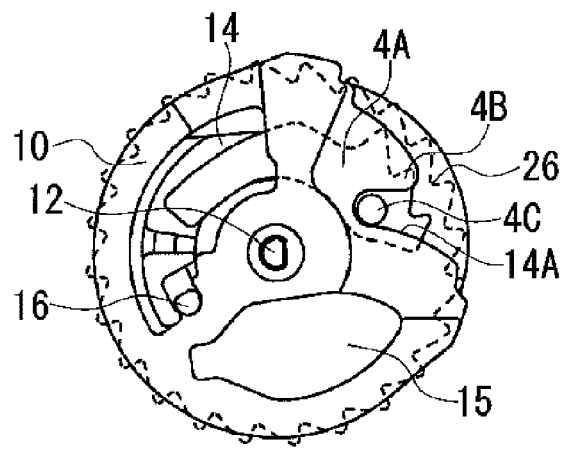
FIGS. 10A and 10B are side views of the winding drum viewed in a W3 direction illustrated in FIG. 9.
Figure 10B:
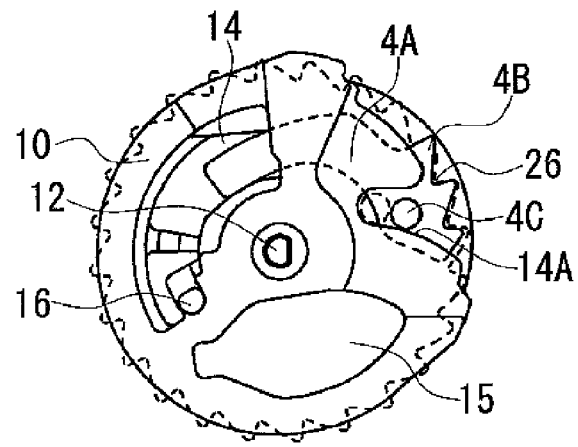

FIG. 9 is a front view of the winding drum 10 storing the movable pawl 4A, and FIG. 10 is a side view of the winding drum 10 viewed in a W3 direction illustrated in FIG. 9. FIG. 10 shows, by dotted lines, the locking teeth 26 of the housing 20.

As illustrated in FIGS. 9 and 10, the movable pawl 4A is movably stored in the pawl storage portion 14, and moves in an inward/outward direction of the pawl storage portion 14. At this time, the interlocking pin 4C slides on the guide portion 14A to thereby move along the guide portion 14A.

Furthermore, the movable pawl 4A moves between a non-locking position (position illustrated in FIG. 10A) where the engagement teeth 4B are not engaged with the locking teeth 26 and a locking position (position illustrated in FIG. 10B) where the engagement teeth 4B are engaged therewith. When the movable pawl 4A moves to the locking position, the engagement teeth 4B are engaged with the locking teeth 26, and thus the movement of the movable pawl 4A is blocked. By the movable pawl 4A, the winding drum 10 rotating in the drawing-out direction "P" is pressed and locked, and the rotation of the winding drum 10 in the drawing-out direction "P" is stopped accordingly. Therefore, the movable pawl 4A constitutes the locking mechanism 9 together with the clutch unit 8.

The clutch unit 8 (refer to FIGS. 7 and 8) includes a circular locking clutch 30, a locking arm 40 displaceably coupled with the locking clutch 30, a return spring 8A, and a sensor spring 8B. The locking clutch 30 is a rotational body which rotates together with the winding drum 10, and which is rotatable relative to the winding drum 10. The first shaft 12 of the winding drum 10 is inserted into a center hole 31 of the locking clutch 30, and the cap 17 is fixed to a leading end of the first shaft 12 protruding from the center hole 31. Therefore, the locking clutch 30 is, relatively, rotatably coupled with the winding drum 10.

The locking clutch 30 includes a spring holder 32 formed on the winding drum 10 side, and the return spring 8A is mounted to the spring holder 32. When the first shaft 12 is inserted into the center hole 31, in a state where the return spring 8A is compressed, the return spring 8A and the spring holder 32 are arranged in a concave portion 15 of the winding drum 10. Furthermore, the interlocking pin 4C of the movable pawl 4A is inserted into a guide groove 33 of the locking clutch 30, and a protrusion 16 in a columnar shape of the winding drum 10 (refer to FIG. 3) is inserted into a through groove 34 of the locking clutch 30. The protrusion 16 is formed on a side face of the winding drum 10, and moves in the rotational direction of the winding drum 10 in the through groove 34.

The locking clutch 30 (refer to FIGS. 7, 8) is urged by the return spring 8A in the drawing-out direction "P" of the webbing 2, and normally, rotates with the winding drum 10. At this time, the movable pawl 4A is maintained at the non-locking position in the pawl storage portion 14. In an emergency or the like, in a state where the locking clutch 30 is locked, the winding drum 10 rotates in the drawing-out direction "P" together with the movable pawl 4A, with respect to the stopped locking clutch 30. Accordingly, the interlocking pin 4C of the movable pawl 4A is pressed by the locking clutch 30, and moves in the guide groove 33 accordingly. The interlocking pin 4C is guided by the guide groove 33 to thereby move outward in a radial direction of the locking clutch 30 along the guide groove 33. By the movement of the interlocking pin 4C, the movable pawl 4A moves to the locking position, and then the engagement teeth 4B of the movable pawl 4A engage with the locking teeth 26 (refer to FIG. 10). Meanwhile, a radial direction of each member (or, a part of each member) is a straight-line direction orthogonal to an axis line with an axis line of each member as the center.

When the engagement teeth 4B and the locking teeth 26 engage with each other, the engagement teeth 4B come into contact with the locking teeth 26, and by the rotation of the winding drum 10 in the drawing-out direction "P", the engagement teeth 4B move outward in the radial direction of the locking clutch 30. Consequently, the engagement teeth 4B move to a bottom portion of the locking teeth 26 along the locking teeth 26. When the engagement teeth 4B reach the bottom portion of the locking teeth 26, the engagement teeth 4B completely engage with the locking teeth 26, and then the engagement between the movable pawl 4A (engagement teeth 4B) and the locking teeth 26 is completed. The engagement teeth 4B and the locking teeth 26 are formed in a shape of engaging with each other as described above.

While the winding drum 10 rotates in the drawing-out direction "P" by a predetermined amount, the locking mechanism 9 moves the movable pawl 4A as described above and engages the movable pawl 4A with the locking teeth 26. By the locking mechanism 9, the winding drum 10 is locked, and thus the rotation of the winding drum 10 in the drawing-out direction "P" is stopped. After a lock of the locking clutch 30 is released, by an urging force of the return spring 8A (refer to FIGS. 7 and 8), the locking clutch 30 relatively rotates in the drawing-out direction "P" with respect to the winding drum 10. By the rotation, the interlocking pin 4C is pressed by the locking clutch 30 and moves in the guide groove 33 accordingly. The interlocking pin 4C is guided by the guide groove 33 to thereby move inward in the radial direction of the locking clutch 30 along the guide groove 33. The movable pawl 4A separates away from the locking teeth 26 by movement of the interlocking pin 4C, and returns to the non-locking position. Therefore, the lock of the winding drum 10 by the locking mechanism 9 is released.

The locking clutch 30 includes a ratchet wheel 36 including a plurality of teeth 35, an arm support portion 37 rotatably supporting the locking arm 40, and a support pin 38 supporting the sensor spring 8B. The ratchet wheel 36 includes a circular member formed on an outer periphery of the locking clutch 30, and can rotate with the winding drum 10. The plurality of teeth 35 is inclined so as to stop rotation of the ratchet wheel 36 only in the drawing-out direction "P", and is formed over an entire outer periphery of the ratchet wheel 36.

The locking arm 40 includes a through hole 43 formed between one end portion (engagement end portion) 41, and other end portion (free end portion) 42 in a longitudinal direction, and is formed in a curved shape. When the arm support portion 37 is inserted into the through hole 43, the locking arm 40 is mounted to the arm support portion 37, and rotatably coupled with the locking clutch 30. The locking arm 40 is arranged inside the ratchet wheel 36, and rotates about the arm support portion 37. The sensor spring 8B is arranged between the other end portion 42 of the locking arm 40 and the support pin 38 to thereby urge the other end portion 42 in the drawing-out direction "P". By this urging force, the other end portion 42 of the locking arm 40 comes into contact with a first stopper 39A of the locking clutch 30.

The locking arm 40 can rotate together with the winding drum 10, and rotates in the drawing-out direction "P" and in the winding direction "M" together with the winding drum 10 and the locking clutch 30. Normally, the other end portion 42 of the locking arm 40 is maintained in a state of being in contact with the first stopper 39A of the locking clutch 30 by the urging force of the sensor spring 8B. On the other hand, when an acceleration of the drawing-out of the webbing 2 exceeds a predetermined acceleration (namely, when an acceleration in the drawing-out direction "P" of the winding drum 10 rotating in the drawing-out direction "P" (acceleration of the rotation) exceeds a predetermined acceleration), a delay caused by inertia relative to the rotating locking clutch 30 is generated on the locking arm 40. As a result, the locking arm 40 rotates while compressing the sensor spring 8B, and the one end portion 41 of the locking arm 40 is displaced outward in the radial direction of the locking clutch 30. By this displacement, as described below, the locking mechanism 9 of the retractor 1 is operated.

As described above, the locking arm 40 is a displacement member that is displaceable in a lock-operating direction depending on the acceleration of the winding drum 10 in the drawing-out direction "P", and in response to the acceleration, the locking arm 40 is displaced in a predetermined lock-operating direction. The lock-operating direction is a direction for operating the locking mechanism 9, and here, is a direction where the one end portion 41 of the locking arm 40 is displaced outward in the radial direction of the locking clutch 30. The locking mechanism 9 is operated with the locking arm 40 displaced in the lock-operating direction. Meanwhile, when the locking arm 40 is displaced in the lock-operating direction, the locking arm 40 may be displaced and the locking arm 40 may be displaced relative to the winding drum 10 and the locking clutch 30. Alternatively, the locking arm 40 may be displaced relative to the winding drum 10 and the locking clutch 30 while being displaced. Therefore, the displacement of the locking arm 40 includes the displacement in such modes described above.

The locking arm 40 is displaceably coupled with the locking clutch 30 in the lock-operating direction to rotate together with the locking clutch 30. In addition, the arm support portion 37 is a displacement member support portion, and rotates to displace the locking arm 40 in the lock-operating direction. The locking arm 40 rotates in the lock-operating direction and an opposite direction of the lock-operating direction to thereby be displaced in each of the both directions. By the urging force of the sensor spring 8B, the locking arm 40 is displaced (rotates) in the opposite direction of the lock-operating direction, and the one end portion 41 of the locking arm 40 is displaced inward in the radial direction of the locking clutch 30.

The locking mechanism 9 (refer to FIG. 2) is operated by displacement of the locking arm 40 in the lock-operating direction to thereby stop the rotation of the winding drum 10 in the drawing-out direction "P". In addition, the locking mechanism 9 is operated by stopping rotation of the ratchet wheel 36 in the drawing-out direction "P" to thereby stop the rotation of the winding drum 10 in the drawing-out direction "P".

Specifically, the retractor 1 includes means for stopping the locking arm 40 displaced in the lock-operating direction (locking arm stop means) and means for stopping the rotation of the ratchet wheel 36 (ratchet wheel stop means) in the mechanism cover unit 6. By the stop of the locking arm 40 or the stop of the rotation of the ratchet wheel 36, the locking clutch 30 stops. In the state described above, by the rotation of the winding drum 10 in the drawing-out direction "P", the movable pawl 4A of the locking mechanism 9 moves to the locking position to thereby lock the winding drum 10. Hereinafter, the mechanism cover unit 6 including each stop means will be described in detail.

The mechanism cover unit 6 (refer to FIGS. 3, 4) includes an acceleration sensor 50 for detecting an acceleration of the vehicle, a mechanism cover 6A for storing the clutch unit 8, a restraining member 56 for restraining the displacement of the locking arm 40, and switching means 60 configured to switch the state of the retractor 1. The acceleration sensor 50 is ratchet wheel stop means, and an emergency lock-operating device for operating the locking mechanism 9 when the vehicle encounters an emergency. Furthermore, the acceleration sensor 50 includes a sensor holder 51, an inertia mass body 52, and a sensor lever 53. The inertia mass body 52 includes a sphere made of metal, and is movably arranged in a concave portion of the sensor holder 51. The sensor lever 53 covers on the inertia mass body 52, and is movably mounted to the sensor holder 51 in a vertical direction.

Figure 11:
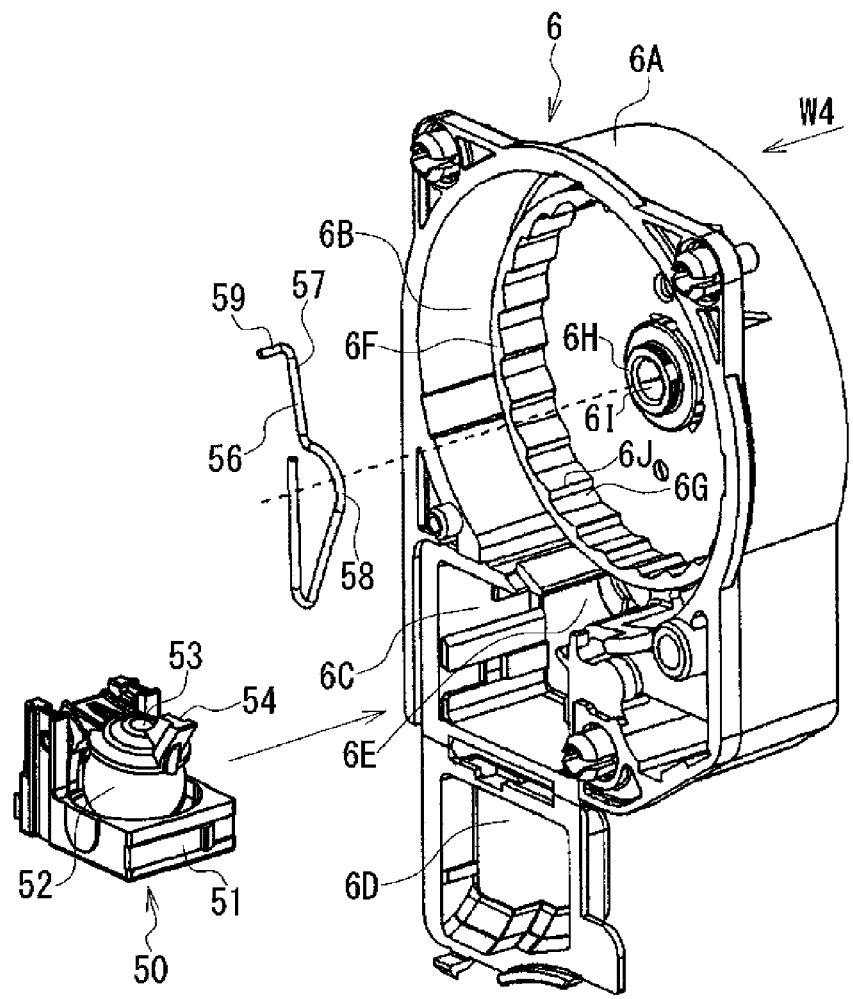
FIG. 11 is a perspective view of an acceleration sensor, a mechanism cover, and a restriction member.

FIG. 11 is a perspective view illustrating the acceleration sensor 50, the mechanism cover 6A, and the restraining member 56. As illustrated in FIG. 11, the mechanism cover 6A includes a clutch storage 6B in a cylindrical shape for storing the locking clutch 30, a sensor storage 6C for storing the acceleration sensor 50, and a sensor cover 6D for covering the acceleration sensor in the sensor storage 6C. In a state where the acceleration sensor 50 is mounted to the sensor storage 6C, a lock claw 54 of the sensor lever 53 protrudes upward and is arranged at an opening 6E of the clutch storage 6B.

Figure 12:
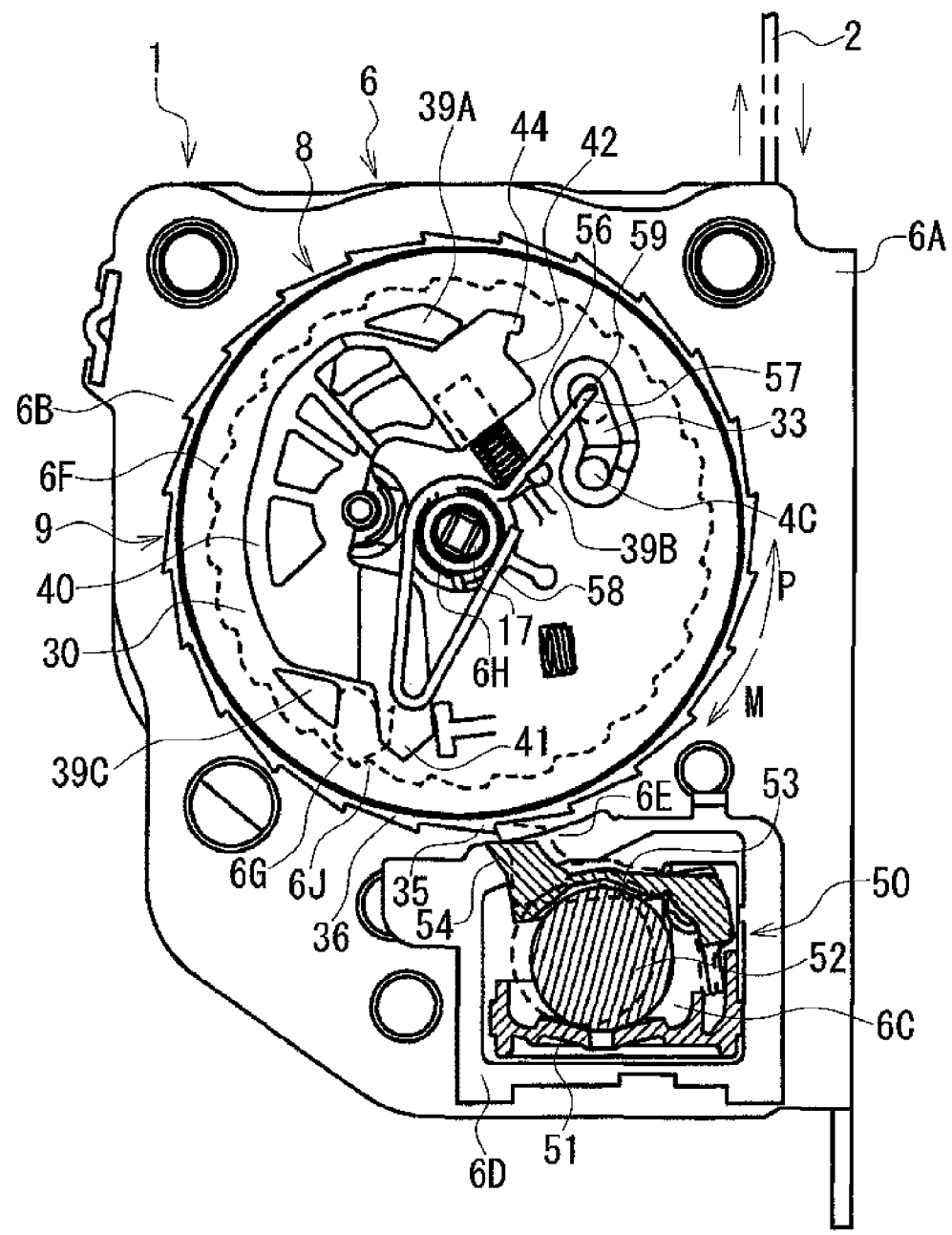
FIG. 12 is a cross-sectional view of a mechanism cover unit viewed in a W4 direction illustrated in FIG. 11.

FIG. 12 is a cross-sectional view of the mechanism cover unit 6 viewed in a W4 direction illustrated in FIG. 11, and also illustrates the locking clutch 30 stored in the clutch storage 6B. As illustrated in FIG. 12, the inertia mass body 52 is movably held between the sensor holder 51 and the sensor lever 53. When the acceleration of the vehicle exceeds the predetermined acceleration in an emergency state of the vehicle (e.g., crash or sudden braking), the inertia mass body 52 is moved on the sensor holder 51 by an inertia force to thereby press the sensor lever 53 upward. Therefore, the lock claw 54 of the sensor lever 53 moves into the clutch storage 6B to thereby mesh with teeth 35 of the ratchet wheel 36.

The teeth 35 of the ratchet wheel 36 mesh with the lock claw 54 of the sensor lever 53 only when the ratchet wheel 36 rotates in the drawing-out direction "P". The lock claw 54 locks the ratchet wheel 36 (locking clutch 30) to thereby stop the rotation of the ratchet wheel 36 in the drawing-out direction "P". Therefore, the locking mechanism 9 is operated to lock the winding drum 10 by the movable pawl 4A. The locking mechanism 9 stops the rotation of the winding drum 10 in the drawing-out direction "P" to stop drawing-out of the webbing 2. Therefore, the acceleration sensor 50 and locking mechanism 9 constitute the car-body-sensing locking mechanism for responding to a sudden speed change of the vehicle to thereby stop drawing-out of the webbing 2.

When the acceleration of the vehicle becomes the predetermined acceleration or less, the inertia mass body is moved to an original position by the gravity. Subsequently, the winding drum 10 is released from load of the webbing 2, and thus, becomes rotatable in the winding direction "M". When the winding drum 10 and the locking clutch 30 rotate in the winding direction "M", the lock claw 54 comes off the teeth 35 of the ratchet wheel 36, and moves outward from the clutch storage 6B. At the same time, the lock of the ratchet wheel 36 (locking clutch 30) is released. Moreover, the lock of the winding drum 10 by the locking mechanism 9 is released, and thus the drawing-out and winding of the webbing 2 become possible.

The mechanism cover 6A (refer to FIG. 11) includes a circular wall 6F formed inside the clutch storage 6B, a stop portion 6G formed on an inner periphery of the circular wall 6F, a center support portion 6H positioned at a center thereof, and an insertion hole 6I passing through the center support portion 6H. The cap 17 (refer to FIG. 7) fixed to the first shaft 12 is inserted into the insertion hole 6I, and the first shaft 12 of the winding drum 10 is rotatably supported by the center support portion 6H. In the state described above, the locking clutch 30, the ratchet wheel 36, and the locking arm 40 are stored in the clutch storage 6B (refer to FIGS. 11, 12). Furthermore, the ratchet wheel 36 is arranged between an inner periphery of the clutch storage 6B and an outer periphery of the circular wall 6F, and the locking arm 40 is arranged inside the circular wall 6F.

The stop portion 6G is locking arm stop means, and includes a plurality of engagement teeth 6J formed over an entire inner periphery of the circular wall 6F. The engagement teeth 6J are engagement portions of the stop portion 6G for engaging with the locking arm 40 displaced in the lock-operating direction, and engage with the one end portion 41 of the locking arm 40. Further, the plurality of the engagement teeth 6J protrude toward the locking arm 40 and, also, incline to stop the rotation of the locking arm 40 and the locking clutch 30 only in the drawing-out direction "P". Only when the locking clutch 30 rotates in the drawing-out direction "P", the one end portion 41 of the locking arm 40 engages with the engagement teeth 6J of the stop portion 6G in such a manner to hook the engagement teeth 6J.

Figures 13A, 13B:
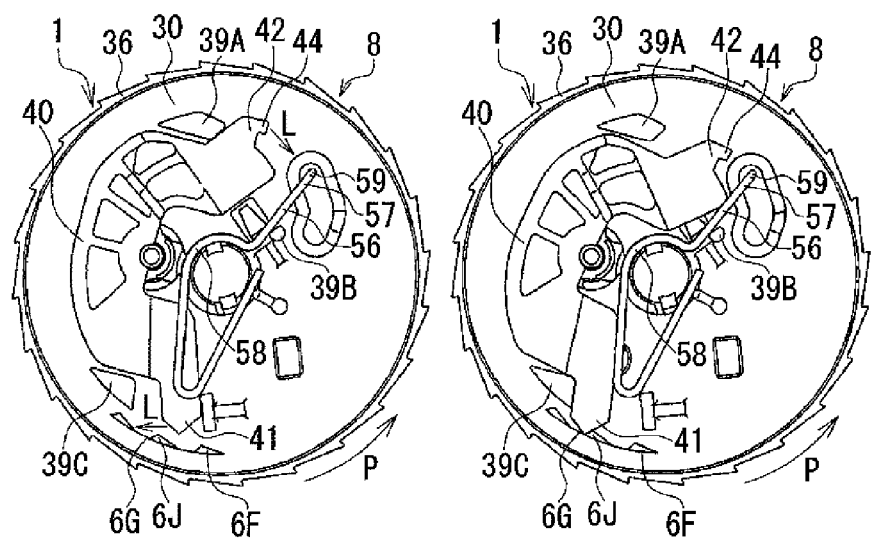
FIGS. 13A and 13B illustrate actions of a locking arm when a webbing is drawn out.

FIGS. 13A, 13B illustrate actions of the locking arm 40 when the webbing 2 is drawn out, and illustrate a part of the stop portion 6G and the clutch unit 8. Further, FIG. 13A indicates a lock-operating direction "L" of the locking arm 40 with an arrow. When the locking arm 40 is displaced in the lock-operating direction "L" by its rotation, the one end portion 41 of the locking arm 40 is displaced toward the stop portion 6G and the other end portion 42 thereof is displaced toward a pressing portion 57 of the restraining member 56.

When the webbing 2 is normally drawn out (refer to FIG. 13A), the locking clutch 30 and the locking arm 40 integrally rotate in the drawing-out direction "P" together with the winding drum 10. At this time, the one end portion 41 of the locking arm 40 is arranged at a position away from the stop portion 6G (engagement teeth 6J), and the locking arm 40 is maintained in a state of not engaging with the stop portion 6G.

When, due to a sudden drawing-out of the webbing 2, the acceleration of the winding drum 10 in the drawing-out direction "P" exceeds the predetermined acceleration, the locking arm 40 is displaced in the lock-operating direction "L" depending on the acceleration of the winding drum 10 in the drawing-out direction "P" (refer to FIG. 13B). Accordingly, the locking arm 40 is displaced by its rotation, to come into contact with a third stopper 39C of the locking clutch 30. Furthermore, the one end portion 41 of the locking arm 40 becomes closer to the stop portion 6G to thereby engage with the engagement teeth 6J. The stop portion 6G engages with the locking arm 40 displaced in the lock-operating direction "L" to thereby stop the locking arm 40.

By an engagement of the locking arm 40 with the stop portion 6G (engagement teeth 6J), the stop portion 6G holds the locking arm 40 displaced in the lock-operating direction "L" to thereby stop the rotation of the locking arm 40 and the locking clutch 30 rotating with the winding drum 10. Further, the locking arm 40 is maintained in a stop state at the stop portion 6G, and in the state, the locking mechanism 9 starts the operation by the rotation of the winding drum 10 in the drawing-out direction "P".

Specifically, the locking clutch 30 is locked by the locking arm 40, and the rotation of the locking clutch 30 in the drawing-out direction "P" is stopped. Accordingly, the locking mechanism 9 is operated to lock the winding drum 10 by the movable pawl 4A. The locking mechanism 9 stops the rotation of the winding drum 10 in the drawing-out direction "P" to thereby stop drawing-out of the webbing 2. Therefore, the stop portion 6G for stopping the locking arm 40 constitutes a part of the locking mechanism 9. Furthermore, the stop portion 6G and the locking mechanism constitute a webbing-sensing locking mechanism for stopping the drawing-out of the webbing 2 in response to the sudden drawing-out thereof.

When the one end portion 41 of the locking arm 40 comes off the engagement teeth 6J, the lock of the locking clutch 30 is released. The locking arm 40 is released from the stop portion 6G to be displaced in the opposite direction of the lock-operating direction "L". Subsequently, the winding drum 10 is released from the load of the webbing 2, and thus, rotates in the winding direction "M" along with the winding of the webbing 2. Accordingly, the locking clutch 30 rotates in the drawing-out direction "P" relative to the winding drum 10, and then the lock of the winding drum 10 by the locking mechanism 9 is released. Subsequently, the drawing-out and winding of the webbing 2 become possible.

The switching means 60 for switching the state of the retractor 1 will be described below (refer to FIGS. 3, 4). The switching means 60 switches the state of the retractor 1 between the automatic locking retractor (ALR) and the emergency locking retractor (ELR) in accordance with the intended use. The ALR state refers to a state where the locking mechanism 9 is constantly operated, and the ELR state refers to a state where the locking mechanism 9 is operated when the vehicle encounters an emergency. In the ALR state, the webbing 2 cannot be drawn out and can be wound only. For example, when a child seat or luggage is fixed onto the seat, the retractor 1 is switched to the ALR state. In contrast to this, in the ELR state, the webbing 2 can be wound and drawn out. However, when the vehicle encounters an emergency, the locking mechanism 9 is operated and thus the winding drum 10 is locked by the locking mechanism 9. As a result, the rotation of the winding drum 10 in the drawing-out direction "P" is stopped and the drawing-out of the webbing 2 is stopped.

The switching means 60 is a switch mechanism for switching the state of the locking mechanism 9, and switches the state of the locking mechanism 9 to thereby switch the state of the retractor 1. The switching means 60 switches the locking mechanism 9 between an operation state and a waiting state. The operation state is a state where the locking mechanism 9 is operated, and the locking mechanism 9 in the operation state locks the winding drum 10 to thereby stop the rotation of the winding drum 10 in the drawing-out direction "P". In the operation state, the locking mechanism 9 stops only the rotation of the winding drum 10 in the drawing-out direction "P", and allows the winding drum 10 to rotate in the winding direction "M". The waiting state is a state where the locking mechanism 9 waits the operation, and the locking mechanism 9 in the waiting state is operated when the vehicle encounters an emergency. In the waiting state, the switching means 60 does not operate the locking mechanism 9, and thus the locking mechanism 9 allows the rotation of the winding drum 10 in the winding direction "M" and the drawing-out direction "P". During the waiting state, the locking mechanism 9 can be operated independently from the switching means 60, and when the vehicle encounters an emergency, the locking mechanism 9 is operated as the webbing-sensing locking mechanism and the car-body-sensing locking mechanism.

When the state of the retractor 1 is switched, the switching means 60 controls the operation of the locking mechanism 9 to thereby switch the state thereof. Specifically, the switching means 60 switches the locking mechanism 9 from the waiting state to the operation state to thereby switch the retractor 1 from the ELR state to the ALR state. Furthermore, the switching means 60 switches the locking mechanism 9 from the operation state to the waiting state to thereby switch the retractor 1 from the ALR state to the ELR state.

The switching means 60 includes an operation member 61 for operating the locking mechanism 9, an arrangement member 62 in an arm-like shape for arranging the operation member 61 at a predetermined position, a movement member 70 in a disk-like shape for moving the arrangement member 62, first urging means 63 that is arrangement member urging means, second urging means 64 that is operation member urging means, and a deceleration mechanism 80. Furthermore, the deceleration mechanism 80 includes a drive gear 81, an intermediate gear 82, and a driven gear 83, and is coupled with the winding drum 10 and the movement member 70 via a plurality of gears 81, 82 and 83.

The operation member 61 and the arrangement member 62 are rotatably mounted to a rotational shaft (shaft for rotation) 6K in a cylindrical shape formed on the mechanism cover 6A (refer to FIG. 3). The first urging means 63 includes an elastically-deformable urging member (spring, rubber, elastic member and the like) (here, tension coil spring), and is mounted to the arrangement member 62 and the mechanism cover 6A. The second urging means 64 includes the elastically-deformable urging member (spring, rubber, elastic member and the like) (here, torsion spring), and is mounted to the operation member 61 and the mechanism cover 6A. A center hole 71 of the movement member 70 is rotatably mounted to a circular support portion 6L of the mechanism cover 6A, and the movement member 70 rotates about the circular support portion 6L.

The cap 17 fixed to the first shaft 12 is inserted into the insertion hole 6I, and arranged in the circular support portion 6L. The drive gear 81 is fixed to the cap 17 in the circular support portion 6L, and at a center of the movement member 70, rotates integrally with the first shaft 12 of the winding drum 10 and the cap 17. The driven gear 83 is an internal gear formed in an inner convex portion 72 of the movement member 70, and larger than the drive gear 81 and the intermediate gear 82. The intermediate gear 82 includes a first gear 82A larger than the drive gear 81 and a second gear 82B (refer to FIG. 4) smaller than the first gear 82A, and is rotatably mounted to an outer face cover 6V. The first gear 82A meshes with the drive gear 81, and the second gear 82B meshes with the driven gear 83. The outer face cover 6V is mounted to the mechanism cover 6A to cover the switching means 60.

Figure 14:
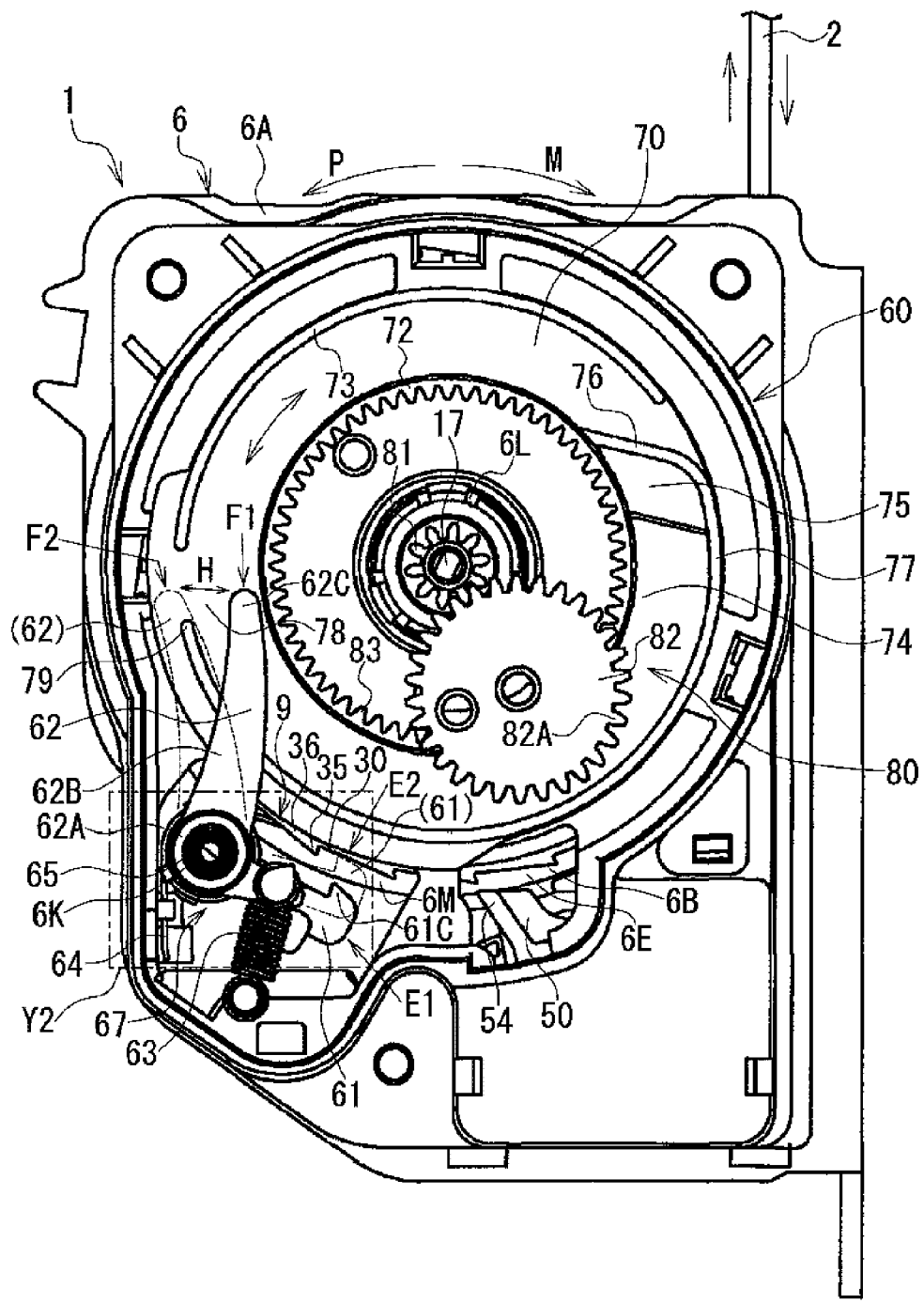
FIG. 14 is a side view of the retractor viewed in a W5 direction illustrated in FIG. 4.

FIG. 14 is a side view of the retractor 1 viewed in a W5 direction illustrated in FIG. 4, and illustrates the mechanism cover unit 6 with the outer face cover 6V removed. Furthermore, FIG. 14 also illustrates the ratchet wheel 36 of the locking clutch 30 stored in the mechanism cover 6A (clutch storage 6B). The ratchet wheel 36 is exposed at a opening 6M of the clutch storage 6B. FIG. 14 shows, by dotted lines, a part of the operation member 61 and a part of the arrangement member 62 which are moved from the positions indicated by solid lines.

As illustrated in FIG. 14, when the winding drum 10 is rotated, the drive gear 81 is rotated integrally with the cap 17. When the drive gear 81 is rotated, the first gear 82A is rotated accordingly, and the intermediate gear 82 is rotated at a rotational speed slower than that of the drive gear 81. When the second gear 82B (FIG. 4) of the intermediate gear 82 is rotated, the driven gear 83 is rotated at a rotational speed slower than that of the intermediate gear 82 accordingly, and then the movement member 70 is rotated by interlocking with the rotation of the winding drum 10. The deceleration mechanism 80 transmits the rotation of the winding drum 10 to the movement member 70 at a decelerated speed, and rotates the movement member 70 at a rotational speed slower than that of the winding drum 10. Here, while the entire webbing 2 is being drawn out, the movement member 70 is rotated by a predetermined angle of 360 degrees or less. Furthermore, the movement member 70 is rotated in an opposite direction of the rotational direction of the winding drum 10.

The operation member 61 and the arrangement member 62 are rotatably mounted to the one rotational shaft 6K so as to overlap with each other in a shaft direction of the rotational shaft 6K and are rotatably combined by interlocking with each other. In the state described above, the operation member 61 is arranged at the ratchet wheel 36 side with respect to the movement member 70, and the arrangement member 62 is arranged along a face of the inner convex portion 72 side of the movement member 70. The movement member 70 is a cam member for moving the arrangement member 62 by rotation, and a control member for controlling a position of the operation member 61 with the arrangement member 62. The switching means 60 controls the operation of the locking mechanism 9 with the movement member 70 that is the control member, and switches the locking mechanism 9 between the operation state and the waiting state. The switching means 60 controls and switches the state of the locking mechanism 9 depending on an amount of drawing-out (drawing-out length) and an amount of winding (winding length) of the webbing 2. Moreover, the switching means 60 controls positions of the arrangement member 62 and the operation member 61 by the movement member 70 to thereby switch the state of the locking mechanism 9.

The arrangement member 62 is a cam follower driven by the movement member 70, and is a switch lever for switching the state of the retractor 1. The arrangement member 62 can switch the state of the locking mechanism 9. The operation member 61 is an interlocking member for interlocking with the arrangement member 62, and is an operation switch (change-over switch) for switching the locking mechanism 9 between an operation and a non-operation. The locking mechanism 9 is operated by the operation member 61 to thereby stop the rotation of the winding drum 10 only in the drawing-out direction "P", and to allow the rotation thereof in the winding direction "M". Here, the operation member 61 is a mesh member meshing with the teeth 35 of the ratchet wheel 36 in the mechanism cover 6A, and when meshing with the teeth 35, the operation member stops the rotation of the ratchet wheel 36 in the drawing-out direction "P". The locking mechanism 9 is operated when stopping of the rotation of the ratchet wheel 36 in the drawing-out direction "P" by meshing the operation member 61 with the teeth 35. Therefore, the switching means 60 including the operation member 61 is also ratchet wheel stop means.

The operation member 61 and the arrangement member 62 rotate about the rotational shaft 6K to thereby move in the same rotational direction. That is, the retractor 1 includes rotation means 65 to move the operation member 61 and the arrangement member 62 by its rotation, and the rotation means 65 includes the one rotational shaft 6K. The arrangement member 62 rotationally moves (arrow "H" illustrated in FIG. 14) together with the operation member 61 by the rotation means 65. Furthermore, by interlocking with the movement (rotation) of the arrangement member 62, the operation member 61 moves (rotates) the locking mechanism 9 to a non-operation position E1 (position indicated with the solid line in FIG. 14) where the locking mechanism 9 is not operated or an operation position E2 (position indicated with the dotted line in FIG. 14) where the locking mechanism 9 is operated.

The non-operation position E1 of the operation member 61 is a position (non-mesh position) where the operation member 61 does not mesh with the teeth 35 of the ratchet wheel 36. The operation member 61 at the non-operation position E1 maintains the locking mechanism 9 in the waiting state. The operation position E2 of the operation member 61 is a position (mesh position) where the operation member 61 meshes with the teeth 35 of the ratchet wheel 36. The arrangement member 62 moves the operation member 61 from the non-operation position E1 (non-mesh position) to the operation position E2 (mesh position) to operate the locking mechanism 9. The operation member 61 at the operation position E2 maintains the locking mechanism 9 in the operation state.

More specifically, by the movement of the arrangement member 62, the operation member 61 gets closer to the ratchet wheel 36 or separates away from the ratchet wheel 36. Further, in the same way as the lock claw 54 of the acceleration sensor 50, the operation member 61 meshes with the teeth 35 of the ratchet wheel 36 in the clutch storage 6B at the opening 6M. Therefore, the ratchet wheel 36 stops rotating to operate the locking mechanism 9.

The second urging means 64 always urges the operation member 61 toward the operation position E2. When the operation member 61 comes into contact with the ratchet wheel 36, the operation member 61 is pressed to the ratchet wheel 36 by the second urging means 64. In contrast to this, the first urging means 63 always urges the arrangement member 62 in a direction in which the operation member 61 is moved to the non-operation position E1 (direction in which the operation member 61 is separated away from the ratchet wheel 36) (here, inward in a radial direction of the movement member 70). As illustrated in FIG. 14, the second urging means 64 urges the operation member 61 to rotate in a counter-clockwise direction, and the first urging means 63 urges the arrangement member 62 to rotate in a clockwise direction.

In a state where the urging force of the first urging means 63 and the urging force of the second urging means 64 are well balanced (state illustrated in FIG. 14), the arrangement member 62 is positioned inward in the radial direction of the movement member 70, and at a first position F1 in the vicinity of the inner convex portion 72 (position indicated with the solid line illustrated in FIG. 14). The first position F1 of the arrangement member 62 is a position where the operation member 61 is arranged at the non-operation position E1, and the operation member 61 is arranged at the non-operation position E1 by the arrangement member 62. From the state described above, the arrangement member 62 moves in a direction where the operation member 61 is moved to the operation position E2 (direction in which the operation member 61 gets closer to the ratchet wheel 36) (here, outward in the radial direction of the movement member 70), and then the arrangement member 62 is arranged at a second position F2 (position indicated with the dotted line illustrated in FIG. 14) outward from the first position F1. The second position F2 is a position where the operation member 61 is arranged at the operation position E2, and the operation member 61 is arranged at the operation position E2 by the arrangement member 62.

As described above, the arrangement member 62 is arranged at the first position F1 or the second position F2 depending on the rotation of the rotation means 65. At a time, the arrangement member 62 moves with the operation member 61 to arrange the operation member 61 at the non-operation position E1 or the operation position E2. Further, the first urging means 63 urges the arrangement member 62 toward the first position F1. In a state where the arrangement member 62 is arranged at the second position F2, since the urging force of the first urging means 63 is larger than that of the second urging means 64, the arrangement member 62 is moved to the first position F1 by the urging force of the first urging means 63, and the operation member 61 moves to the non-operation position E1 accordingly.

Figure 15:
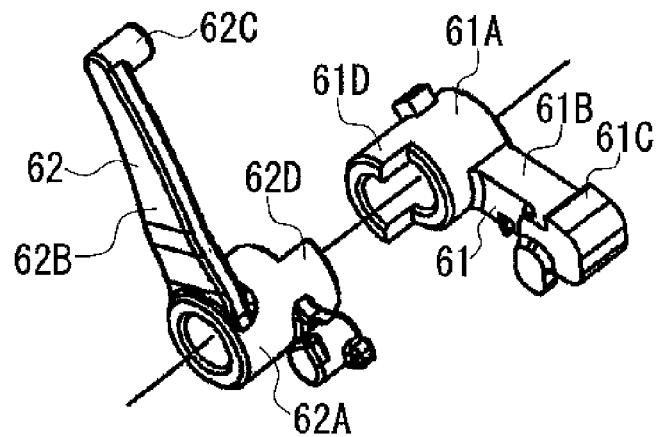
FIG. 15 is a perspective view of an operation member and an arrangement member.
Figure 16:
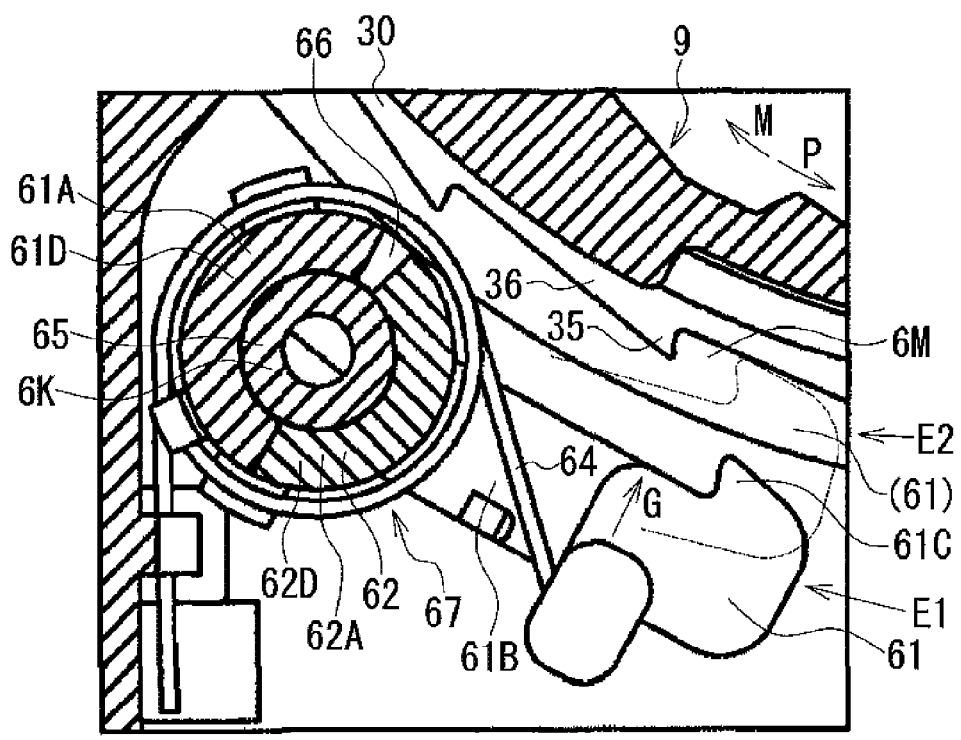
FIG. 16 is a cross-sectional view of a Y2 portion illustrated in FIG. 14.

FIG. 15 is a perspective view of the operation member and the arrangement member 62. FIG. 16 is a cross-sectional view of a Y2 portion illustrated in FIG. 14.

As illustrated in FIG. 15, the arrangement member 62 includes a mounting portion 62A in a cylindrical shape to be mounted to the rotational shaft 6K, an arm portion 62B protruding from the mounting portion 62A, and a contact portion 62C including a protrusion formed at a leading end of the arm portion 62B. When the contact portion 62C comes into contact with the movement member 70 and is moved accordingly, to rotate the arm portion 62B about the mounting portion 62A, thus the arrangement member 62 is moved.

The operation member 61 includes a mounting portion 61A in a cylindrical shape to be mounted to the rotational shaft 6K, an arm portion 61B protruding from the mounting portion 61A, and a meshing pawl 61C formed at the leading end of the arm portion 61B. The meshing pawl 61C is a meshing portion (mesh tooth) formed on the operation member 61 and moves integrally with the operation member 61. When the arm portion 61B is rotated about the mounting portion 61A, the operation member 61 is moved, and the meshing pawl 61C meshes with the teeth 35 of the ratchet wheel 36.

The meshing pawl 61C and the teeth 35 of the ratchet wheel 36 are formed to mesh with each other only when the ratchet wheel 36 rotates in the drawing-out direction "P". The meshing pawl 61C is included in a part of the locking mechanism 9, which includes the ratchet wheel 36 and the meshing pawl 61C. When the operation member 61 moves to the operation position E2, the operation member 61 arranges the meshing pawl 61C at a position where the meshing pawl 61C meshes with the teeth 35, and when the operation member 61 moves to the non-operation position E1, the operation member 61 arranges the meshing pawl 61C at a position where the meshing pawl 61C does not mesh with the teeth 35. The locking mechanism 9 is operated by meshing the teeth 35 with the meshing pawl 61C. When the ratchet wheel 36 rotates in the winding direction "M", the meshing pawl 61C relatively slides on an outer face of the teeth 35 and gets over the teeth 35 at a leading end thereof.

When the mounting portion 61A of the operation member 61 and the mounting portion 62A of the arrangement member 62 are mounted to the rotational shaft 6K, circular-arc portions 61D and 62D of the mounting portions 61A and 62A are combined with each other respectively. At this time, by the urging force of the second urging means 64 (arrow "G" illustrated in FIG. 16), each one end portion of the circular-arc portions 61D and 62D comes into contact with each other, and a gap 66 is formed between other end portions of the circular-arc portions 61D and 62D. When the arrangement member 62 (FIG. 16 illustrates only a cross-sectional view of the arrangement member 62D) moves to the first position F1, the operation member 61 is pressed to rotate by the arrangement member 62 to thereby move to the non-operation position E1 while maintaining the gap 66. Furthermore, when the arrangement member 62 moves to the second position F2, by the movement of the arrangement member 62, the operation member 61 moves to the operation position E2 by the urging force of the second urging means 64 while maintaining the gap 66.

The meshing pawl 61C of the operation member 61 meshes only with the teeth 35 of the ratchet wheel 36 rotating in the drawing-out direction "P". In the state described above, when the ratchet wheel 36 rotates in the winding direction "M", the meshing pawl 61C is pressed by the teeth 35. Therefore, in a state where the arrangement member 62 is stopped, the operation member 61 is displaced along the teeth 35 while narrowing the gap 66, to thereby sequentially get over the plurality of teeth 35.

Therefore, the retractor 1 includes a displacement mechanism 67 of the operation member 61 constituted as described above. In a state where the arrangement member 62 is maintained at the second position F2, through the displacement mechanism 67, the meshing pawl 61C of the operation member 61 is displaced along the teeth 35 of the ratchet wheel 36 rotating in the winding direction "M" with the winding drum 10. Therefore, while the ratchet wheel 36 is rotating in the winding direction "M", the meshing pawl 61C is reliably maintained in a state of being ready for meshing with the plurality of teeth 35. When the ratchet wheel 36 rotates in the drawing-out direction "P", the meshing pawl 61C meshes with the teeth 35 again.

The arrangement member 62 (refer to FIG. 14) moves with the operation member 61 to thereby move the operation member 61 to the non-operation position E1 or the operation position E2. By this movement, the operation member 61 and the arrangement member 62 control a rotatable direction of the ratchet wheel 36 and also switch the state of the retractor 1. When the arrangement member 62 moves the operation member 61 to the non-operation position E1, the ratchet wheel 36 becomes able to rotate in the winding direction "M" and the drawing-out direction "P", and thus the state of the retractor 1 is switched to the ELR state. When the arrangement member 62 moves the operation member 61 to the operation position E2, the ratchet wheel 36 becomes able to rotate only in the winding direction "M", and thus the state of the retractor 1 is switched to the ALR state. At this time, when the operation member 61 is moved, the operation member 61 and the arrangement member 62 switch the state of the locking mechanism 9 to thereby switch the state of the retractor 1. When the operation member 61 is moved to the non-operation position E1, the state of the locking mechanism 9 is switched to the waiting state and the state of the retractor 1 is switched to the ELR state. Furthermore, when the operation member 61 moves to the operation position E2, the state of the locking mechanism 9 is switched to the operation state, and the state of the retractor 1 is switched to the ALR state.

The movement member 70 arranges the arrangement member 62 at the first position F1 or the second position F2, and arranges the operation member 61 at the non-operation position E1 or the operation position E2. The movement member 70 rotates by interlocking with the rotation of the winding drum 10, and by the rotation, the movement member 70 moves the arrangement member 62 to the first position F1 or the second position F2. Moreover, the movement member 70 includes the inner convex portion 72, an outer convex portion 73 surrounding the inner convex portion 72, a first maintaining portion 74 for maintaining the arrangement member 62 at the first position F1, a changing portion 75, a movement portion 76 for moving the arrangement member 62, a second maintaining portion 77 for maintaining the arrangement member 62 at the second position F2, and a release portion 78.

The inner convex portion 72 is a circular convex portion formed inward in the radial direction of the movement member 70. The outer convex portion 73 is a circular convex portion formed outward in the radial direction of the movement member 70, and is formed outside the inner convex portion 72 on one face of the movement member 70. A center of the inner convex portion 72 and that of the outer convex portion 73 are aligned with an axis line (rotation center) of the movement member 70, and the outer convex portion 73 is formed to have a larger diameter than that of the inner convex portion 72. The first maintaining portion 74 includes a circular pathway between the inner convex portion 72 and the outer convex portion 73 (second maintaining portion 77). In the first maintaining portion 74, the arrangement member 62 (contact portion 62C) is arranged in vicinity of the inner convex portion 72 without contacting with the inner convex portion 72, and relatively moves along the inner convex portion 72.

FIGS. 17A to 19B illustrate actions of the arrangement member 62 by the rotation of the movement member 70, and illustrate the retractor 1 in the same way as that in FIG. 14. Furthermore, FIG. 17C is a cross-sectional view of the retractor 1 taken along the line X3-X3 illustrated in FIG. 17B viewed in an arrow direction. FIG. 18B is a cross-sectional view of the retractor 1 taken along the line X4-X4 illustrated in FIG. 18A viewed in an arrow direction.

As illustrated in FIGS. 17A to 19B, when the winding drum 10 is rotated in the drawing-out direction "P" or the winding direction "M" by the drawing-out or winding of the webbing 2, the movement member 70 is rotated in the opposite direction of the rotational direction of the winding drum 10 by the deceleration mechanism 80. Furthermore, by the rotation of the movement member 70, the arrangement member 62 relatively moves in a circumferential direction of the movement member 70, and also relatively moves along each of the portions 74 to 77 of the movement member 70.

Figure 17A:
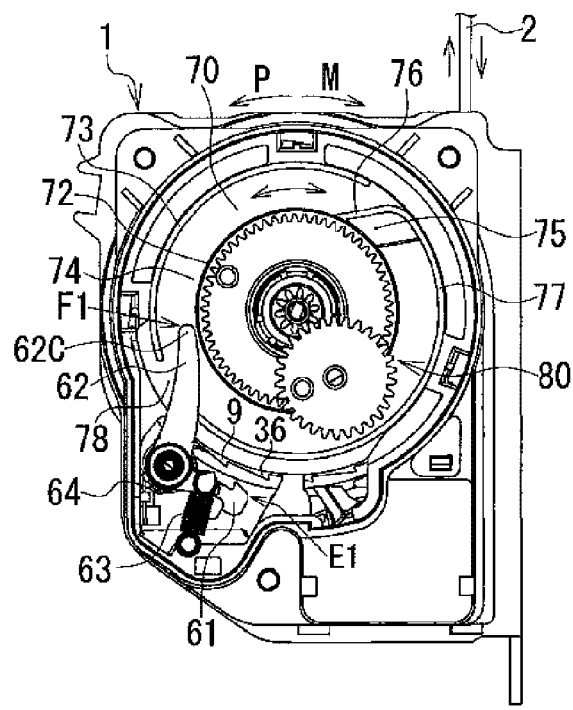
FIGS. 17A to 17C illustrate actions of the arrangement member by rotation of a movement member.
Figure 17B:
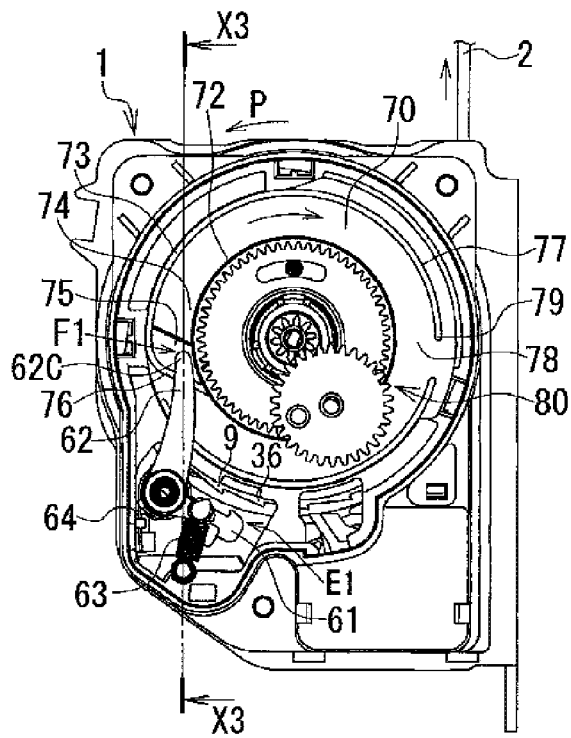
Figure 17C:
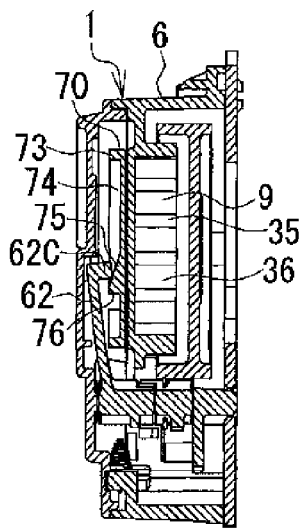

When the webbing 2 is completely wound onto the winding drum 10, the contact portion 62C of the arrangement member 62 is arranged at the first maintaining portion 74 (refer to FIG. 17A). Therefore, the arrangement member 62 is maintained at the first position F1, and thus the operation member 61 is maintained at the non-operation position E1. In the state described above, when the movement member 70 is rotated by the drawing-out of the webbing 2, the arrangement member 62 (contact portion 62C) relatively moves along the first maintaining portion 74. Furthermore, by the drawing-out and winding of the webbing 2, the arrangement member 62 is relatively moved in the circumferential direction of the movement member 70 in the first maintaining portion 74. Until the webbing 2 is drawn out by a predetermined length (predetermined drawing-out length) from the winding drum 10, the contact portion 62C is arranged in the first maintaining portion 74, and the arrangement member 62 is maintained at the first position F1 by the first maintaining portion 74. As a result, the state of the locking mechanism 9 is maintained in the waiting state, and thus the state of the retractor 1 is maintained in the ELR state.

When the predetermined length of the webbing 2 is drawn out from the winding drum 10 (refer to FIGS. 17B and 17C), the arrangement member 62 is relatively displaced along the changing portion 75, and the changing portion 75 changes a position of the arrangement member 62 from the first maintaining portion 74 to a movement position by the movement portion 76. The movement position by the movement portion 76 is a position where the arrangement member 62 becomes able to move by the movement portion 76. After the arrangement member 62 moves to the movement position, the arrangement member 62 is moved by the movement portion 76. Here, the changing portion 75 is an inclined surface inclining from the first maintaining portion 74 to a leading end of the movement portion 76, and is formed at a terminal portion of the first maintaining portion 74.

By the rotation of the movement member 70 when the webbing 2 is drawn out, the contact portion 62C of the arrangement member 62 comes into contact with the changing portion 75 to thereby relatively move to the movement portion 76. Therefore, the arrangement member 62 is elastically deformed to be thereby displaced in a direction in which the arrangement member 62 separates away from the movement member 70 along the changing portion 75. Subsequently (refer to FIGS. 18A and 18B), the arrangement member 62 gets over the movement portion 76 to recover into an original shape, and then, is arranged to a position where the contact portion 62C can come into contact with the movement portion 76. As described above, the changing portion 75 elastically deforms the arrangement member 62 to thereby change the position of the arrangement member 62 from the first maintaining portion 74 to the movement position by the movement portion 76. Furthermore, when the position of the arrangement member 62 is moved to the movement position, the arrangement member 62 recovers into the original shape. Here, when the webbing 2 is completely drawn out from the winding drum 10, the changing portion 75 changes the position of the arrangement member 62 from the first maintaining portion 74 to the movement position by the movement portion 76. Therefore, until the webbing 2 is completely drawn out from the winding drum 10, the arrangement member 62 is maintained at the first position F1 by the first maintaining portion 74.

Figure 18A:
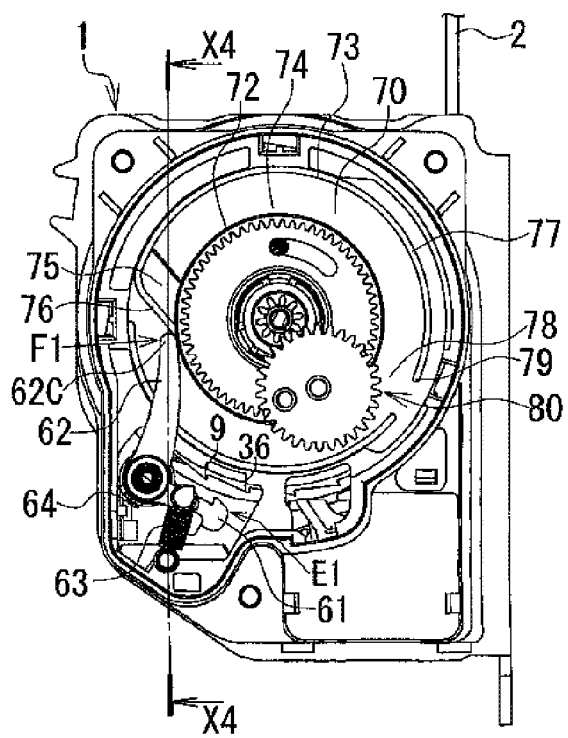
FIGS. 18A to 18C illustrate actions of the arrangement member by the rotation of the movement member.
Figure 18B:
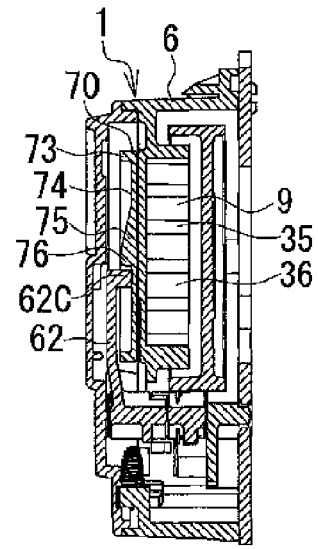
Figure 18C:
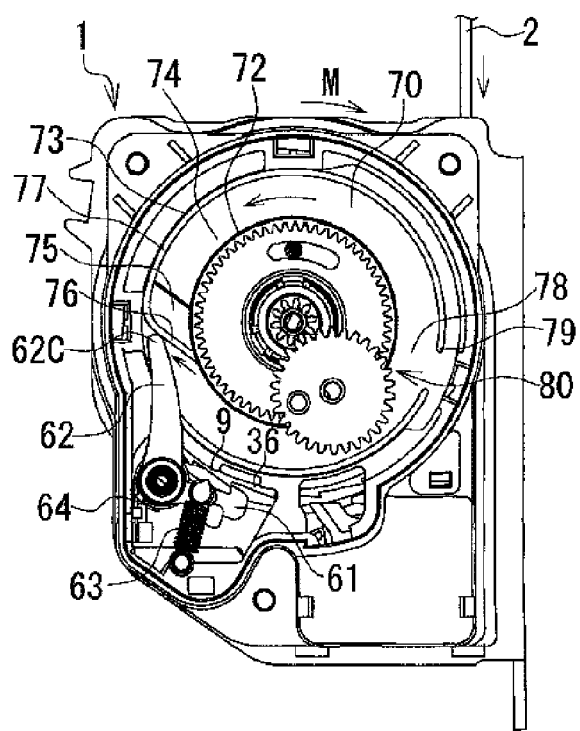
Figure 19A:
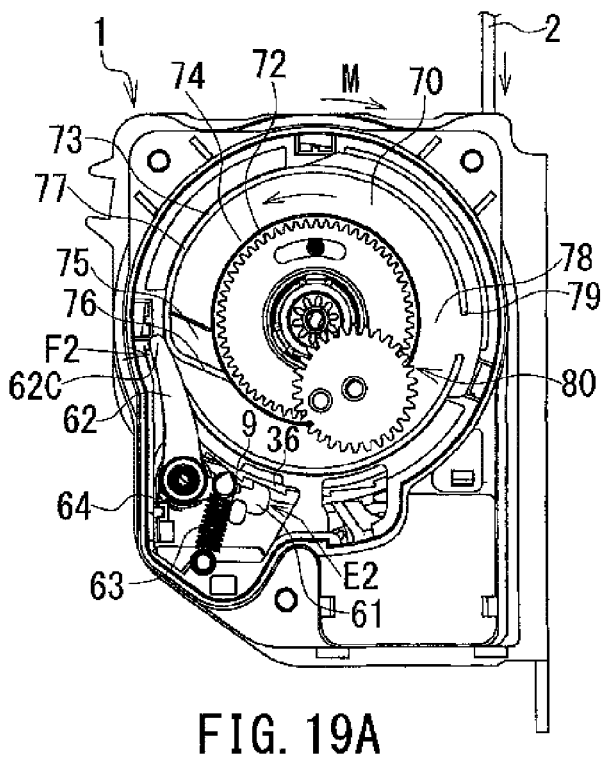
FIGS. 19A and 19B illustrate actions of the arrangement member by the rotation of the movement member.
Figure 19B:
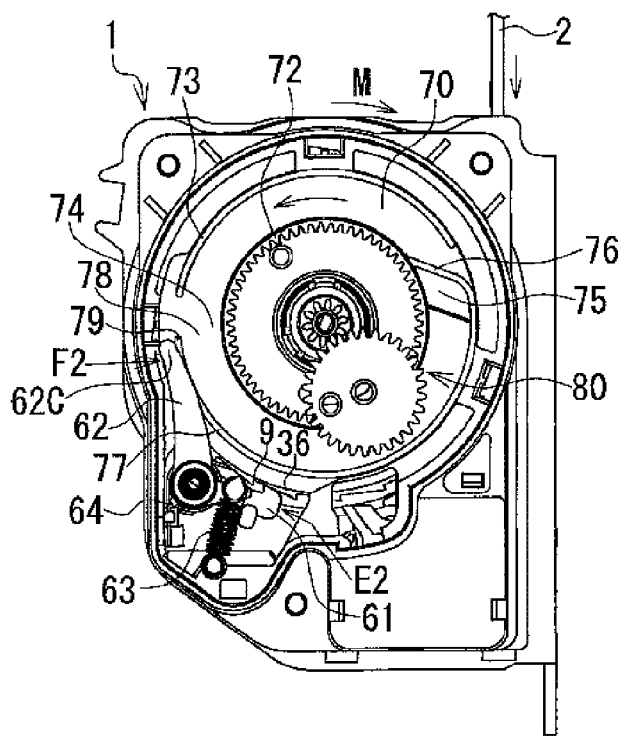

When the webbing 2 is wound onto the winding drum 10 after the predetermined length of the webbing being drawn out from the winding drum, by the rotation of the movement member 70, the movement portion 76 of the movement member 70 moves the arrangement member 62 from the first position F1 to the second position F2 (refer to FIG. 18C). The movement portion 76 includes an inclined portion that inclines toward the second maintaining portion 77, and is formed from the inner convex portion 72 to the outer convex portion 73 (second maintaining portion 77). By the rotation of the movement member 70 when the webbing 2 is wound, the arrangement member 62 comes into contact with the movement portion 76, and gradually moves along the movement portion 76, and then is guided, by the movement portion 76, from the first position F1 to the second position F2. Therefore, the movement portion 76 also functions as a guide portion for guiding the arrangement member 62 from the first position F1 to the second position F2.

Here, the movement portion 76 includes an inclining convex portion inclining from the movement position by the movement portion 76 toward the second maintaining portion 77 with respect to the rotational direction of the movement member 70 and is connected to a front end portion of the second maintaining portion 77. Further, when the webbing 2 completely drawn out from the winding drum 10 is wound onto the winding drum 10, the movement portion 76 moves the arrangement member 62. At this time, in a state where the contact portion 62C of the arrangement member 62 is pressed to the movement portion 76 by the urging force of the first urging means 63, the contact portion 62C thereof is guided by the movement portion 76 to move toward the second maintaining portion 77. Therefore, the arrangement member 62 moves outward in the radial direction of the movement member 70 and, thus, moves from the first position F1 to the second position F2 (refer to FIG. 19A). At the same time, the operation member 61 moves from the non-operation position E1 to the operation position E2 to switch the state of the retractor 1 from the ELR state to the ALR state. When the operation member 61 moves, the state of the locking mechanism 9 is switched from the waiting state to the operation state, and thus the state of the retractor 1 is switched to the ALR state.

The second maintaining portion 77 includes a circular-arc portion formed in a circular-arc shape, with the axis line of the winding drum 10 as a center, outward in a radial direction of the first maintaining portion 74, and surrounds a part of the first maintaining portion 74. While the webbing 2 is wound onto the winding drum 110 after the predetermined length of the webbing being drawn out from the winding drum, the arrangement member 62 comes into contact with the second maintaining portion 77, and is maintained by the second maintaining portion 77 at the second position F2. Here, the second maintaining portion 77 includes a circular-arc shaped convex portion including a part of the outer convex portion 73, and is formed in a predetermined length along the circumferential direction of the movement member 70. Since apart of the outer convex portion 73 does not exist at a portion where the movement portion 76 and the second maintaining portion 77 are connected to each other, the contact portion 62C of the arrangement member 62 smoothly moves from the movement portion 76 to the second maintaining portion 77. Furthermore, the contact portion 62C comes into contact with the second maintaining portion 77, and is pressed to the second maintaining portion 77 by the urging force of the first urging means 63. When the contact portion 62C is pressed by the second maintaining portion 77, the arrangement member 62 is held by the second maintaining portion 77 accordingly. Therefore, while the webbing 2 completely drawn is being wound, the arrangement member 62 is maintained at the second position F2.

When the arrangement member 62 is maintained at the second position F2, the operation member 61 is maintained at the operation position E2. As a result, the state of the retractor 1 is maintained in the ALR state, and the locking mechanism 9 stops the rotation of the winding drum 10 only in the drawn out direction "P". The state of the locking mechanism 9 is maintained in the operation state. By the rotation of the movement member 70 when the webbing 2 is wound, the arrangement member 62 (contact portion 62C) moves relatively along the second maintaining portion 77, and further, moves relatively toward a terminal portion 79 of the second maintaining portion 77 and the release portion 78 of the movement member 70 (refer to FIG. 19B). The second maintaining portion 77 maintains the arrangement member 62 at the second position F2 until the webbing 2 is wound onto the winding drum 10 by a predetermined length (predetermined winding length). Further, when the webbing 2 is wound onto the winding drum 10 by the predetermined length, the arrangement member 62 comes off the terminal portion 79 of the second maintaining portion 77 and, then, is released toward the first maintaining portion 74 by the release portion 78. The arrangement member 62 comes off the terminal portion 79 before the webbing 2 is completely wound onto the winding drum 10.

Since a part of the outer convex portion 73 is not arranged at the terminal portion 79 of the second maintaining portion 77, the contact portion 62C of the arrangement member 62 comes off the second maintaining portion 77 after the contact portion 62C thereof reaches the terminal portion 79. Therefore, the contact portion 62C is released from the state where the contact portion 62C is pressed by the second maintaining portion 77 and, thus, the arrangement member 62 is released from the second maintaining portion 77. The release portion 78 of the movement member 70 is a portion continuing to the terminal portion 79 and includes a release region formed from the second maintaining portion 77 to the first maintaining portion 74. At the release portion 78, the arrangement member 62 moves from the second maintaining portion 77 to the first maintaining portion 74 inward in the radial direction of the movement member 70 without coming into contact with the movement member 70.

When the webbing 2 is wound onto the winding drum 10 by the predetermined length and the arrangement member 62 comes off the terminal portion 79 of the second maintaining portion 77, the release portion 78 releases the arrangement member 62 from the second maintaining portion 77 toward the first maintaining portion 74 (refer to FIG. 14). By this release, the arrangement member 62 instantly moves from the second maintaining portion 77 (second position F2) to the first maintaining portion 74 (first position F1) by the urging force of the first urging means 63. At the same time, the operation member 61 moves from the operation position E2 to the non-operation position E1, and the state of the retractor 1 is switched from the ALR state to the ELR state. At this time, when the operation member 61 moves, the state of the locking mechanism 9 is switched from the operation state to the waiting state and, then, the state of the retractor 1 is switched to the ELR state. Subsequently, the webbing 2 is wound onto the winding drum 10, or drawn out from the winding drum 10.

As described above, according to the retractor 1 of the first embodiment, the arrangement member 62 released at the release portion 78 can instantly move the operation member 61 from the operation position E2 to the non-operation position E1. By this movement, the state of the retractor 1 can be instantly switched from the state where the webbing 2 can be only wound (ALR state) to the state where the webbing 2 can be wound and drawn out (ELR state).

When the state is switched, the retractor 1 can be prevented from becoming unstable state. Further, since the webbing 2 does not need to be wound while the state is switched, the ALR state can be promptly switched to the ELR state.

The changing portion 75 of the movement member 70 can correctly change the position of the arrangement member 62. Further, along with the rotation of the movement member 70, the arrangement member 62 can be securely arranged to the movement position by the movement portion 76. Since the movement portion 76 including the inclination portion guides the arrangement member 62, the arrangement member 62 can smoothly move from the first position F1 to the second position F2.

The movement member 70 is rotated at the rotational speed slower than that of the winding drum 10 through the deceleration mechanism 80 so that the actions of the movement member 70 and the arrangement member 62 can be simplified. Further, along with a method for moving the arrangement member 62 and timing for switching the state of the retractor 1, the movement member 70 can be rotated.

By the second urging means 64, as adjusting the position of the operation member 61 with respect to the locking mechanism 9 (Here, ratchet wheel 36), the operation member 61 can be securely maintained at the operation position E2. Since the operation member 61 and the arrangement member 62 are mounted to the one rotational shaft 6K, the number of the rotational shafts of the operation member 61 and the arrangement member 62, and space for arranging the rotational shafts can be reduced.

As to the switching means 60 for switching the state of the retractor 1 (refer to FIG. 14), in a state where the arrangement member 62 is maintained at the first position F1, the urging force of the first urging means 63 may be set larger than that of the second urging means 64. In this case, the contact portion 62C of the arrangement member 62 is in contact with the inner convex portion 72 at the first maintaining portion 74, and pressed by the inner convex portion 72. The arrangement member 62 is entirely formed of elastically-deformable material (e.g., synthetic resin), and the arm portion 62B that is a part of the arrangement member 62 is elastically deformable by the changing portion 75. In contrast to this, a component different from that of other portions of the arrangement member 62 may be used only for the arm portion 62B. In this case, the arm portion 62B is formed of the elastically-deformable material (e.g., synthetic resin, or a plate made of stainless steel), and fixed to the arrangement member 62. Further, when the arrangement member 62 is displaced relatively along the changing portion 75, the arrangement member 62 may not be elastically deformable but the movement member 70 may be elastically deformable.

The operation member 61 may be an elastically-deformable member. In this case, for example, when the operation member 61 moves to the operation position E2, the operation member 61 is pressed by the teeth 35 of the ratchet wheel 36 to be elastically deformed. At this time, the operation member 61 is urged toward the operation position E2 by an elastic force. Therefore, since the operation member 61 itself serves as urging means, the second urging means 64 does not need to be provided separately, and thus the number of the components can be reduced. Further, the operation member 61 and the arrangement member 62 may be integrally formed to reduce the number of the components. In this case also, the operation member 61 is elastically deformed to be urged toward the operation position E2.

Until the webbing 2 is drawn out from the winding drum 10 by the predetermined length, the first maintaining portion 74 of the movement member 70 maintains the arrangement member 62 at the first position F1. The predetermined length of the webbing 2 can be set to be an arbitrary length. Therefore, the predetermined length may be an entire length of the webbing 2 or a length shorter than the entire length.

The deceleration mechanism 80 is not limited to an example of the first embodiment but a known deceleration mechanism can be used. Further, the meshing pawl 61C may not be formed on the operation member 61 but may be formed as a component different from the operation member 61. In this case, the operation member 61 moves the meshing pawl 61C to the non-mesh position or the mesh position. The operation member 61 and the arrangement member 62 may be mounted to different rotational shafts, and rotated by interlocking with each other. Therefore, arrangement space of the operation member 61 and the arrangement member 62 in the shaft direction of the rotational shaft can be reduced.

Second Embodiment

Next, a retractor of a second embodiment will be described. As to the retractor of the second embodiment, the same terms used for the configurations of the retractor 1 of the first embodiment are used for corresponding configurations of the second embodiment.

Figure 20:
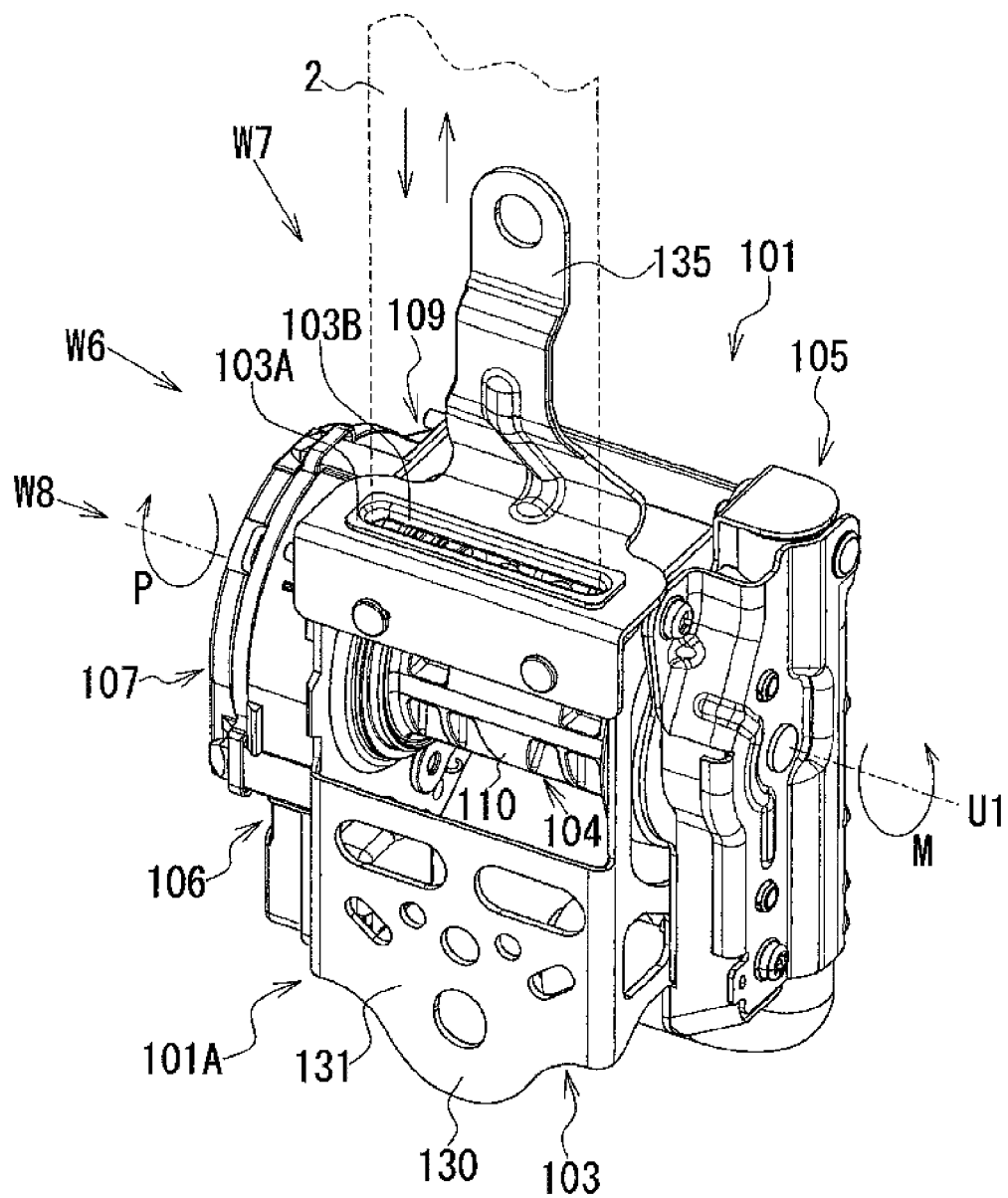
FIG. 20 is a perspective view of a seat belt retractor of a second embodiment.
Figure 21:
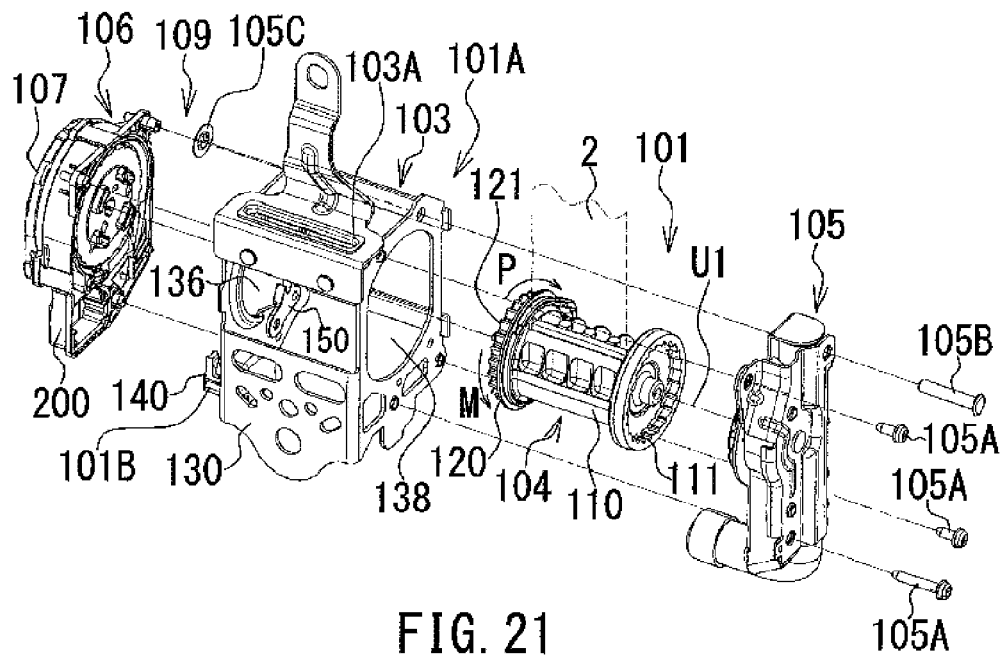
FIG. 21 is a perspective view of the seat belt retractor that is exploded.
Figure 22:
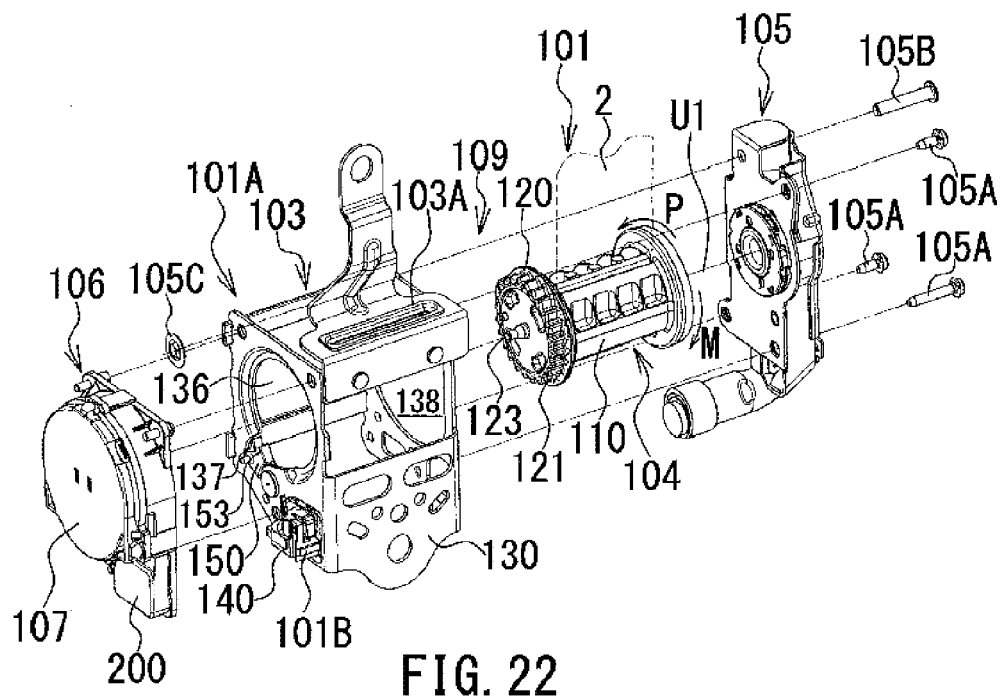
FIG. 22 is a perspective view of the seat belt retractor that is exploded.

FIG. 20 is a perspective view of a retractor 101 of the second embodiment. FIGS. 21 and 22 are perspective views of the retractor 101 that is exploded into a plurality of units, and illustrate the retractor 101 viewed in the different directions from each other. FIG. 21 illustrates the retractor 101 viewed in the same direction as that illustrated in FIG. 20, and FIG. 22 illustrates the retractor 101 viewed in a W6 direction illustrated in FIG. 20. FIGS. 20 to 22 show, by dotted lines, the webbing 2 in a band-like shape.

As illustrated in FIGS. 20 to 22, the retractor 101 includes a housing unit 103, a winding drum unit 104 including a winding drum 110, a pretensioner unit 105, a mechanism cover unit 106, and a winding spring unit 107. An end portion of the webbing 2 is mounted to the winding drum 110 and the webbing 2 is wound on an outer circumference of the winding drum 110. The winding drum 110 is formed of aluminum alloy and the like.

In a state where the winding drum 110 is arranged in the housing unit 103, the pretensioner unit 105 and the mechanism cover unit 106 are arranged outside of the winding drum 110 in a drum shaft direction, and fixed onto a side face of the housing unit 103. The drum shaft direction is a direction of an axis line U1 of the winding drum 110, and the outside in the drum shaft direction is the outside with reference to the winding drum 110 in the drum shaft direction. The pretensioner unit 105 and the mechanism cover unit 106 cover both end portions of the winding drum unit 104 in the drum shaft direction on the outside of the housing unit 103, and rotatably support the winding drum unit 104. The winding spring unit 107 is fixed onto the mechanism cover unit 106, and covers an end face of the mechanism cover unit 106 on the outside in the drum shaft direction.

The retractor 101 includes the housing unit 103, the pretensioner unit 105, and a support body 101A including the mechanism cover unit 106. The support body 101A is mounted to the vehicle, and rotatably supports the winding drum 110 in the winding direction "M" and the drawing-out direction "P" of the webbing 2. The winding direction "M" is a rotational direction of the winding drum 110 when the webbing 2 is wound, and the drawing-out direction "P" is a rotational direction thereof when the webbing 2 is drawn out.

By winding and drawing-out of the webbing 2, the winding drum 110 rotates in the winding direction "M" and the drawing-out direction "P" about the axis line U1 in a state of being supported by the support body 101A. The winding drum unit 104 includes a ratchet gear 120 formed of steel or zinc alloy and, normally, rotates integrally with the winding drum 110. The winding spring unit 107 is an urging mechanism for urging the winding drum 110 (winding drum unit 104) in the winding direction "M", and winding means for winding the webbing 2 onto the winding drum 110. The winding spring unit 107 rotates the winding drum 110 in the winding direction "M". The webbing 2 is wound onto the rotating winding drum 110 and stored in the retractor 101. From the state described above, the webbing 2 is drawn out from the retractor 101 while the winding drum 110 is being rotated in the drawing-out direction "P".

The mechanism cover unit 106 is adjacent to the ratchet gear 120 of the winding drum unit 104, and is included in a locking mechanism 109 for stopping the rotation of the winding drum 110 together with the ratchet gear 120. The locking mechanism 109 is locking means for locking the winding drum 110 rotating in the drawing-out direction "P". In response to the sudden drawing-out of the webbing 2 or the sudden speed change of the vehicle, the locking mechanism 109 is operated. The locking mechanism 109 stops the rotation of the winding drum 110 in the drawing-out direction "P" to stop the drawing-out of the webbing 2. At this time, teeth 121 (ratchet teeth) of the ratchet gear 120 stop the rotation of the ratchet gear 120 to stop the rotation of the winding drum unit 104 and the winding drum 110.

The pretensioner unit 105 rotates the winding drum 110 in the winding direction "M" in the emergency (e.g., clash) of the vehicle. Therefore, the webbing 2 is wound onto the winding drum 110 and, thus, slack of the webbing 2 is removed. The pretensioner unit 105 is fixed to the housing unit 103 with a plurality of screws 105A and, further, fixed onto the housing unit 103 with a pair of a stopper pin 105B and a push nut 105C.

Figure 23:
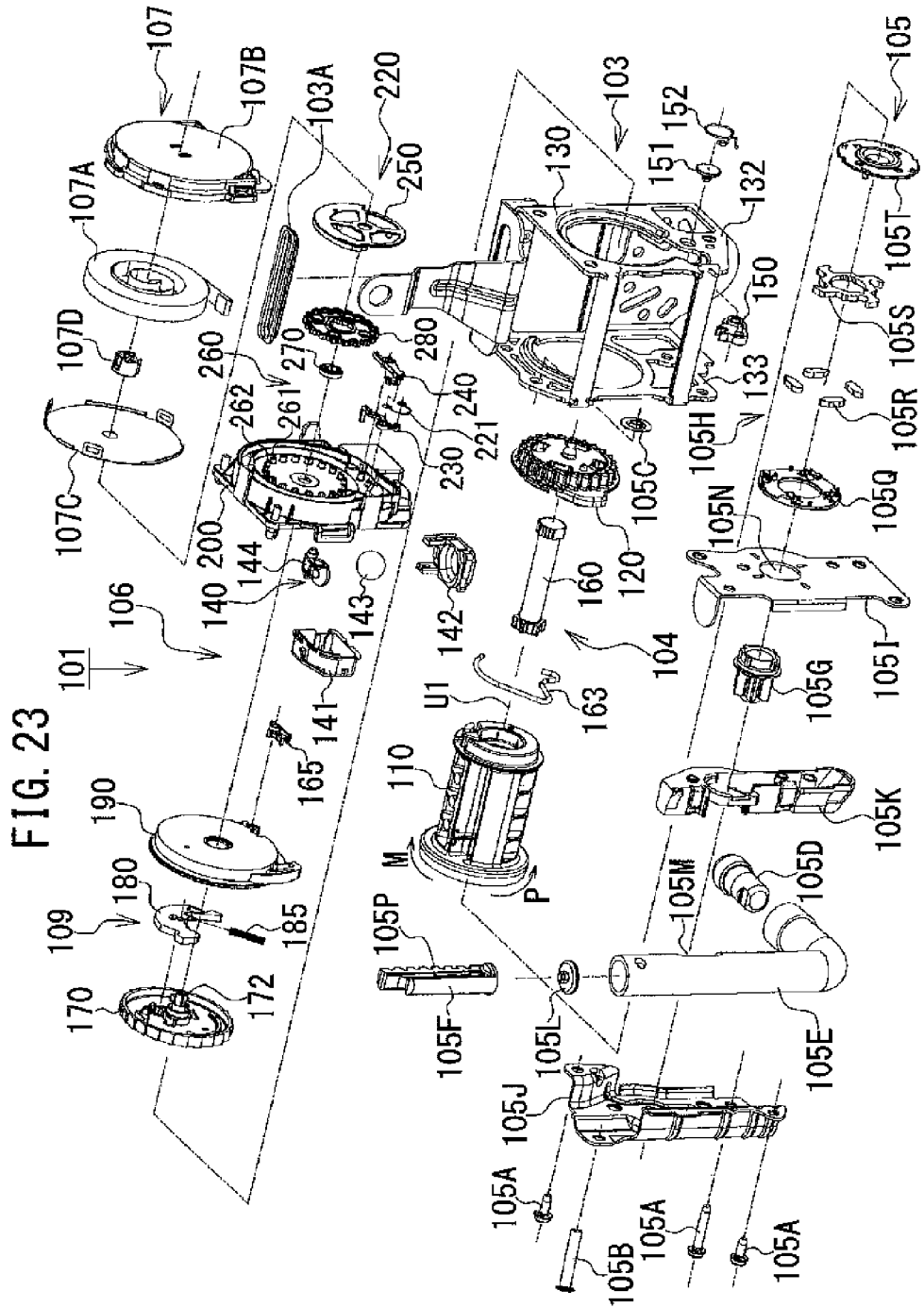
FIG. 23 is a perspective view of the seat belt retractor that is completely exploded.

FIG. 23 is a perspective view of the retractor 101 that is completely exploded, and illustrates the retractor 101 viewed from an opposite side (in a W7 direction) of that illustrated in FIG. 20.

As illustrated in FIG. 23, when a plurality of components is combined with each other, units 103 to 107 of the retractor 101 are assembled. In addition, when a plurality of units 103 to 107 is assembled, the retractor 101 can be manufactured. Hereinafter, each portion of the retractor 101 will be sequentially described in detail.

Figure 24:
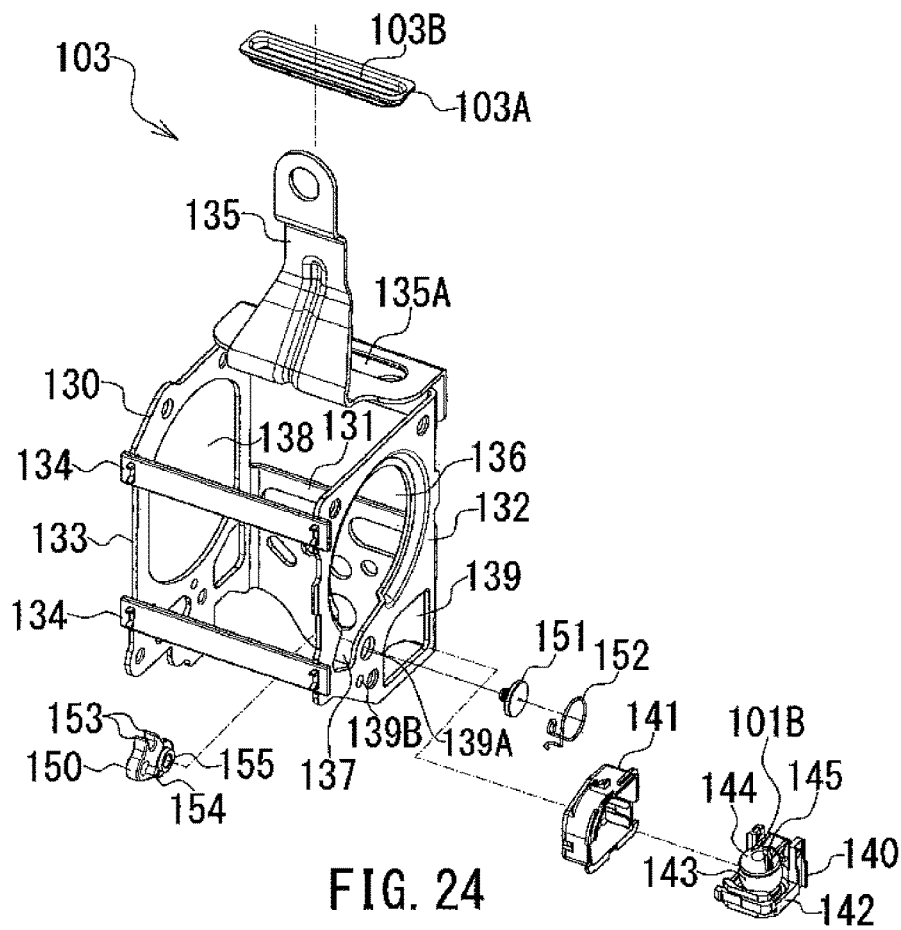
FIG. 24 is a perspective view of a housing unit that is exploded.

FIG. 24 is a perspective view of the housing unit 103 that is exploded, and illustrates the housing unit 103 viewed in the same direction as that illustrated in FIG. 23.

As illustrated in FIG. 24, the housing unit 103 includes a housing 130 storing the winding drum 110, a protector 103A, an acceleration sensor 140, a sensor cover 141 for covering the acceleration sensor 140, a movable pawl 150 for engaging with the ratchet teeth 121 of the ratchet gear 120, a pawl rivet 151, and a return spring 152. The housing 130 and the movable pawl 150 are formed of steel and the like, and the protector 103A is formed of a synthetic resin. The acceleration sensor 140 is a first acceleration detection mechanism 101B (acceleration detection mechanism of a vehicle) for detecting the acceleration of the vehicle.

The housing 130 includes a back-plate portion 131 to be fixed to a car body, a pair of side wall portions 132 and 133 protruding from each of both side edge portions of the back-plate portion 131 (a first side wall portion 132 and a second side wall portion 133), two fixed plates 134 fixed to the pair of the side wall portions 132 and 133, and a bracket 135 mounted to the back-plate portion 131. The bracket 135 is formed of steel and the like. The protector 103A includes a passage hole 103B for the webbing 2, and is mounted to a mounting hole 135A of the bracket 135. The webbing 2 is caused to go through the passage hole 103B of the protector 103A, and passes therethrough at the time of winding or drawing-out.

The housing 130 includes a first opening portion 136 formed in the first side wall portion 132, a pawl storage portion 137 connected to the first opening portion 136, and a second opening portion 138 formed in the second side wall portion 133. When the winding drum 110 is stored in the housing 130, the ratchet gear 120 is arranged in the first opening portion 136, and one end portion of the winding drum 110 is arranged in the second opening portion 138. In the state described above, the mechanism cover unit 106 is mounted onto the first side wall portion 132, and the pretensioner unit 105 is mounted onto the second side wall portion 133.

The acceleration sensor 140 is an emergency locking operation device for detecting the acceleration of the vehicle to thereby operate the locking mechanism 109 when the vehicle encounters an emergency, and includes a sensor holder 142, an inertia mass body 143, and a sensor lever 144. The sensor holder 142 and the sensor lever 144 are formed of a synthetic resin. The inertia mass body 143 includes a sphere made of metal, is arranged in a concave portion of the sensor holder 142, and is movably held between the sensor holder 142 and the sensor lever 144. The sensor lever 144 covers the inertia mass body 143 from above, and is movably mounted to the sensor holder 142, in a vertical direction.

The acceleration sensor 140 is inserted into the sensor cover 141, and the sensor holder 142 is mounted to the sensor cover 141. The sensor cover 141 is inserted into a mounting hole 139 of the first side wall portion 132, and mounted onto the first side wall portion 132. In the state described above, a lock claw 145 of the sensor lever 144 protrudes upward, and is positioned outside the sensor cover 141. When the acceleration of the vehicle exceeds a predetermined acceleration in an emergency state of the vehicle (for example, crash or sudden braking), the inertia mass body 143 is moved above the sensor holder 142 by an inertia force to thereby press the sensor lever 144 upward. When the inertia mass body 143 moves, the acceleration sensor 140 detects the acceleration of the vehicle. The lock claw 145 of the sensor lever 144 is pressed by the inertia mass body 143 to thereby move upward.

The movable pawl 150 includes engagement teeth 153 for engaging with the ratchet teeth 121, an interlocking pin 154 formed at one end portion of the movable pawl 150, and a boss 155 in a cylindrical shape formed at other end portion of the movable pawl 150. The boss 155 is inserted into a mounting hole 139A of the first side wall portion 132 from an inside of the housing 130, and is rotatably mounted onto the first side wall portion 132 with the use of the pawl rivet 151. The return spring 152 includes a screw coil spring, and is arranged so as to surround a head portion of the pawl rivet 151. One end portion of the return spring 152 is mounted to the interlocking pin 154, and other end portion of the return spring 152 is mounted into a mounting hole 139B of the first side wall portion 132. The movable pawl 150 is urged by the return spring 152 toward the pawl storage portion 137, and stored in the pawl storage portion 137. The interlocking pin 154 protrudes from the movable pawl 150 to the outside of the housing 130.

The locking mechanism 109 is coupled with the interlocking pin 154, and the interlocking pin 154 moves the movable pawl 150. Therefore, the movable pawl 150 rotates about the boss 155, and moves in an inward/outward direction of the pawl storage portion 137. By a rotational movement, the movable pawl 150 separates away from the ratchet gear 120 (refer to FIG. 22), or gets closer to the ratchet gear 120. Furthermore, the movable pawl 150 moves between a non-locking position (position inside the pawl storage portion 137) where the engagement teeth 153 do not engage with the ratchet teeth 121 and the locking position (position outside the pawl storage portion 137) where the engagement teeth 153 engage therewith. When the movable pawl 150 moves to the locking position, the engagement teeth 153 engage with the ratchet teeth 121 of the ratchet gear 120.

Figure 25:
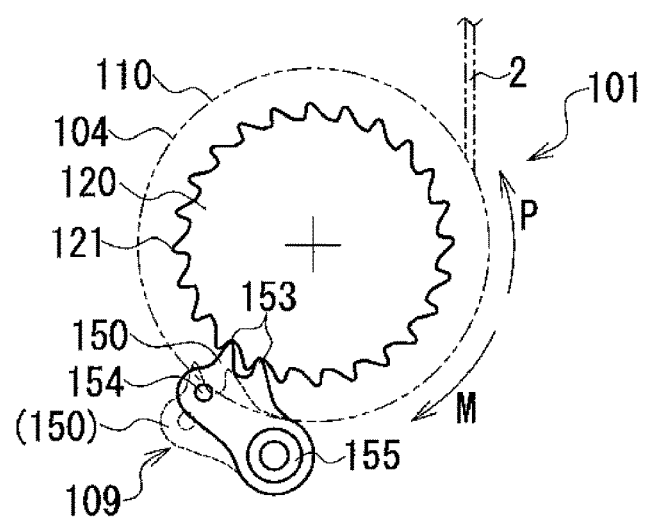
FIG. 25 is aside view schematically illustrating a movable pawl and a ratchet gear.

FIG. 25 is a side view schematically illustrating the movable pawl 150 and the ratchet gear 120. Furthermore, FIG. 25 illustrates, by the solid lines, the movable pawl 150 moved to the locking position, and illustrates, by the dotted lines, the movable pawl 150 moved to the non-locking position.

As illustrated in FIG. 25, when the engagement teeth 153 engage with the ratchet teeth 121, the movable pawl 150 moves toward the locking position, and thus the engagement teeth 153 engage with the ratchet teeth 121. Accordingly, the movable pawl 150 engages with the ratchet gear 120. The movable pawl 150 stops the rotation of the ratchet gear 120 in the drawing-out direction "P" to lock the ratchet gear 120 with the winding drum 110. Therefore, the movable pawl 150 forms a part of the locking mechanism 109 and stops the rotation of the winding drum 110 in the drawing-out direction "P".

The movable pawl 150 and the ratchet gear 120 engage with each other only when the winding drum 110 rotates in the drawing-out direction "P", and the ratchet teeth 121 and the engagement teeth 153 are inclined so as to stop the rotation of the ratchet gear 120 only in the drawing-out direction "P". When the engagement teeth 153 come off the ratchet teeth 121, the movable pawl 150 and the ratchet gear 120 are disengaged. The movable pawl 150 is always urged toward the non-locking position in the pawl storage portion 137 by the return spring 152. Therefore, by the disengagement, the movable pawl 150 separates away from the ratchet gear 120 to move to the non-locking position, and is stored in the pawl storage portion 137. At the same time, locks of the ratchet gear 120 and the winding drum 110 are released, and the drawing-out and winding of the webbing 2 become possible.

Figure 26:
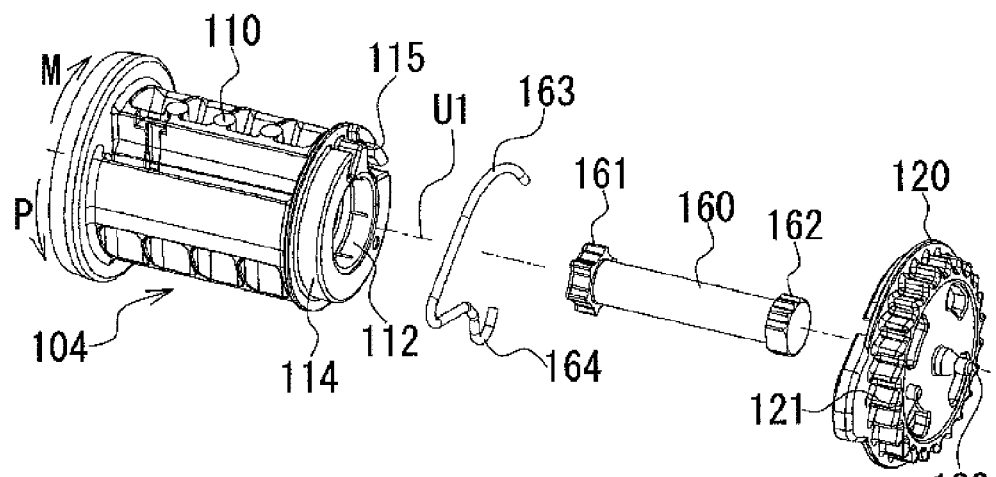
FIG. 26 is a perspective view of a winding drum unit that is exploded.
Figure 27:
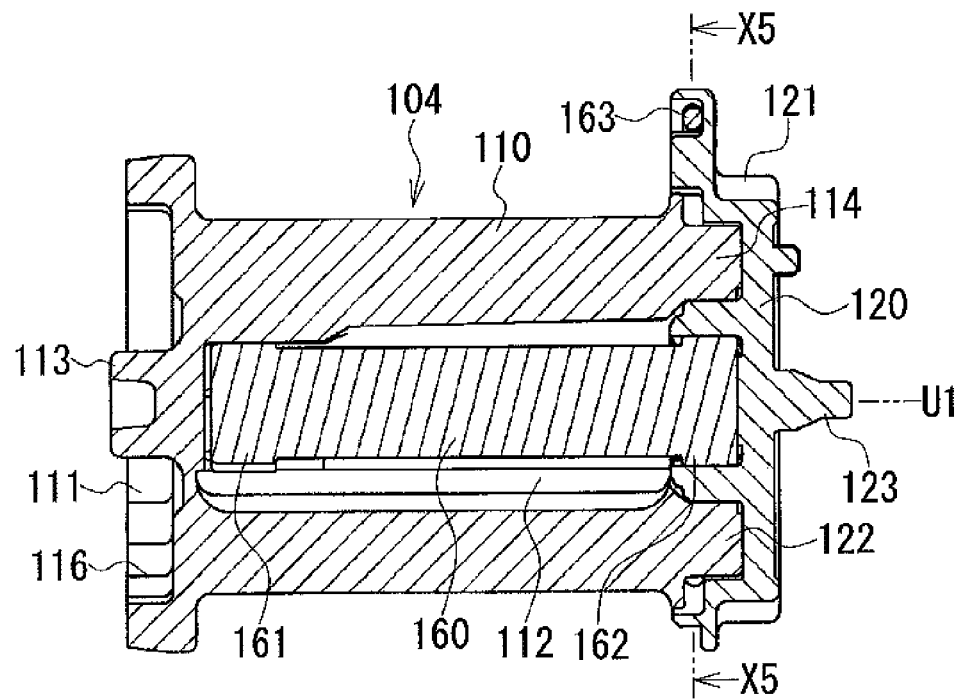
FIG. 27 is a cross-sectional view of the winding drum unit.

FIG. 26 is a perspective view of the winding drum unit 104 that is exploded, and illustrates a part of FIG. 23. FIG. 27 is a cross-sectional view of the winding drum unit 104, and illustrates the winding drum unit 104 taken on a face including the axis line U1.

As illustrated in FIG. 27, the winding drum unit 104 includes the ratchet gear 120 in a disk-like shape, the winding drum 110 rotatable in the winding direction "M" and the drawing-out direction "P" of the webbing 2, and a torsion bar 160 in a columnar shape, and a wire 163. The ratchet gear 120 includes a plurality of ratchet teeth 121 formed over its entire outer circumference, a circular concave portion 122 formed on the winding drum 110 side, and a shaft portion (ratchet shaft portion) 123 protruding from a center portion.

The winding drum 110 includes an internal gear 111 formed at the one end portion, a shaft hole portion 112 formed along the axis line U1, a boss 113 in a cylindrical shape, a circular portion 114 formed at the other end portion, and a fixed portion 115 formed on the circular portion 114. A plurality of teeth 116 of the internal gear 111 is formed over an entire inner circumference of the internal gear 111 and protrudes inward from the internal gear 111. The shaft hole portion 112 closes at the one end portion of the winding drum 110, and opens at the other end portion thereof. The boss 113 is formed at a center of the one end portion of the winding drum 110. The ratchet shaft portion 123 and the boss 113 are positioned at the axis line U1 of the winding drum 110, and the winding drum unit 104 is rotatably supported by the ratchet shaft portion 123 and the boss 113. The circular portion 114 is a small diameter portion that is thinner than other portions of the winding drum 110. One end portion 164 of the wire 163 is fitted into the fixed portion 115 of the circular portion 114 to be fixed to the fixed portion 115. In the state described above, the wire 163 is arranged around the circular portion 114.

The torsion bar 160 is inserted into the shaft hole portion 112 of the winding drum 110 to thereby be arranged in the shaft hole portion 112. Furthermore, the torsion bar 160 is formed of steel for example, and includes splines 161 and 162. One spline 161 is formed at the one end portion of the torsion bar 160, and fixed to one end portion of the winding drum 110 in the shaft hole portion 112. Other spline 162 is formed at other end portion of the torsion bar 160, and fixed to the center portion of the ratchet gear 120. The ratchet gear 120 is fixed to the torsion bar 160, and mounted to the winding drum 110. The circular portion 114 of the winding drum 110 is stored in the circular concave portion 122 of the ratchet gear 120. The wire 163 is a linear material (for example, linear material made of steel), is housed in the circular concave portion 122 together with the circular portion 114, and is arranged in the ratchet gear 120.

Figure 28:
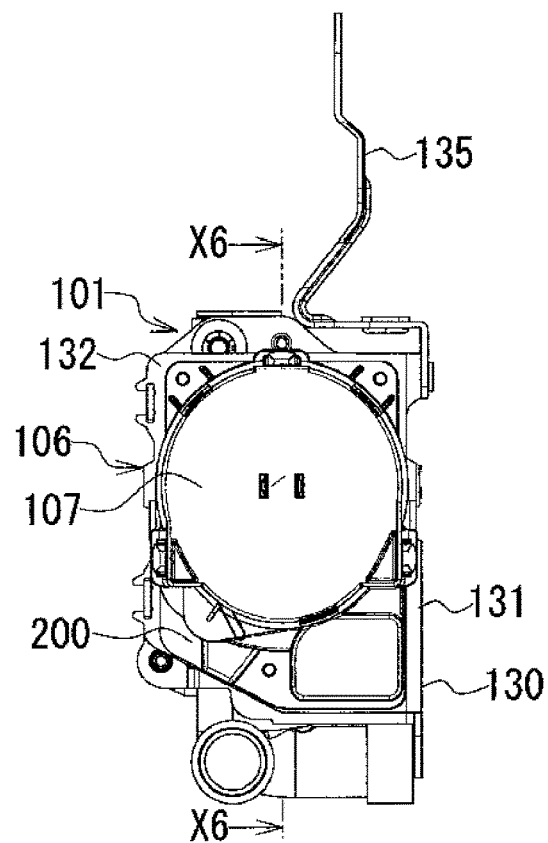
FIG. 28 is a side view of the seat belt retractor viewed in an arrow W8 direction illustrated in FIG. 20.
Figure 29:
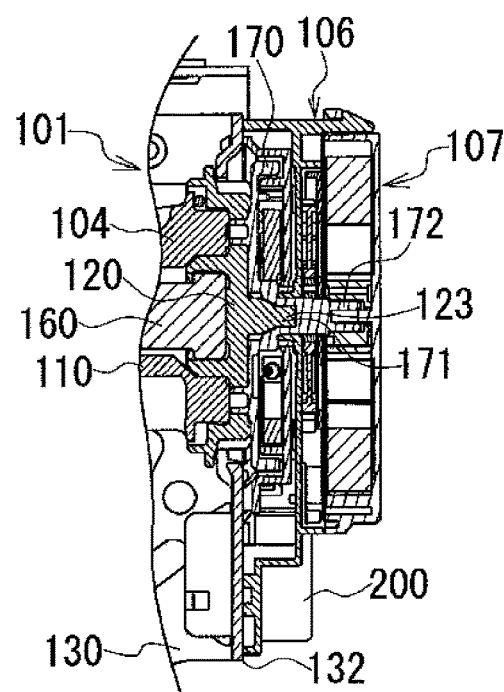
FIG. 29 is a cross-sectional view of the seat belt retractor taken along the line X6-X6 illustrated in FIG. 28, viewed in an arrow direction.

FIG. 28 is a side view of the retractor 101 viewed in an arrow W8 direction illustrated in FIG. 20. FIG. 29 is a cross-sectional view of the retractor 101 taken along the line X6-X6 illustrated in FIG. 28 and viewed in an arrow direction.

As illustrated in FIGS. 28 and 29, the mechanism cover unit 106 is coupled with the ratchet gear 120 of the winding drum unit 104 to thereby rotatably support the ratchet shaft portion 123. The winding spring unit 107 is coupled with the ratchet gear 120 by the mechanism cover unit 106.

Figure 30:
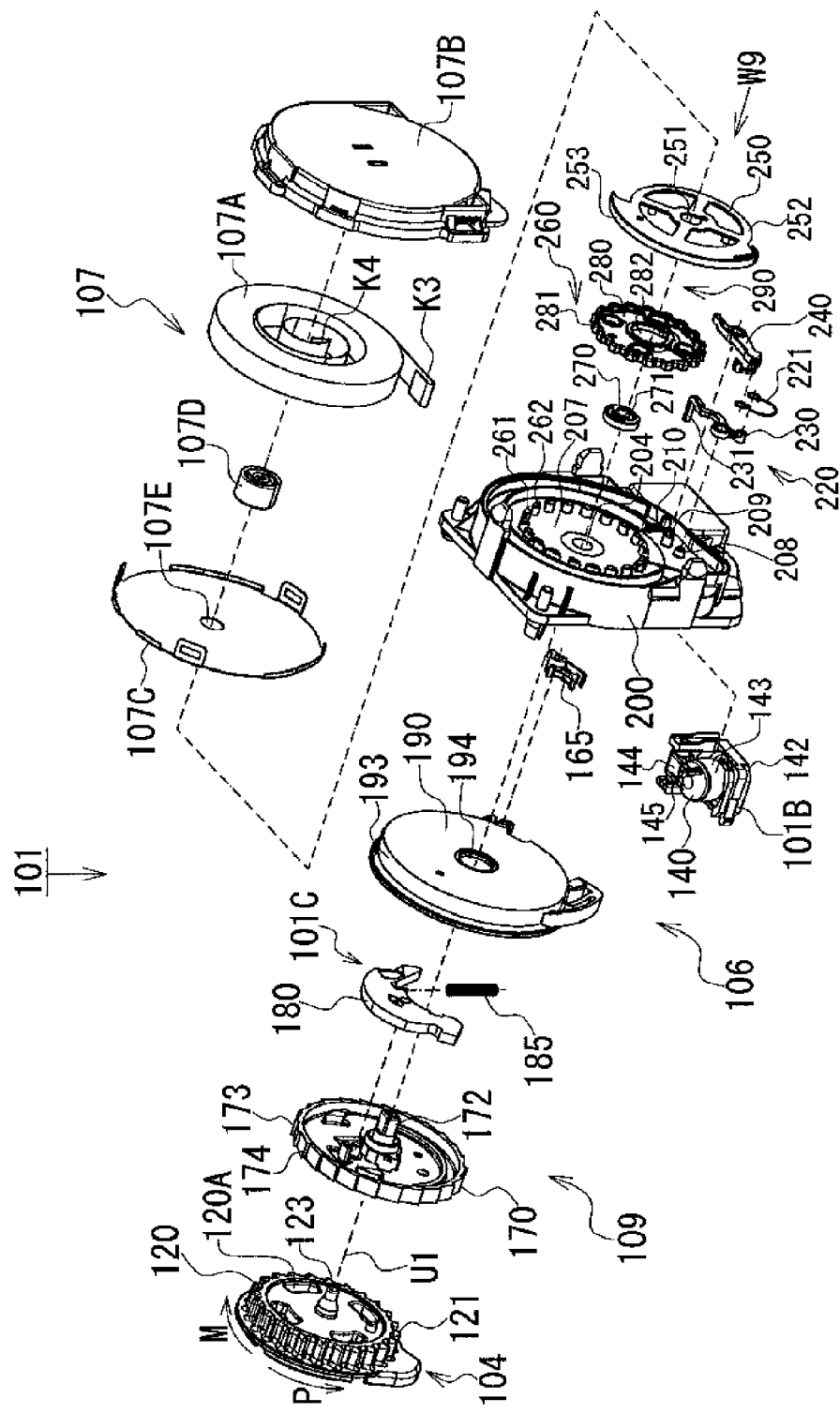
FIG. 30 is a perspective view of a mechanism cover unit and a winding spring unit that are exploded.
Figure 31:
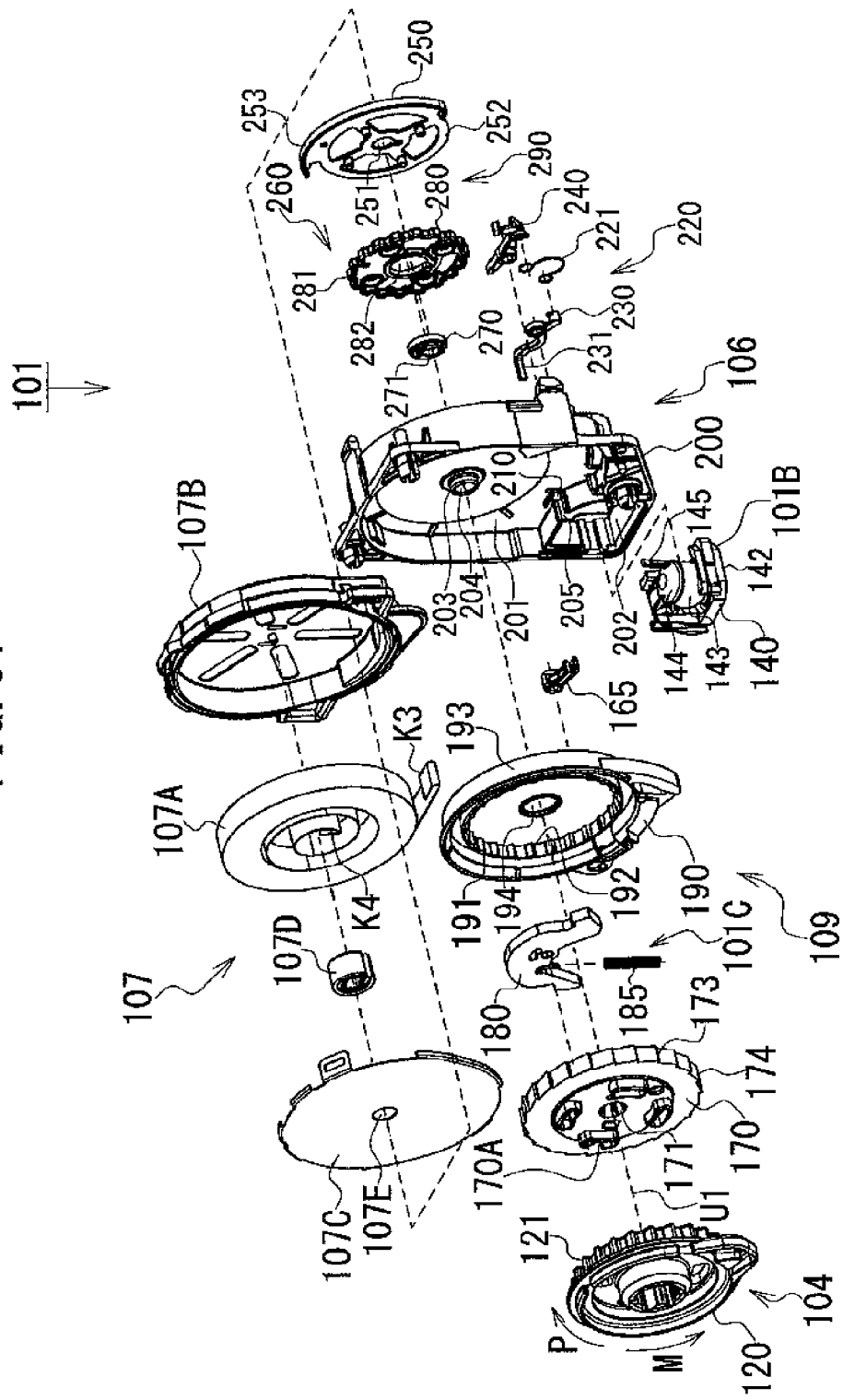
FIG. 31 is a perspective view of the mechanism cover unit and the winding spring unit that are exploded.

FIGS. 30, 31 are perspective views of the mechanism cover unit 106 and the winding spring unit 107 that are exploded, and also illustrate the ratchet gear 120 of the winding drum unit 104. FIG. 30 illustrates the mechanism cover unit 106 and the winding spring unit 107 viewed in the same direction as that in FIG. 23, and FIG. 31 illustrates the mechanism cover unit 106 and the winding spring unit 107 viewed from an opposite side of FIG. 30.

As illustrated in FIGS. 30, 31, the ratchet gear 120 is coupled with a locking gear 170 of the mechanism cover unit 106. The locking gear 170 is formed of a synthetic resin, and includes a shaft hole 171 into which the ratchet shaft portion 123 is inserted, four fitting protrusions 170A, and a shaft portion (gear shaft portion) 172 protruding from the center portion. The four fitting protrusions 170A fit into four fitting concave portions 120A formed on the ratchet gear 120 respectively. The locking gear 170 is mounted to the ratchet gear 120, and rotates integrally with the winding drum unit 104 (winding drum 110). The gear shaft portion 172 passes through the mechanism cover unit 106, and is mounted to the winding spring unit 107.

The winding spring unit 107 (urging mechanism) includes a spiral spring 107A, a spring case 107B, a spring sheet 107C in contact with the mechanism cover unit 106, and a spring shaft 107D. The spring case 107B, the spring sheet 107C, and the spring shaft 107D are formed of a synthetic resin. An outer end K3 of the spiral spring 107A is fixed to the spring case 107B, and an inner end K4 of the spiral spring 107A is fixed to the spring shaft 107D. The spring case 107B houses the spiral spring 107A and the spring shaft 107D. The spring sheet 107C is a sheet member mounted to the spring case 107B, and a cover portion for covering the spiral spring 107A and the spring shaft 107D in the spring case 107B. The spring shaft 107D is rotatably mounted to the spring case 107B. The gear shaft portion 172 is inserted into a support hole 107E and is rotatably supported by the spring sheet 107C, and is fixed to the spring shaft 107D. The spring shaft 107D is coupled with the winding drum unit 104 via the locking gear 170 and the ratchet gear 120.

The spring shaft 107D rotates integrally with the winding drum 110 of the winding drum unit 104, and transmits an urging force of the spiral spring 107A to the winding drum 110. The winding spring unit 107 always urges the winding drum 110 with the spiral spring 107A in the winding direction "M" of the webbing 2. Furthermore, when the webbing 2 is drawn out, the winding drum 110 is rotated to wind the spiral spring 107A. When the webbing 2 is wound, the winding drum 110 is rotated in the winding direction "M" by the urging force of the spiral spring 107A, to thereby wind the webbing 2 onto the winding drum 110.

The mechanism cover unit 106 includes the locking gear 170 in a circular shape, a locking arm 180, a sensor spring 185, a clutch 190, a meshing pawl 165, a mechanism cover 200, and switching means 220 for switching a state of the retractor 101. The locking arm 180, the clutch 190, the meshing pawl 165, and the mechanism cover 200 are formed of a synthetic resin. In addition, the mechanism cover 200 is a housing member for housing the locking mechanism 109. The locking mechanism 109 is arranged inside the mechanism cover 200 in a drum shaft direction (at a side where the winding drum 110 is positioned). The mechanism cover 200 is arranged outside the winding drum 110 and the locking mechanism 109 in the drum shaft direction, and houses the locking mechanism 109 inner side of the winding drum 110 in the drum shaft direction.

The mechanism cover 200 includes a first storage portion 201 for storing the locking mechanism 109, a second storage portion 202 for storing the acceleration sensor 140, a support portion (drum support portion) 203 for supporting a shaft portion of the winding drum 110, and an insertion hole 204 passing through the drum support portion 203. The first storage portion 201 houses the locking gear 170, the locking arm 180, and the clutch 190 which form a part of the locking mechanism 109. The acceleration sensor 140 is inserted into the second storage portion 202 and is mounted thereto. In the state described above, the lock claw 145 of the sensor lever 144 is arranged in an opening 205 of the second storage portion 202, passes through the opening 205, and moves into the first storage portion 201.

The shaft portion of the winding drum 110 serves as a center of a rotational movement of the winding drum 110 when the winding drum 110 rotates, and rotates together with the winding drum 110. Here, the gear shaft portion 172 of the locking gear 170 is the shaft portion of the winding drum 110, and is inserted into the insertion hole 204 formed in the drum support portion 203 to pass through the mechanism cover 200. The drum support portion 203 rotatably supports the gear shaft portion 172 inserted into the insertion hole 204. The gear shaft portion 172 is supported by the drum support portion 203 to rotate.

The locking arm 180 is displaceably coupled with the locking gear 170, and operates the locking mechanism 109 when locking arm 180 is displaced. By the operation described above, the locking gear 170, the locking arm 180, and the clutch 190 that form a part of the locking mechanism 109 move the movable pawl 150 from the non-locking position to the locking position. The movable pawl 150 locks the winding drum 110 to stop the rotation of the winding drum 110 in the drawing-out direction "P".

Figure 32:
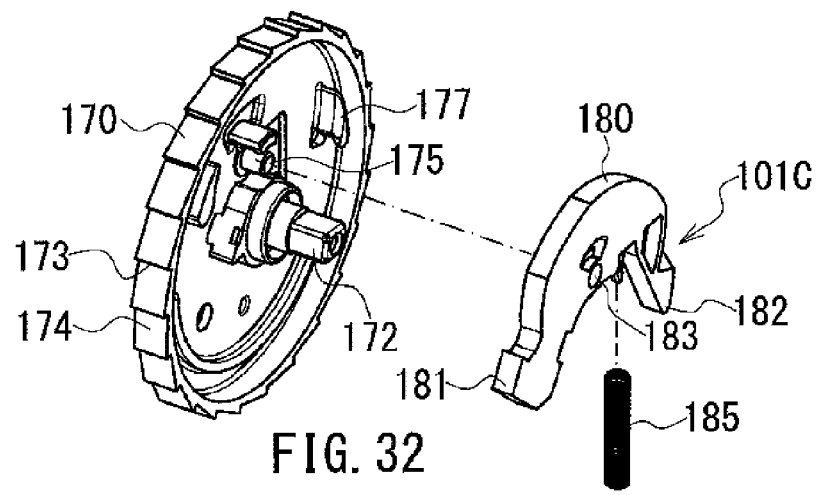
FIG. 32 is a perspective view of a locking gear and a locking arm.
Figure 33:
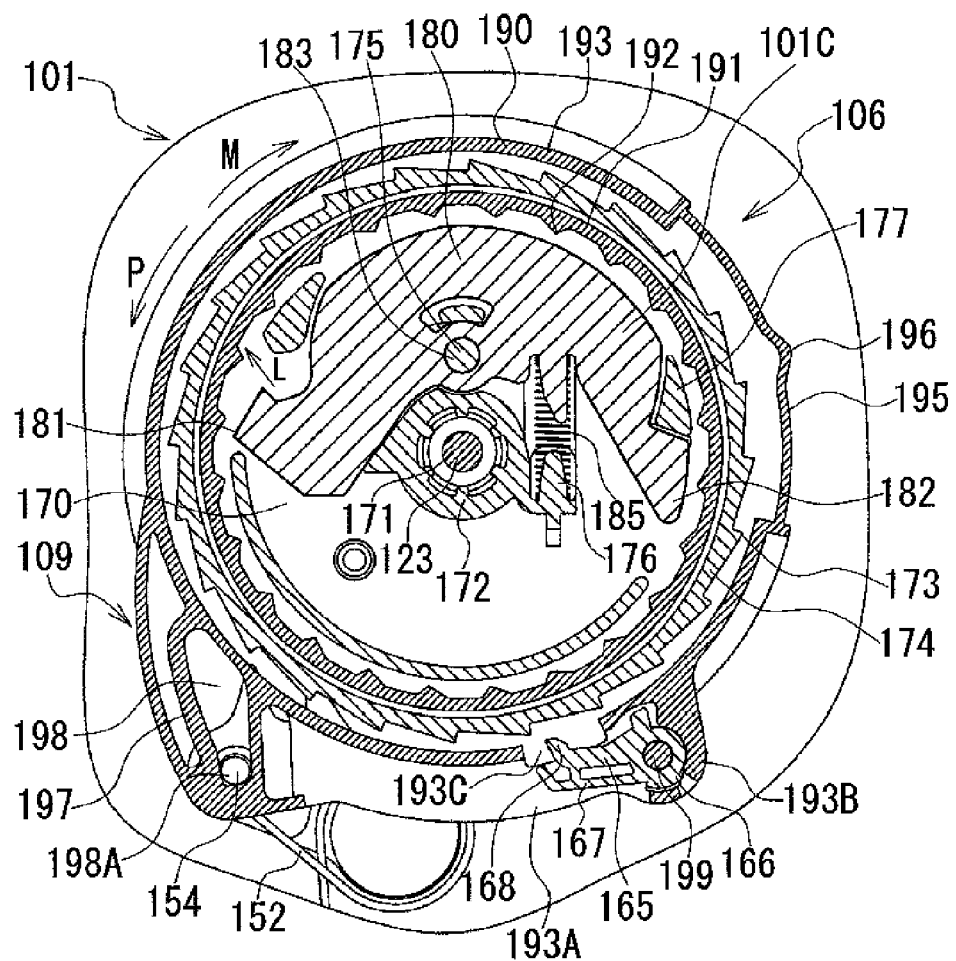
FIG. 33 is a cross-sectional view of the mechanism cover unit.

FIG. 32 is a perspective view of the locking gear 170 and the locking arm 180, and illustrates a part of FIG. 30. FIG. 33 is a cross-sectional view of the mechanism cover unit 106, and illustrates a part of the mechanism cover unit 106 that is assembled.

As illustrated in FIGS. 32, 33, the locking gear 170 includes a ratchet wheel 174 including a plurality of teeth 173, an arm support portion 175 in a columnar shape, and a support pin 176 for supporting the sensor spring 185. The ratchet wheel 174 includes a circular member formed over an outer circumference of the locking gear 170, and is rotatable with the winding drum 110. The plurality of teeth 173 is inclined to stop the rotation of the ratchet wheel 174 only in the drawing-out direction "P", and is formed over an entire outer circumference of the ratchet wheel 174.

The locking arm 180 includes a through hole 183 formed between one end portion (engagement end portion) 181 and other end portion (free end portion) 182 in a longitudinal direction, and is formed in a curving shape. When the arm support portion 175 is inserted into the through hole 183, the locking arm 180 is mounted to the arm support portion 175. The arm support portion 175 rotatably supports the locking arm 180, and the locking arm 180 is rotatably coupled with the locking gear 170 via the arm support portion 175. The locking arm 180 is arranged inside the ratchet wheel 174, and rotates about the arm support portion 175. The sensor spring 185 is arranged between the locking arm 180 and the support pin 176, and urges the other end portion 182 of the locking arm 180 in the drawing-out direction "P". By the urging force, the other end portion 182 of the locking arm 180 comes into contact with a stopper 177 of the locking gear 170.

The locking arm 180 rotates together with the winding drum 110 and the locking gear 170 in the drawing-out direction "P" and the winding direction "M". Normally, by the urging force of the sensor spring 185, the other end portion 182 of the locking arm 180 is maintained to be in contact with the stopper 177 of the locking gear 170. In contrast to this, when the vehicle encounters an emergency, the other end portion 182 of the locking arm 180 separates away from the stopper 177 to displace the locking arm 180.

More specifically, when the acceleration for drawing-out the webbing 2 exceeds the predetermined acceleration (i.e., when the acceleration in the drawing-out direction "P" of the winding drum 110 rotating in the drawing-out direction "P" exceeds the predetermined acceleration), with respect to the rotating locking gear 170, a delay due to inertia is caused with the locking arm 180. As a result, the locking arm 180 rotates while compressing the sensor spring 185, and the one end portion 181 of the locking arm 180 is displaced outward in the radial direction of the locking gear 170. By the displacement, as described below, the locking mechanism 109 of the retractor 101 is operated.

As described above, the locking arm 180 and the sensor spring 185 are included in a part of a second acceleration detection mechanism (acceleration detection mechanism of the webbing 2) 101C for detecting the acceleration of the drawing-out of the webbing 2 (acceleration of the winding drum 110 in the drawing-out direction "P") drawn out from the winding drum 110. When the vehicle encounters an emergency, the second acceleration detection mechanism 101C detects the acceleration of the drawing out of the webbing 2, and operates the locking mechanism 109. Furthermore, the locking arm 180 is a displacement member that is displaceable in a lock-operating direction "L" (refer to FIG. 33) depending on the acceleration of the winding drum 110 in the drawing-out direction "P", and is displaced in the predetermined lock-operating direction "L", in response to the acceleration. The lock-operating direction "L" is a direction for operating the locking mechanism 109 and, here, is a direction where the one end portion 181 of the locking arm 180 is displaced outward in the radial direction of the locking gear 170. The locking mechanism 109 is operated by the locking arm 180 axially displaced in the lock-operating direction "L".

When the locking arm 180 is displaced in the lock-operating direction "L", the locking arm 180 may be displaced or the locking arm 180 may be displaced relative to the winding drum 110 and the locking gear 170. Or the locking arm 180 may displace relative to the winding drum 110 and the locking gear 170 while being displaced. Therefore, the displacement of the locking arm 180 includes the displacement in such modes described above.

The locking arm 180 is displaceably coupled with the locking gear 170 in the lock-operating direction "L" to rotate therewith. Further, the arm support portion 175 is a displacement member support portion to displace the locking arm 180 in the lock-operating direction "L" by rotation. By rotating the locking arm 180 in the lock-operating direction "L" and an opposite direction of the lock-operating direction "L", the locking arm 180 is displaced in each of the both directions. By urging the sensor spring 185, the locking arm 180 is displaced (rotates) in the opposite direction of the lock-operating direction "L", and the one end portion 181 of the locking arm 180 is displaced inward in the radial direction of the locking gear 170.

When the locking arm 180 is displaced in the lock-operating direction "L", the locking mechanism 109 is operated to stop the rotation of the winding drum 110 in the drawing-out direction "P". At this time (refer to FIGS. 30, 31), the clutch 190 is coupled with the locking gear 170 through the locking arm 180, and rotates therewith. When the clutch 190 rotates, the movable pawl 150 moves from the non-locking position to the locking position. The clutch 190 includes an inner wall 191 in a circular shape, a clutch gear 192 formed on an inner circumference of the inner wall 191, an outer wall 193 in a circular shape surrounding the inner wall 191, and a center hole 194 positioned at a center of the inner wall 191. When the gear shaft portion 172 of the locking gear 170 is inserted into the center hole 194, the locking gear 170 and the winding drum unit 104 rotate relative to the clutch 190. The ratchet wheel 174 of the locking gear 170 is arranged between the inner wall 191 and the outer wall 193 (refer to FIG. 40). The locking arm 180 is arranged inside the inner wall 191, and the one end portion 181 of the locking arm 180 is engaged with the clutch gear 192.

Figure 34A:
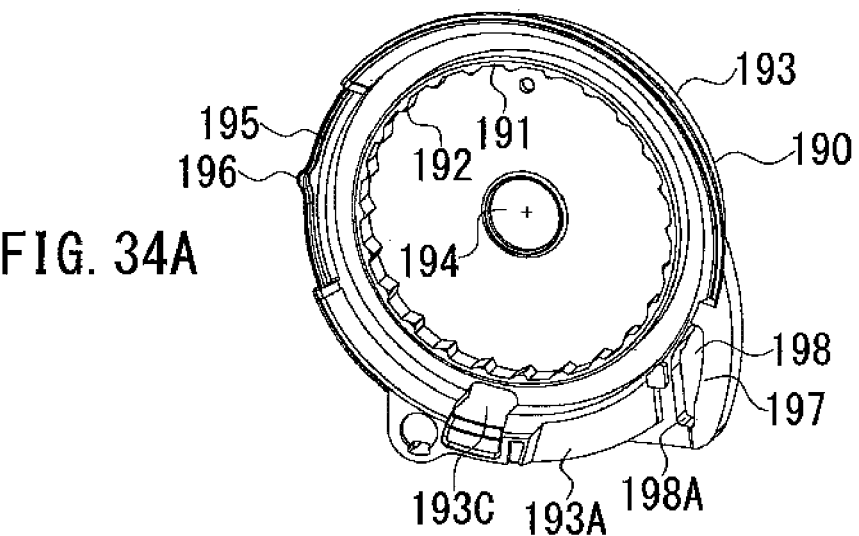
FIGS. 34A and 34B are perspective views of a clutch.
Figure 34B:
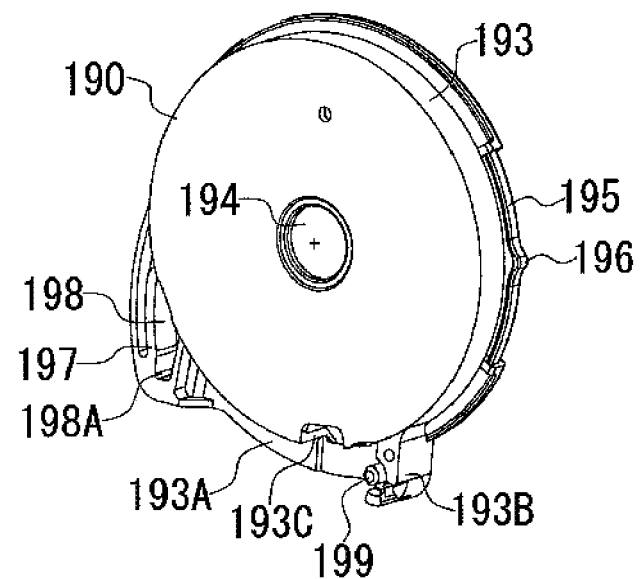

FIG. 34 is a perspective view of the clutch 190, and illustrates the clutch 190 viewed in two directions. FIG. 34A illustrates the clutch 190 viewed from the locking gear 170 side. FIG. 34B illustrates the clutch 190 viewed from an opposite side of FIG. 34A.

As illustrated in FIG. 34A, the clutch gear 192 includes a plurality of engagement teeth formed over an entire inner circumference of the inner wall 191, and engages with the one end portion 181 of the locking arm 180 displaced in the lock-operating direction "L". Only when the locking gear 170 rotates in the drawing-out direction "P", the one end portion 181 of the locking arm 180 engages with the clutch gear 192 in such a manner to hook the clutch gear 192. When the clutch gear 192 and the locking arm 180 engage with each other, the clutch 190 is coupled with the locking gear 170. In the state described above, the locking gear 170 and the locking arm 180 rotate in the drawing-out direction "P", and the clutch 190 is pressed by the locking arm 180 to rotate in the drawing-out direction "P".

The clutch 190 includes an elastically-deforming portion 195 formed on a part of the outer wall 193, a movable protrusion 196 formed on the elastically-deforming portion 195, a guide portion 197 formed outside the outer wall 193, and a guide hole 198 that is thin, long and formed at the guide portion 197. The movable protrusion 196 protrudes outward in a radial direction of the clutch 190, and when the elastically-deforming portion 195 is elastically deformed, the movable protrusion 196 moves inward in the radial direction of the clutch 190. The interlocking pin 154 of the movable pawl 150 (refer to FIGS. 24, 33) is inserted into the guide hole 198, and is guided by the guide portion 197 while moving in the guide hole 198. The movable pawl 150 is urged toward the non-locking position by the return spring 152 and, normally, is maintained in the non-locking position. At this time, the interlocking pin 154 is positioned at one end portion 198A of the guide hole 198 (refer to FIG. 33). The interlocking pin 154 presses the guide portion 197, and the position of the clutch 190 is maintained. Further, the interlocking pin 154 urges the clutch 190 in the winding direction "M".

At the time of the normal drawing-out of the webbing 2, the winding drum 110 and the locking gear 170 rotate in the drawing-out direction "P" with respect to the stopped clutch 190. At this time, the one end portion 181 of the locking arm 180 is arranged at a position away from the clutch gear 192, and the locking arm 180 is maintained in a state of not being engaged with the clutch gear 192. In contrast to this, when the acceleration of the winding drum 110 in the drawing-out direction "P" exceeds the predetermined acceleration by the sudden drawing-out of the webbing 2, the locking arm 180 is displaced in the lock-operating direction "L" depending on the acceleration of the winding drum 110 in the drawing-out direction "P". When the locking arm 180 rotates to thereby be displaced in the lock-operating direction "L", the one end portion 181 of the locking arm 180 is displaced toward the clutch gear 192. Subsequently, the locking mechanism 109 is operated to lock the winding drum 110.

FIGS. 35A to 36B illustrate actions of the locking mechanism 109, and illustrate an inner configuration of the mechanism cover unit 106. Furthermore, FIGS. 35A to 36B illustrate a portion hidden by the clutch 190, by deleting a part of the clutch 190.

As illustrated in FIGS. 35A to 36B, the locking mechanism 109 is operated by the displacement of the locking arm 180. Specifically, by the displacement of the locking arm 180 in the lock-operating direction "L" (refer to FIG. 35A), the one end portion 181 of the locking arm 180 approaches the clutch gear 192 to thereby engage with the clutch gear 192. The clutch gear 192 is engaged with the locking arm 180 displaced in the lock-operating direction "L" to thereby stop the locking arm 180.

Through the clutch gear 192 and the locking arm 180, the clutch 190 is coupled with the locking gear 170 to rotate together with the locking gear 170 and the winding drum 110 in the drawing-out direction "P". By the rotation described above, the interlocking pin 154 of the movable pawl 150 is pressed by the guide portion 197 to move in the guide hole 198. The interlocking pin 154 is guided by the guide portion 197 to move to a center side of the clutch 190 along the guide hole 198. When the interlocking pin 154 moves, the movable pawl 150 moves to the locking position, and the engagement teeth 153 of the movable pawl 150 engage with the ratchet teeth 121 of the ratchet gear 120 (refer to FIG. 35B).

The locking mechanism 109 locks the winding drum 110 with the movable pawl 150. The locking mechanism 109 stops the rotation of the winding drum 110 in the drawing-out direction "P" to stop the drawing-out of the webbing 2. While the clutch 190 is rotating, the movable protrusion 196 of the clutch 190 comes into contact with a fixed protrusion 206 of the mechanism cover 200 to move inward in the radial direction of the clutch 190. The fixed protrusion 206 is formed on an inner wall of the first storage portion 201, and protrudes into the first storage portion 201. When an operation of the locking mechanism 109 is completed, the movable protrusion 196 stops at a position where the movable protrusion 196 has passed the fixed protrusion 206.

The winding drum 110 is released from the load of the webbing 2, when the webbing 2 is wound, the winding drum 110 and the locking gear 170 is rotated in the winding direction "M". At this time, since the movable protrusion 196 is hooked with the fixed protrusion 206, the locking gear 170 and the locking arm 180 rotate relative to the clutch gear 192 of the clutch 190. By the rotation, a gap is generated between the one end portion 181 of the locking arm 180 and the clutch gear 192 to release the locking arm 180 from the clutch gear 192. When the locking arm 180 comes off the clutch gear 192, the locking arm 180 and the clutch gear 192 are disengaged. Further, the locking arm 180 is displaced in the opposite direction of the lock-operating direction "L", and then the clutch 190 and the locking gear 170 are uncoupled (refer to FIG. 36A). By the rotation of the ratchet gear 120 in the winding direction "M", the engagement teeth 153 of the movable pawl 150 are released from the ratchet teeth 121 of the ratchet gear 120.

Subsequently, by the urging force of the return spring 152, the movable pawl 150 is moved toward the non-locking position, and the interlocking pin 154 of the movable pawl 150 moves in the guide hole 198. At the same time, the interlocking pin 154 presses the guide portion 197 to thereby rotate the clutch 190 in the winding direction "M". The movable protrusion 196 of the clutch 190 is moved inward in the radial direction of the clutch 190 by the fixed protrusion 206 of the mechanism cover 200, and passes over the fixed protrusion 206. After that, the movable pawl 150 returns to the non-locking position while rotating the clutch 190 (refer to FIG. 36B). Therefore, the interlocking pin 154 moves to the one end portion 198A of the guide hole 198, and the clutch 190 recovers into an original state. Furthermore, the engagement teeth 153 and the ratchet teeth 121 are disengaged, and the lock of the winding drum 110 by the locking mechanism 109 is released. Afterwards, drawing-out and winding of the webbing 2 become possible.

As described above, the locking mechanism 109 is a webbing-sensing locking mechanism operated by the above described second acceleration detection mechanism 101C and, in response to the sudden drawing-out of the webbing 2, stops the drawing-out of the webbing 2. Further, the locking mechanism 109 is a car-body-sensing locking mechanism operated by the acceleration sensor 140 (first acceleration detection mechanism 101B) and, in response to the sudden change of the speed of the vehicle, stops the drawing-out of the webbing 2. The locking mechanism 109, the meshing pawl 165, and the acceleration sensor 140 form the car-body-sensing locking mechanism. The acceleration sensor 140 operates the locking mechanism 109 by the meshing pawl 165, and the locking mechanism 109 locks the winding drum 110 similarly as described above. The meshing pawl 165 (refer to FIGS. 30, 31) is a mesh member for meshing with the teeth 173 of the ratchet wheel 174 and when the meshing pawl 165 meshes with the teeth 173, the clutch 190 is coupled with the locking gear 170.

Figure 37:
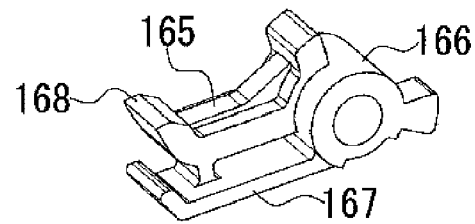
FIG. 37 is a perspective view of a meshing pawl.

FIG. 37 is a perspective view of the meshing pawl 165. As illustrated in FIG. 37, the meshing pawl 165 includes a mounting portion 166 in a cylindrical shape, a reception portion 167 in a plate-like shape protruding from the mounting portion 166, and a mesh tooth 168 meshing with the teeth 173 of the ratchet wheel 174. The meshing pawl 165 rotates about the mounting portion 166, and the meshing pawl 165 (mesh tooth 168) moves. Meanwhile, when the meshing pawl 165 meshes with the teeth 173 of the ratchet wheel 174, the mesh tooth 168 meshes with teeth 173.

The clutch 190 (refer to FIGS. 33, 34A, 34B) includes a flange 193A formed on the outer wall 193, a pawl support portion 199 in a cylindrical shape formed on the flange 193A, and a stopper 193B formed on the flange 193A. The pawl support portion 199 is inserted into the mounting portion 166, and the meshing pawl 165 is mounted on the pawl support portion 199. The pawl support portion 199 rotatably supports the meshing pawl 165, and the meshing pawl 165 is rotatably mounted to the clutch 190 by the pawl support portion 199. When the meshing pawl 165 rotates due to its weight, the meshing pawl 165 comes into contact with the stopper 193B to thereby stop the rotation of the meshing pawl 165. In the state described above, the mesh tooth 168 is arranged at an opening 193C of the outer wall 193. Furthermore, with the acceleration sensor 140, the mesh tooth 168 passes through the opening 193C and moves inside the outer wall 193.

Figure 38A:
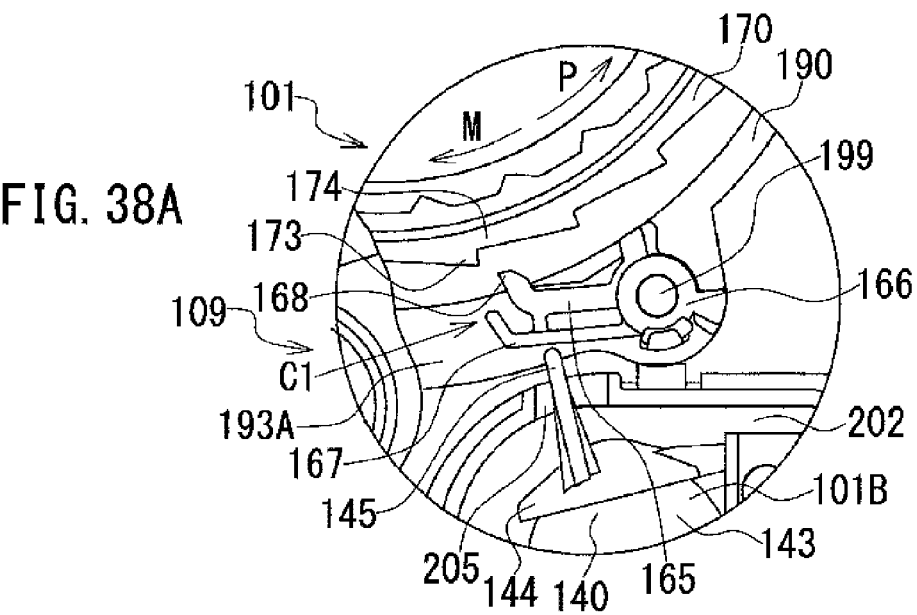
FIGS. 38A and 38B schematically illustrate a periphery of the meshing pawl.
Figure 38B:
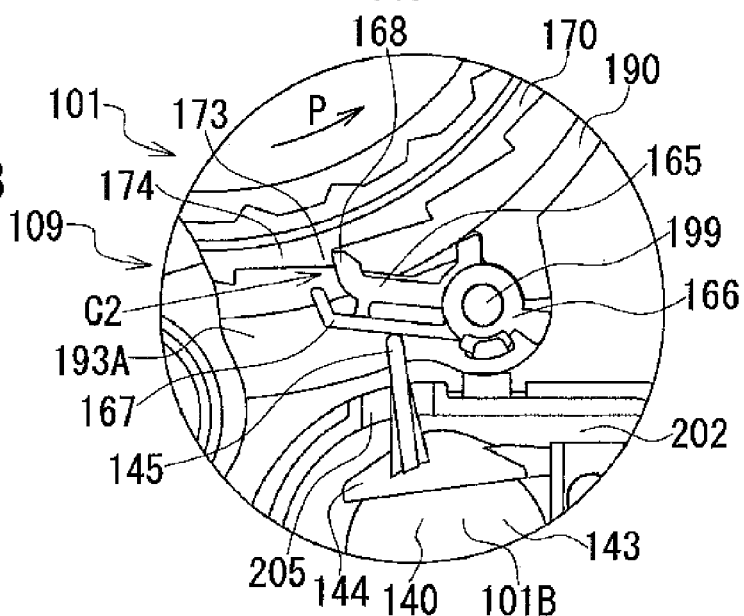

FIGS. 38A, 38B schematically illustrate a periphery of the meshing pawl 165, and also illustrate a part of the acceleration sensor 140.

As illustrated in FIGS. 38A, 38B, the meshing pawl 165 moves (rotates) to a position where the meshing pawl 165 does not mesh with the teeth 173 of the ratchet wheel 174 (non-mesh position C1) (refer to FIG. 38A) and to a position where the meshing pawl 165 meshes with the teeth 173 of the ratchet wheel 174 (mesh position C2) (refer to FIG. 38B). Normally, the meshing pawl 165 is arranged at the non-mesh position C1, and the lock claw 145 of the sensor lever 144 is positioned near the meshing pawl 165.

When the acceleration of the vehicle exceeds the predetermined acceleration, the inertia mass body 143 moves and the sensor lever 144 and the lock claw 145 are moved upward by the inertia mass body 143. The lock claw 145 presses the meshing pawl 165 (reception portion 167) upward so that the mesh tooth 168 approaches the ratchet wheel 174. The meshing pawl 165 moves from the non-mesh position C1 to the mesh position C2, to mesh with the teeth 173 of the ratchet wheel 174. The meshing pawl 165 and the teeth 173 of the ratchet wheel 174 are formed to mesh with each other only when the ratchet wheel 174 rotates in the drawing-out direction "P". When the ratchet wheel 174 rotates in the winding direction "M", the meshing pawl 165 (mesh tooth 168) relatively slides on an outer face of the teeth 173, and then passes over the teeth 173 at an edge of the teeth 173.

The meshing pawl 165 forms a part of the locking mechanism 109. When the meshing pawl 165 moves to the mesh position C2, the locking mechanism 109 is operated. When the meshing pawl 165 meshes with the teeth 173 of the ratchet wheel 174, by the meshing pawl 165 and the ratchet wheel 174, the clutch 190 is coupled with the locking gear 170. Subsequently, when the webbing 2 is drawn out, with the meshing pawl 165 meshed with the teeth 173, the clutch 190 rotates together with the locking gear 170 and the winding drum 110 in the drawing-out direction "P". By the rotation, in the same way as the operation of the locking mechanism 109 when the locking arm 180 is displaced (refer to FIGS. 35A, 35B, 36A and 36B), the locking mechanism 109 is operated. When the clutch 190 rotates, the locking mechanism 109 is operated similarly as described above.

Figure 39A:
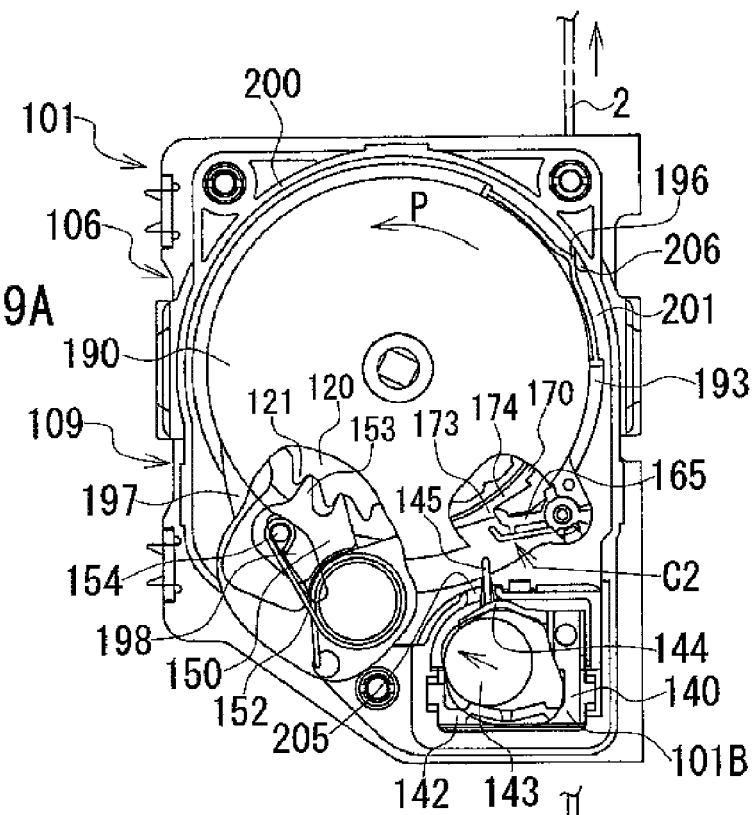
FIGS. 39A and 39B illustrate actions of the locking mechanism.
Figure 39B:
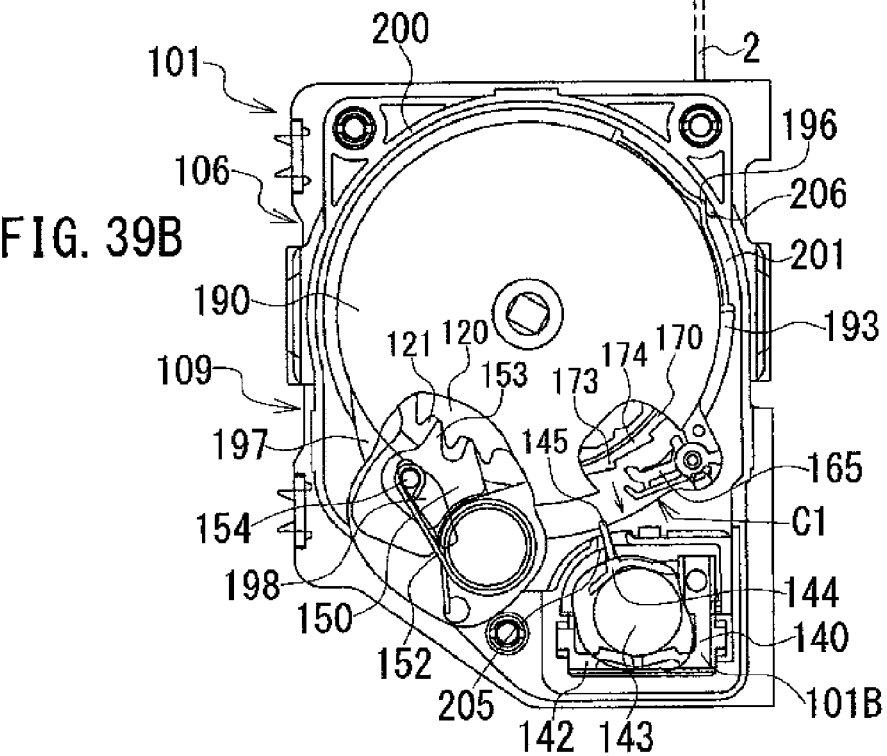

FIGS. 39A and 39B illustrate actions of the locking mechanism 109, and illustrate an inner configuration of the mechanism cover unit 106. Further, FIGS. 39A and 39B illustrate a portion hidden by the clutch 190, by deleting a part of the clutch 190.

As illustrated in FIGS. 39A and 39B, the movable pawl 150 moves to the locking position when the clutch 190 rotates, and the locking mechanism 109 locks the winding drum 110 with the movable pawl 150 (refer to FIG. 39A). The locking mechanism 109 stops the rotation of the winding drum 110 in the drawing-out direction "P" to stop the drawing-out of the webbing 2. The movable protrusion 196 of the clutch 190 stops at a position where the movable protrusion 196 has passed over the fixed protrusion 206. When the acceleration of the vehicle becomes the predetermined acceleration or less, the inertia mass body 143 is moved to an original position by the gravity, and the lock claw 145 and the sensor lever 144 move downward (refer to FIG. 39B).

When the webbing 2 has been wound and the winding drum 110 is released from the load of the webbing 2, the winding drum 110 and the locking gear 170 rotate in the winding direction "M". At this time, since the movable protrusion 196 is hooked with the fixed protrusion 206, the locking gear 170 and the ratchet wheel 174 rotate relative to the clutch 190. By the rotation, a gap is generated between the mesh tooth 168 and the teeth 173 to release the meshing pawl 165 from the ratchet wheel 174. The meshing pawl 165 comes off the teeth 173, and moves due to its weight to the non-mesh position C1. Further, the clutch 190 and the locking gear 170 are uncoupled. Subsequently, the movable pawl 150 returns to the non-locking position, and the clutch 190 returns to the original state (refer to FIG. 36B). Therefore, the lock of the winding drum 110 via the locking mechanism 109 is released.

Next, the switching means 220 of the mechanism cover unit 106 will be described (refer to FIGS. 30 and 31). The switching means 220 switches the state of the retractor 101 between the automatic locking retractor (ALR) state and the emergency locking retractor (ELR) state.

The switching means 220 is a switching mechanism for switching a state of the locking mechanism 109. The state of the locking mechanism 109 is switched and the state of the retractor 101 thereby is switched. The switching means 220 switches the locking mechanism 109 between an operation state and a waiting state. The locking mechanism 109 in the operation state locks the winding drum 110 to thereby stop the rotation of the winding drum 110 in the drawing-out direction "P". In the waiting state, the switching means 220 does not operate the locking mechanism 109. During the waiting state, the locking mechanism 109 can be operated independently from the switching means 220, and can be operated as the webbing-sensing locking mechanism and the car-body-sensing locking mechanism when the vehicle encounters an emergency.

When the state of the retractor 101 is switched, the switching means 220 controls the operation of the locking mechanism 109 and to thereby switch the state of the locking mechanism 109. Specifically, the switching means 220 switches the locking mechanism 109 from the waiting state to the operation state, to thereby switch the retractor 101 from the ELR state to the ALR state. In the ALR state, the webbing 2 can't be drawn out by the operation of the locking mechanism 109. Furthermore, the switching means 220 switches the locking mechanism 109 from the operation state to the waiting state, to thereby switch the retractor 101 from the ALR state to the ELR state. In the ELR state, the locking mechanism 109 is in the waiting state, and thus, the webbing 2 can be wound and drawn out. However, when the vehicle encounters an emergency, the locking mechanism 109 is operated, and the winding drum 110 is locked by the locking mechanism 109.

The switching means 220 includes an operation member 230 for operating the locking mechanism 109, an arrangement member 240 for arranging the operation member 230 at a predetermined position, a movement member (control member) 250 in a circular shape for moving the arrangement member 240, an urging means 221, and a deceleration mechanism 260. The movement member 250 controls the state of the retractor 101 by the movement of the arrangement member 240. The deceleration mechanism 260 includes an eccentric member 270 that is a driving body, a rotational gear 280 in a circular shape that is rotatable, a fixed gear 262 including a plurality of teeth (fixed teeth), and a transmission mechanism (rotation transmission mechanism) 290 for transmitting rotation of the rotational gear 280 to the movement member 250. The operation member 230, the arrangement member 240, the movement member 250, the eccentric member 270, and the rotational gear 280 are formed of a synthetic resin.

The deceleration mechanism 260 is coupled with the winding drum 110 and the movement member 250 by the eccentric member 270 and the rotational gear 280. The fixed gear 262 is an internal gear including a plurality of fixed teeth 261. The plurality of fixed teeth 261 of the fixed gear 262 is fixed to the support body 101A of the retractor 101, its position is fixed in the retractor 101 and the switching means 220. Here, the plurality of fixed teeth 261 is formed on the mechanism cover 200 and is arranged in a circular shape, with the axis line U1 of the winding drum 110 as a center. The mechanism cover 200 is a housing member of the locking mechanism 109. Each portion of the switching means 220 and the deceleration mechanism 260 is provided outside the mechanism cover 200 in the drum shaft direction (opposite side of the side where the winding drum 110 is positioned).

The winding spring unit 107 is an urging mechanism of the winding drum 110, and is arranged outside the mechanism cover 200 and the switching means 220 in the drum shaft direction, and is mounted to the mechanism cover 200. The switching means 220 is positioned between the winding spring unit 107 and the mechanism cover 200, and covered with the winding spring unit 107. As described above, the retractor 101 includes a cover member arranged outside the mechanism cover 200 in the drum shaft direction and covering the switching means 220. Here, the cover member includes a cover portion of the winding spring unit 107 covering the switching means 220. The cover portion is a portion positioned on a mechanism cover 200 side of the winding spring unit 107, and includes the spring sheet 107C. The spring sheet 107C is a sheet member covering the switching means 220, and is arranged outside the movement member 250 in the drum shaft direction. The movement member 250 is adjacent to the spring sheet 107C that is the cover member, and is arranged along the spring sheet 107C. The spring sheet 107C is arranged outside the movement member 250 in the drum shaft direction, and regulates action of the movement member 250 in the drum shaft direction.

The plurality of fixed teeth 261 (fixed gear 262) and the rotational gear 280 are provided outside the mechanism cover 200 in the drum shaft direction, and mesh with each other (refer to FIG. 30). Furthermore, the plurality of fixed teeth 261 is provided on a face (outside face) 207 which is an outer face of the mechanism cover 200 in the drum shaft direction. Here, the plurality of fixed teeth 261 is integrally formed on the outside face 207 of the mechanism cover 200 in the drum shaft direction, and protrudes outward from the outside face 207 in the drum shaft direction. The rotational gear 280 and the eccentric member 270 are arranged inside the plurality of fixed teeth 261, and are adjacent to the mechanism cover 200. The outside face 207 of the mechanism cover 200 is a regulation face positioned between the locking mechanism 109 and the rotational gear 280, and regulates action of the rotational gear 280 in the drum shaft direction.

As described above, the gear shaft portion 172 of the locking gear 170 is the shaft portion of the winding drum 110, and is supported by the drum support portion 203 of the mechanism cover 200. Furthermore, the gear shaft portion 172 passes through the insertion hole 204 of the drum support portion 203, and protrudes outward from the insertion hole 204 in the drum shaft direction. The eccentric member 270 includes a mounting hole 271 through which the eccentric member 270 is mounted to the gear shaft portion 172 protruding from the insertion hole 204, and rotates with the gear shaft portion 172 in the mounting hole 271. When the gear shaft portion 172 is inserted into the mounting hole 271, the eccentric member 270 is unrotatably mounted to the gear shaft portion 172.

The gear shaft portion 172 passes through the mounting hole 271 of the eccentric member 270, and protrudes outward from the mounting hole 271 in the drum shaft direction. The movement member 250 includes a center hole 251 through which the movement member 250 is mounted to the gear shaft portion 172 protruding from the mounting hole 271, and rotates relative to the gear shaft portion 172 in the center hole 251. When gear shaft portion 172 is inserted into the center hole 251, the movement member 250 is rotatably supported by the gear shaft portion 172, and rotates relative to the winding drum 110 about the axis line U1 of the winding drum 110. The movement member 250 is arranged outside the rotational gear 280 in the drum shaft direction, is adjacent to the rotational gear 280. Outside the rotational gear 280 in the drum shaft direction, the movement member 250 regulates the action of the rotational gear 280 in the drum shaft direction.

Figure 40:
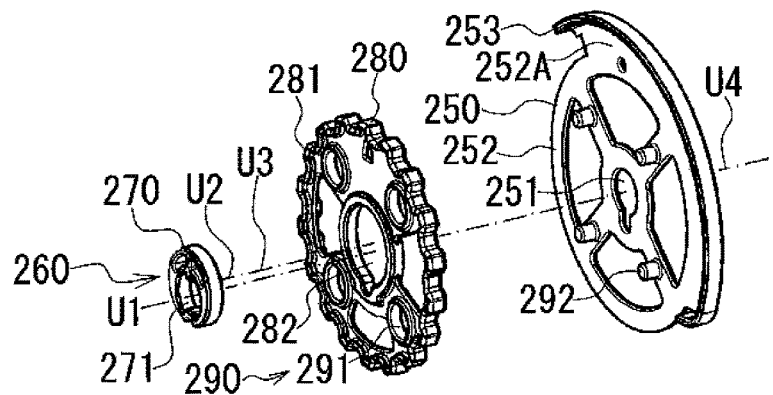
FIG. 40 is a perspective view of an eccentric member, a rotation gear, and a movement member.
Figure 41:
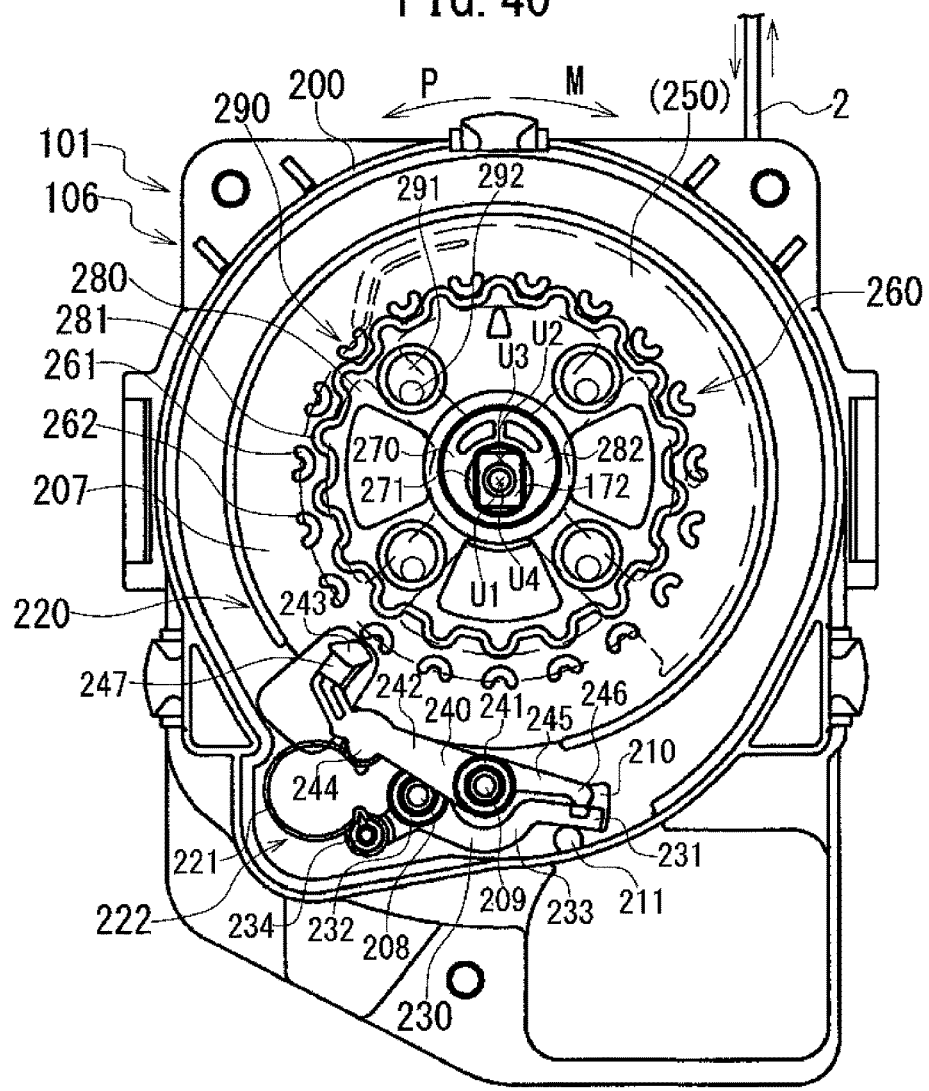
FIG. 41 is a side view of the mechanism cover unit.

FIG. 40 is a perspective view of the eccentric member 270, the rotational gear 280, and the movement member 250, and illustrates a part of FIG. 31. FIG. 41 is a side view of the mechanism cover unit 106, and illustrates a mechanism cover unit 106 viewed in an arrow W9 direction illustrated in FIG. 30. FIG. 41 illustrates the movement member 250 by the dotted lines, and illustrates the deceleration mechanism 260 hidden by the movement member 250, by the solid lines.

As illustrated in FIG. 41, an outer circumference of the eccentric member 270 is formed in a circular shape, and the mounting hole 271 of the eccentric member 270 is formed to be eccentric with respect to a center of a circular outer circumference of the eccentric member 270 (center U2 of the eccentric member 270). Namely, a center of the mounting hole 271 is not aligned with the center U2 of the eccentric member 270 but is positioned between the center U2 and the outer circumference of the eccentric member 270. When the gear shaft portion 172 is mounted to the mounting hole 271, the center of the mounting hole 271 is positioned at the axis line U1 of the winding drum 110. Furthermore, the center U2 of the eccentric member 270 is positioned a predetermined distance (an amount of eccentricity) away from the axis line U1 of the winding drum 110. The eccentric member 270 is a circular eccentric cam, and in a state where the center U2 is eccentric with respect to the axis line U1 of the winding drum 110, the eccentric member 270 rotates about the axis line U1 (center of the mounting hole 271) integrally with the winding drum 110. When the eccentric member 270 rotates, the center U2 of the eccentric member 270 rotates and moves about the axis line U1 of the winding drum 110.

The rotational gear 280 is an external gear including a plurality of outer circumferential teeth 281, and includes a center hole 282 in a circular shape and a plurality of transmission holes 291 in a circular shape that is a part of a transmission mechanism 290. The plurality of outer circumferential teeth 281 is teeth (outer teeth) formed at an outer circumference of the rotational gear 280, and includes a smaller number of teeth than that of the plurality of fixed teeth 261. Here, the rotational gear 280 includes eighteen outer circumferential teeth 281, and the fixed gear 262 includes nineteen fixed teeth 261. The center hole 282 is a fitting hole formed in a center of the rotational gear 280, and is rotatably fitted to the circular outer circumference of the eccentric member 270. The eccentric member 270 is fitted into the center hole 282 of the rotational gear 280, and the rotational gear 280 is rotatably mounted to the eccentric member 270 in the center hole 282. An axis line (rotation center) U3 of the rotational gear 280 is aligned with the center U2 of the eccentric member 270 and is positioned a predetermined distance (an amount of eccentricity) away from the axis line U1 of the winding drum 110. The eccentric member 270 rotates in the center hole 282 to thereby move the rotational gear 280 along the plurality of fixed teeth 261.

The plurality of fixed teeth 261, the rotational gear 280, and the eccentric member 270 are positioned outside the mechanism cover 200 in the drum shaft direction, between the mechanism cover 200 and the movement member 250. An inner diameter of the fixed gear 262 is larger than an outer diameter of the rotational gear 280, and the plurality of fixed teeth 261 surrounds the eccentric member 270 and the rotational gear 280. The plurality of fixed teeth 261 is a larger number of inner teeth than that of the plurality of outer circumferential teeth 281, and meshes with the outer circumferential teeth 281 of the rotational gear 280. Furthermore, the plurality of fixed teeth 261 is positioned on the same circle about the axis line U1 of the winding drum 110, and is arranged at regular intervals in a circumferential direction of the circle. Meanwhile, the plurality of fixed teeth 261 may be a meshing portion where the fixed teeth 261 mesh with the rotational gear 280 rotating inside the fixed teeth. Therefore, for example, the plurality of fixed teeth 261 may be formed at an inner circumference of a circle portion, or may be a plurality of protrusions arranged in a circular shape in a state where the fixed teeth 261 are separated from each other.

Inside the plurality of fixed teeth 261, the rotational gear 280 is rotatably supported by the eccentric member 270 in a state where the rotational gear 280 is eccentric with respect to the axis line U1 of the winding drum 110, and rotates relative to the eccentric member 270. The eccentric member 270 and the rotational gear 280 are eccentric with respect to the plurality of fixed teeth 261, and the rotational gear 280 comes into contact with a part of the plurality of fixed teeth 261. A gap is formed between the rotational gear 280 and the fixed teeth 261, except for the fixed teeth 261 being in contact with the rotational gear 280. By the rotation of the eccentric member 270, in a state where the rotational gear 280 is eccentric with respect to the axis line U1 of the winding drum 110, the eccentric member 270 that is rotating moves the rotational gear 280 along the plurality of fixed teeth 261.

When the eccentric member 270 rotates once, the rotational gear 280 moves one round along the plurality of fixed teeth 261 inside the plurality of fixed teeth 261. While moving of the rotational gear 280, the rotational gear 280 sequentially comes into contact with a part of the plurality of fixed teeth 261, and a part of the plurality of fixed teeth 261 sequentially meshes with a part of the plurality of outer circumferential teeth 281. Through this meshing, the rotational gear 280 interlocks with the rotation of the winding drum 110 and the eccentric member 270, to thereby rotate about the axis line U3 (center U2). The rotational gear 280 moves while rotating, and rolls along the plurality of fixed teeth 261. By the rotation of the rotational gear 280, the axis line U3 of the rotational gear 280 rotates and moves, with the axis line U1 of the winding drum 110 as the center.

The plurality of transmission holes 291 of the rotational gear 280 includes two or more circular holes formed in a circular shape having the same inner diameter and is formed with a space at a position a predetermined distance away from the axis line U3 of the rotational gear 280. Furthermore, between the center hole 282 and the outer circumferential teeth 281, the plurality of transmission holes 291 is formed in the rotational gear 280 with a space of 180 degrees or less (angular space) in a circumferential direction, with the axis line U3 of the rotational gear 280 as a center. Here, the plurality of transmission holes 291 is arranged at regular intervals (equal angular space) in the circumferential direction of a circle (same circle) with the axis line U3 of the rotational gear 280 as a center, and is positioned on the same circle with the axis line U3 as a center. More specifically, four transmission holes 291 are arranged at a space of 90 degrees in the circumferential direction, with the axis line U3 as a center, surrounding the center hole 282, and are positioned at the same distance away from the axis line U3.

Meanwhile, when the position and space of the transmission hole 291 are specified with respect to the retractor 101, the position and space thereof are specified with reference to a center of the transmission hole 291. Therefore, the position of the transmission hole 291 is a position of a center thereof, and the spaces among the transmission holes 291 are spaces among the centers of the transmission holes 291. For example, when the plurality of transmission holes 291 is positioned on the same circle, the centers of the plurality of transmission holes 291 are positioned on the same circle. When the spaces among the plurality of transmission holes 291 are the space of 180 degrees or less in the circumferential direction, the spaces among the centers of the plurality of transmission holes 291 are the space of 180 degrees or less therein. Further, when the plurality of transmission holes 291 is formed with the space of 180 degrees or less in the circumferential direction, the plurality of transmission holes 291 is formed such that none of the spaces among the plurality of transmission holes 291 in the circumferential direction is larger than the space of 180 degrees and thus all the spaces are 180 degrees or less. Such a state is referred to as the space of 180 degrees or less. Therefore, in the rotational gear 280, two transmission holes 291 are formed with the space of 180 degrees such that the space is not larger than the space of 180 degrees.

The movement member 250 includes the center hole 251, an outer circumferential portion 252 in a circular shape, an outer edge convex portion 253 in a circular-arc shape formed on the outer circumferential portion 252, and a plurality of transmission protrusions 292 in a post-like shape (here, columnar shape) that is a part of the transmission mechanism 290. The outer edge convex portion 253 is formed on apart of the outer circumferential portion 252, and protrudes from the movement member 250 toward the mechanism cover 200. The outer edge convex portion 253 of the movement member 250 is formed from an outside of the rotational gear 280 in the drum shaft direction toward the mechanism cover 200, and is arranged outside the plurality of fixed teeth 261 in a radial direction of the movement member 250.

An axis line (rotation center) U4 of the movement member 250 is aligned with the axis line U1 of the winding drum 110, and the movement member 250 is coaxial with the winding drum 110. Furthermore, the axis line U4 of the movement member 250 is positioned a predetermined distance away from the axis line U3 of the rotational gear 280, and the rotational gear 280 rotates in a state of being eccentric with respect to the axis line U4 of the movement member 250. By the rotation of the rotational gear 280, the movement member 250 rotates by interlocking with the rotation of the rotational gear 280 about the axis lines U1 and U4.

The plurality of transmission protrusions 292 includes two or more columnar portions formed in a columnar shape having the same outer diameter and is formed with a space at a position a predetermined distance away from the axis line U4 of the movement member 250. Moreover, between the center hole 251 and the outer circumferential portion 252, the plurality of transmission protrusions 292 is formed on the movement member 250 with a space of 180 degrees or less (angular space) in a circumferential direction about the axis line U4 of the movement member 250. Here, the plurality of transmission protrusions 292 is arranged at regular intervals (equal angular space) in the circumferential direction of a circle (same circle) about the axis line U4 of the movement member 250, and positioned on the same circle about the axis line U4. More specifically, the same number (four) of the transmission protrusions 292 as that of the plurality of transmission holes 291 are arranged with the space of 90 degrees in the circumferential direction about the axis line U4 as surrounding the center hole 251, and are positioned at the same distance away from the axis line U4. The plurality of transmission protrusions 292 is arranged on a circle having a same diameter as that of a circle on which the plurality of transmission holes 291 is arranged.

When the position and space of the transmission protrusion 292 are specified with respect to the retractor 101, the position and space thereof are specified with reference to a center of the transmission protrusion 292. Therefore, the position of the transmission protrusion 292 is a position of a center of the transmission protrusion 292, and the spaces among the transmission protrusions 292 are the spaces among the centers of the transmission protrusions 292. For example, when the plurality of transmission protrusions 292 is positioned on the same circle, the centers of the plurality of protrusions 292 are positioned on the same circle. When the spaces among the plurality of transmission protrusions 292 are the space of 180 degrees or less in the circumferential direction, the spaces among the centers of the plurality of transmission protrusions 292 are the space of 180 degrees or less in the circumferential direction. Further, when the plurality of transmission protrusions 292 is formed with the space of 180 degrees or less in the circumferential direction, the plurality of transmission protrusions 292 is formed such that none of the spaces among the plurality of transmission protrusions 292 in the circumferential direction is larger than the space of 180 degrees and thus all the spaces are 180 degrees or less. Such a state is referred to as the space of 180 degrees or less. Therefore, in the movement member 250, two transmission protrusions 292 are formed with the space of 180 degrees such that the space is not larger than 180 degrees.

The transmission mechanism 290 includes the plurality of transmission holes 291, and the plurality of transmission protrusions 292 that is always movable in each transmission hole 291. When, in a state where the axis line U3 of the rotational gear 280 and the axis line U4 of the movement member 250 are aligned with each other and the rotational gear 280 and the movement member 250 are combined with each other, the positions of the plurality of transmission holes 291 and those of the plurality of transmission protrusions are aligned with each other. The plurality of transmission protrusions 292 is inserted into each corresponding transmission hole 291 and is arranged therein. Here, the transmission mechanism 290 includes plural pairs of transmission hole 291 and transmission protrusion 292 including the plurality of transmission holes 291 and the plurality of transmission protrusions 292 that are arranged with equal angular space in each circumferential direction. With the plural pairs of the transmission hole 291 and the transmission protrusion 292, the transmission mechanism 290 sequentially transmits the rotation of the rotational gear 280 to the movement member 250, and rotates the movement member 250 in the same direction as the rotational direction of the rotational gear 280.

The plurality of transmission protrusions 292 is formed so as to have a predetermined outer diameter smaller than an inner diameter of the transmission hole 291, and is formed at a position corresponding to each of the plurality of transmission holes 291. The plurality of transmission protrusions 292 is arranged in each corresponding transmission holes 291, and when the rotational gear 280 rotates, the plurality of transmission protrusions 292 moves in each of the transmission holes 291. When the axis line U3 of the rotational gear 280 is aligned with the axis line U4 of the movement member 250, as to each of the plural pairs of the transmission hole 291 and the transmission protrusion 292, the center of the transmission protrusion 292 is aligned with the center of the transmission hole 291. From the state described above, when the rotational gear 280 is eccentric with respect to the winding drum 110 and the movement member 250, the transmission protrusion 292 moves relative to an inner circumferential side of the transmission hole 291 to thereby come into contact with an inner circumference (inner circumferential face) of the transmission hole 291. The transmission mechanism 290 transmits the rotation of the rotational gear 280 to the movement member 250 while the inner circumference of the transmission hole 291 being in contact with an outer circumference of the transmission protrusion 292.

Figure 42:
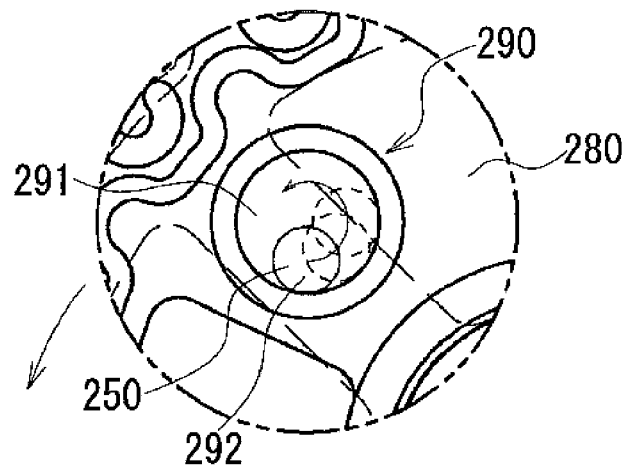
FIG. 42 illustrates a pair of a transmission hole and a transmission protrusion.

FIG. 42 illustrates a pair of the transmission hole 291 and the transmission protrusion 292, and illustrates a part of FIG. 41.

As illustrated in FIG. 42, when the rotational gear 280 rotates, the transmission protrusion 292 of the movement member 250 moves along the inner circumference of the transmission hole 291, and is pressed by the inner circumference thereof. Therefore, the rotation of the rotational gear 280 is transmitted to the movement member 250 to rotate the movement member 250.

Figure 43A:
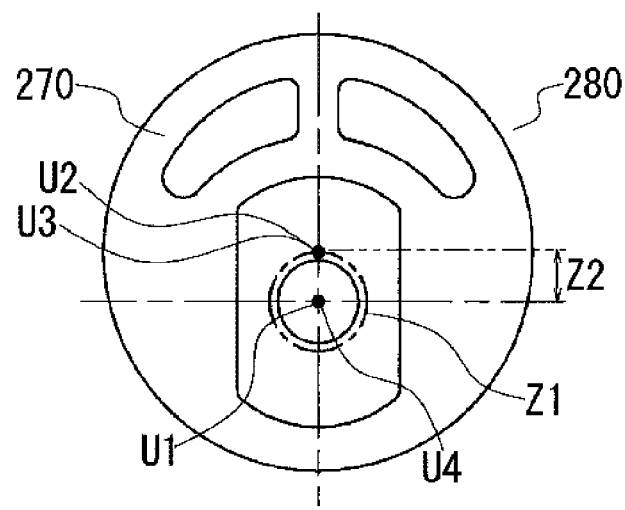
FIGS. 43A and 43B illustrate relationships between the rotation gear and a transmission mechanism.
Figure 43B:
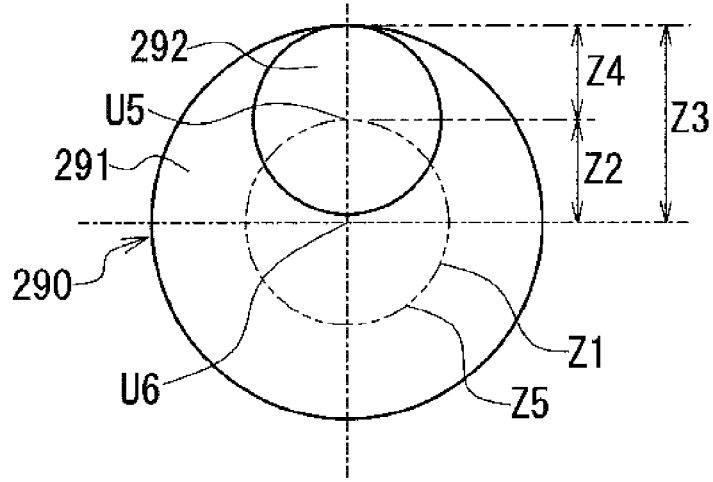

FIGS. 43A, 43B illustrate relationships between the rotational gear 280 and the transmission mechanism 290.

As illustrated in FIGS. 43A and 43B, when the rotational gear 280 moves along the plurality of fixed teeth 261, an axis line track Z1 of the rotational gear 280 is shaped in a circle having a predetermined diameter (refer to FIG. 43A). The axis line track Z1 is a track of the axis line U3 of the rotational gear 280 moved by the eccentric member 270 along the plurality of fixed teeth 261. The axis line track Z1 of the rotational gear 280 is shaped in a circle about the axis line U1 of the winding drum 110, and is aligned with a track of the center U2 of the eccentric member 270 rotating together with the winding drum 110. A radius of the axis line track Z1 is a distance from the axis line U1 to the axis line U3 (center U2), and an amount of eccentricity Z2 of the rotational gear 280 (eccentric member 270) with respect to the winding drum 110.

A radius Z3 of the transmission hole 291 is set to be a sum (Z2+Z4) of the amount of eccentricity Z2 of the rotational gear 280 and a radius Z4 of the transmission protrusion 292 (refer to FIG. 43B). When the transmission hole 291 is formed in a circle having the radius Z3, the axis line track Z1 of the rotational gear 280 is shaped to be aligned with a center track Z5 of the transmission protrusion 292 in the transmission hole 291. The center track Z5 is a track of a center U5 of the transmission protrusion 292 in the transmission hole 291 when the transmission protrusion 292 moves one round as being in contact with the inner circumference of the transmission hole 291. The center U5 of the transmission protrusion 292 is a center of the transmission protrusion 292, a part of which is in contact with the inner circumference of the transmission hole 291. A center of the center track Z5 is positioned at a center U6 of the transmission hole 291. Furthermore, the center track Z5 of the transmission protrusion 292 is shaped in a circle having a same diameter as that of the circular axis line track Z1 of the rotational gear 280. Therefore, the transmission protrusion 292 smoothly moves along the inner circumference of the transmission hole 291 along with the movement and rotation of the rotational gear 280.

Figure 44A:
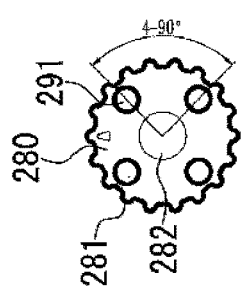
FIGS. 44A and 44B illustrate actions of a deceleration mechanism.
Figure 44B:
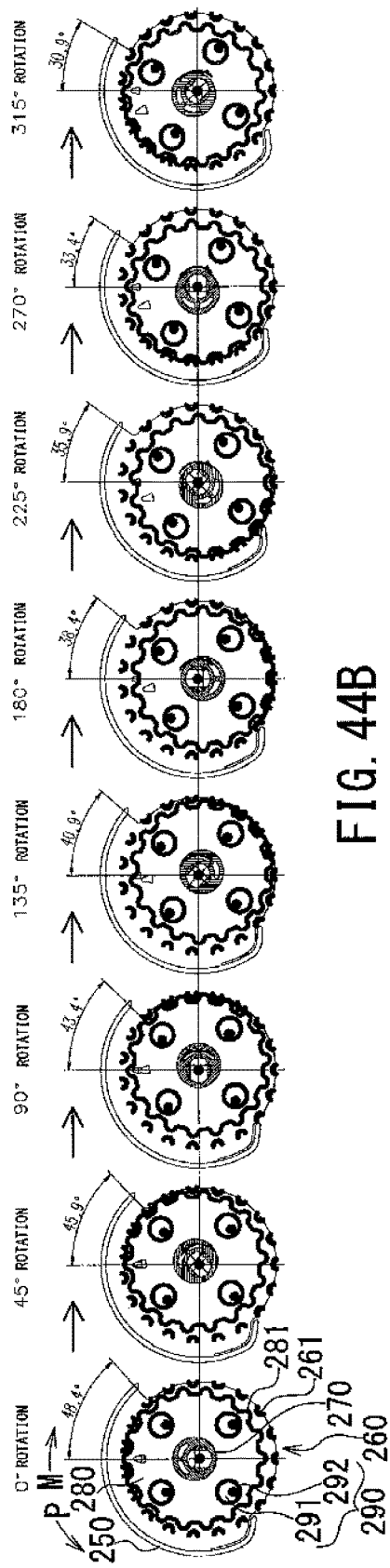

FIGS. 44A, 44B illustrate actions of the deceleration mechanism 260, and illustrate a part of the deceleration mechanism 260 and the movement member 250 corresponding to FIG. 41. However, FIG. 44A illustrates only the rotational gear 280. FIG. 44B sequentially illustrates the actions of the deceleration mechanism 260 from the left to the right when the winding drum 110 rotates in the winding direction "M" of the webbing 2. Further, FIG. 44B illustrates the eccentric member 270 rotating each 45 degrees in the winding direction "M" by the rotation of the winding drum 110, and also illustrates a state of the rotational gear 280 and the movement member 250 changing by the rotation of the eccentric member 270.

As illustrated in FIG. 44B, the eccentric member 270 rotates together with the winding drum 110 in a state where the center U2 is eccentric with respect to the axis line U1 of the winding drum 110. The rotational gear 280 moves along the plurality of fixed teeth 261 by the eccentric member 270, while sequentially contacting with a part of the fixed teeth 261 inside the plurality of fixed teeth 261. When the rotational gear 280 moves in an arrangement direction (circumferential direction) of the plurality of fixed teeth 261, the plurality of outer circumferential teeth 281 sequentially meshes with the fixed teeth 261 to gradually rotate the rotational gear 280. While the rotational gear 280 moves one round along the plurality of fixed teeth 261, the rotational gear 280 rotates in an opposite direction of the rotational direction of the winding drum 110 and the eccentric member 270 by an amount of difference between the number of the outer circumferential teeth 281 and that of the fixed teeth 261. Therefore, the rotational gear 280 rotates at a rotational speed slower than that of the winding drum 110.

Here, the eccentric member 270 rotating in the winding direction "M" moves the rotational gear 280 one round along the plurality of fixed teeth 261 and, then, the rotational gear 280 rotates in the drawing-out direction "P" by an angle corresponding to one outer circumferential tooth 281. More specifically, since the eighteen outer circumferential teeth 281 are provided, the angle corresponding to one outer circumferential tooth 281 is one eighteenth of 360 degrees (20 degrees). The rotational gear 280 rotates 2.5 degrees each time the eccentric member 270 rotates 45 degrees and, when the eccentric member 270 rotates 360 degrees, the rotational gear 280 rotates 20 degrees.

As described above, inside the plurality of fixed teeth 261, the eccentric member 270 and the plurality of fixed teeth 261 rotates the rotational gear 280 with respect to the winding drum 110 at a decelerated speed. At this time, by the rotation of the eccentric member 270, the rotational gear 280 sequentially meshes with each of the fixed teeth 261 and rotates with respect to the winding drum 110 at the decelerated speed, while moving along the plurality of fixed teeth 261. While the rotational gear 280 is rotating, the transmission protrusion 292 is pressed by the inner circumference of the transmission hole 291 from behind in the rotational direction of the rotational gear 280. Namely, the inner circumference of one transmission hole 291 presses the transmission protrusion 292 in the rotational direction of the rotational gear 280 with a half portion (range of 180 degrees) (referred to as a transmission portion) behind in the rotational direction of the rotational gear 280. Therefore, in order to always transmit the rotation of the rotational gear 280 to the movement member 250 by the transmission hole 291 and the transmission protrusion 292, two or more pairs of the transmission hole 291 and the transmission protrusion 292 need to be provided with a space of 180 degrees or less. The plurality of transmission holes 291 and the plurality of transmission protrusions 292 are formed with the space of 180 degrees or less respectively, so as to satisfy the condition described above. Furthermore, the center track Z5 of the transmission protrusion 292 is shaped in a circle having the same diameter as that of the circular axis line track Z1 of the rotational gear 280.

In the transmission mechanism 290 including such transmission hole 291 and transmission protrusion 292, when the rotational gear 280 rotates, the plurality of transmission protrusions 292 smoothly moves each transmission hole 291. Furthermore, at least one pair of the plural pairs of transmission hole 291 and the transmission protrusion 292 is maintained in a state where the outer circumference of the transmission protrusion 292 is in contact with the transmission portion of the inner circumference of the transmission hole 291. By the movement and rotation of the rotational gear 280, each transmission protrusion 292 may separate away from the transmission portion of the transmission hole 291, but all the transmission protrusions 292 do not separate away from the transmission portions of the transmission holes 291 at a time. At least one of the plurality of transmission protrusions 292 comes into contact with the inner circumference of one of the plurality of the transmission holes 291 behind the rotational gear 280 in the rotational direction (transmission portion), and thus, is pressed by the inner circumference of the transmission hole 291, while moving along the inner circumference of the transmission hole 291. When at least one transmission protrusion 292 is pressed by the transmission portion of the transmission hole 291, the plurality of transmission protrusions 292 always transmits the rotation of the rotational gear 280 to the movement member 250. Therefore, the movement member 250 is rotated. The rotational gear 280 and the movement member 250 are rotated at a predetermined angle each time the rotational gear 280 moves one round.

In a state where at least one transmission protrusion 292 is in contact with the transmission portion of the transmission hole 291, the plurality of transmission protrusions 292 moves in each transmission hole 291. By the movement described above, the movement member 250 smoothly rotates together with the rotational gear 280, and the rotation of the movement member 250 synchronizes with the rotation of the rotational gear 280. Furthermore, the change of a ratio between an amount of rotation of the winding drum 110 and that of the movement member 250 is prevented. Even when the rotational direction of the rotational gear 280 is changed, the transmission mechanism 290 correctly transmits the rotation of the rotational gear 280 to the movement member 250. Therefore, the movement member 250 rotates by correctly interlocking with the rotation of the winding drum 110. The deceleration mechanism 260 decelerates the rotation of the winding drum 110 in the winding direction "M" and the drawing-out direction "P", to thereby transmit the rotation of the winding drum 110 from the eccentric member 270 to the movement member 250. Therefore, the movement member 250 is rotated at the rotational speed slower than that of the winding drum 110, and in the opposite direction of the rotational direction of the winding drum 110. Here, while the entire webbing 2 is being drawn out, the movement member 250 rotates by a predetermined angle of 360 degrees or less.

The movement member 250 (refer to FIGS. 30 and 31) is a deceleration member rotating at a decelerated speed with respect to the winding drum 110, and on the basis of a rotational angle, controls the state of the retractor 101. The deceleration mechanism. 260 rotates the movement member 250 by interlocking with the rotation of the winding drum 110 (drawing-out of the webbing 2 from the winding drum 110 and winding of the webbing 2 onto the winding drum 110). Therefore, the movement member 250 rotates corresponding to an amount of drawing-out of the webbing 2 drawn out from the winding drum 110 (drawing-out length) and an amount of winding of the webbing 2 wound onto the winding drum 110 (winding length), to thereby control the state of the retractor 101.

The switching means 220 controls the state of the retractor 101 by the rotating movement member 250, to thereby switch the state thereof between the ELR state and the ALR state. At this time, the switching means 220 controls an operation of the locking mechanism 109 by the movement member 250, to thereby switch the locking mechanism 109 between the operation state and the waiting state, and switch the state of the retractor 101. The switching means 220 controls the states of the locking mechanism 109 and the retractor 101 depending on the winding length and the drawing-out length of the webbing 2 to switch the states thereof. Furthermore, the movement member 250 is a cam member to move the arrangement member 240 by rotation and controls a position of the operation member 230 via the arrangement member 240. The switching means 220 controls positions of the arrangement member 240 and the operation member 230 by the movement member 250 to thereby switch the states of the locking mechanism 109 and the retractor 101.

The arrangement member 240 is a cam follower driven by the movement member 250, and is a switch lever for switching the states of the locking mechanism 109 and the retractor 101. The operation member 230 is an interlock member for interlocking with the arrangement member 240, and is an operation switch (switch) for switching the locking mechanism 109 between an operation and a non-operation. The locking mechanism 109 is operated by the operation member 230 to thereby stop the rotation of the winding drum 110 in the drawing-out direction "P". The mechanism cover 200 includes, outside the plurality of fixed teeth 261, first and second rotational shafts (shafts for rotation) 208 and 209 in a cylindrical shape, and a through opening 210 positioned near the opening 205. The first rotational shaft 208 is an operation-member rotational shaft, and the operation member 230 is rotatably mounted to the first rotational shaft 208. The second rotational shaft 209 is an arrangement-member rotational shaft, and the arrangement member 240 is rotatably mounted to the second rotational shaft 209.

The operation member 230 includes a press portion 231 protruding toward the mechanism cover 200. In the same way as the acceleration sensor 140, the press portion 231 presses the meshing pawl 165 to thereby operate the locking mechanism 109. The press portion 231 is inserted into the through opening 210, and moves therein. Furthermore, in the same way as the lock claw 145 (refer to FIGS. 38A and 38B) of the acceleration sensor 140, the press portion 231 is positioned near the meshing pawl 165, moves upward by movement of the operation member 230 to press the meshing pawl 165 upward. The operation member 230 moves the meshing pawl 165 from the non-mesh position C1 to the mesh position C2, and meshes with the teeth 173 of the ratchet wheel 174. When the meshing pawl 165 moves to the mesh position C2, the clutch 190 is coupled with the locking gear 170 by the meshing pawl 165 and the ratchet wheel 174. Subsequently, the locking mechanism 109 is operated in the same way as described above (refer to FIGS. 39A and 39B).

Figure 45:
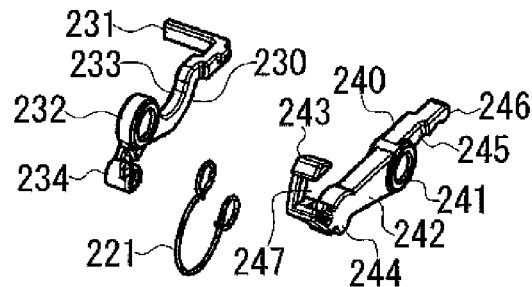
FIG. 45 is a perspective view of an operation member, an arrangement member, and an urging means.
Figure 46A:
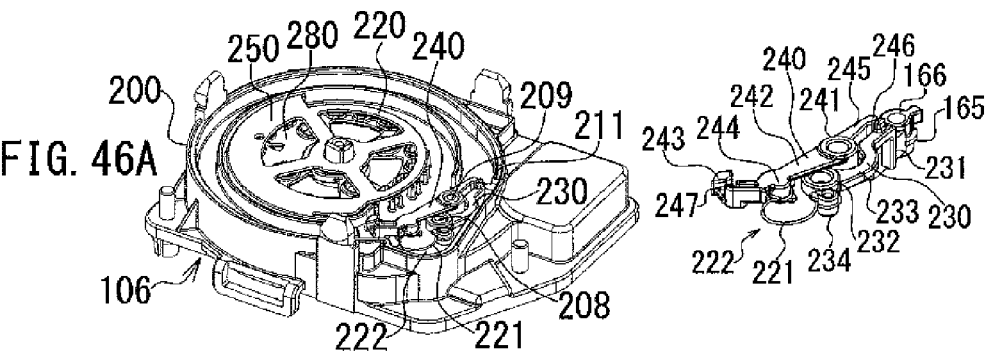
FIGS. 46A to 46C are perspective views of the mechanism cover unit.
Figure 46B:
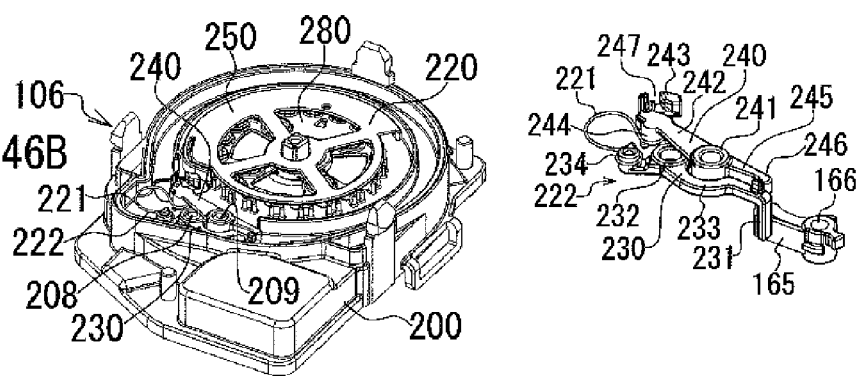
Figure 46C:
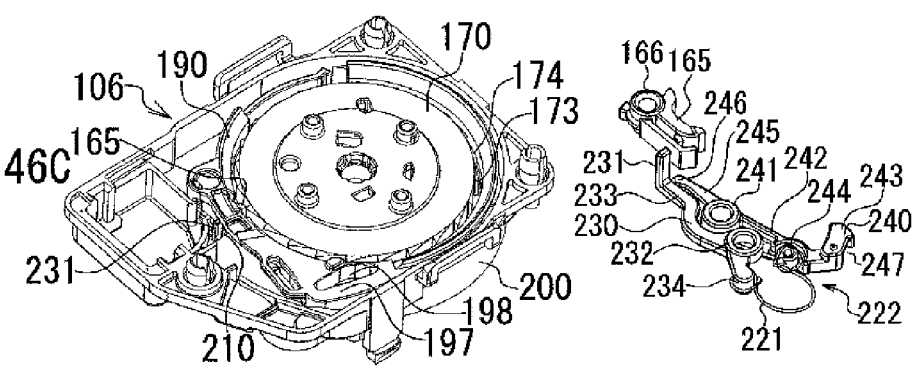

FIG. 45 is a perspective view of the operation member 230, the arrangement member 240, and the urging means 221, and illustrates a part of FIG. 30. FIGS. 46A to 46C are perspective views of the mechanism cover unit 106, and illustrate the mechanism cover unit 106 viewed in three directions. Furthermore, FIGS. 46A to 46C illustrate the operation member 230, the arrangement member 240, the urging means 221, and the meshing pawl 165 in the mechanism cover unit 106.

As illustrated in FIGS. 46A to 46C, when each portion of the switching means 220 is mounted to the mechanism cover 200, the operation member 230 and the arrangement member 240 are mounted to different shafts 208 and 209, and are rotatably combined by interlocking with each other. The urging means 221 includes an elastically-deformable urging member (spring, rubber, elastic member and the like) (here, spring formed of linear material made of steel), and is mounted to the operation member 230 and the arrangement member 240. The urging means 221 is operation-member urging means and also arrangement member urging means, and urges the operation member 230 and the arrangement member 240 in a predetermined direction respectively.

The operation member 230 includes a mounting portion 232 in a cylindrical shape mounted to the first rotational shaft 208, an arm portion 233 protruding from the mounting portion 232, and an urging portion 234 urged by the urging means 221. The operation member 230 rotates about the mounting portion 232 (first rotational shaft 208) to thereby move in a rotational direction. The press portion 231 of the operation member 230 is formed at a leading end of the arm portion 233. The urging portion 234 is formed on the mounting portion 232 on an opposite side of the arm portion 233.

The arrangement member 240 includes a mounting portion 241 in a cylindrical shape mounted to the second rotational shaft 209, an arm portion 242 protruding from the mounting portion 241, a contact portion 243 coming into contact with the movement member 250, an urging portion 244 urged by the urging means 221, an action protrusion 245 acting on the operation member 230, and a passage portion 247 for the movement member 250. The arrangement member 240 rotates about the mounting portion 241 (second rotational shaft 209), and moves in a rotational direction. The contact portion 243 and the urging portion 244 are formed at a leading end of the arm portion 242. The action protrusion 245 is shorter than the arm portion 242, and protrudes from the mounting portion 241 toward an opposite side of the arm portion 242. The arm portion 233 of the operation member 230 is arranged along the mounting portion 241 and the action protrusion 245 of the arrangement member 240. An action portion 246 is formed at a leading end of the action protrusion 245 to come into contact with the arm portion 233 of the operation member 230. The arm portion 242 of the arrangement member 240 is arranged on an urging portion 234 side of the operation member 230. In a state where the action portion 246 is in contact with the arm portion 233, the urging portions 234 and 244 are arranged with a space therebetween. The passage portion 247 includes a concave portion formed on the contact portion 243.

Two circular end portions of the urging means 221 are each mounted to the urging portion 234 of the operation member 230 and the urging portion 244 of the arrangement member 240. The urging means 221 urges the operation member 230 and the arrangement member 240 with a same force (urging force) in a direction where the urging portion 234 and the urging portion 244 separate away from each other. By the urging force described above, torque (rotational moment) acts on the operation member 230 and the arrangement member 240. A distance between a rotational center of the arrangement member 240 and the urging portion 244 is longer than a distance between a rotational center of the operation member 230 and the urging portion 234. Therefore, when the torque acts on the operation member 230 and the arrangement member 240 by the urging force of the urging means 221, the torque acting on the arrangement member 240 is larger than the torque acting on the operation member 230. Moreover, a distance between the rotational center of the arrangement member 240 and the action portion 246 is shorter than a distance between the rotational center of the operation member 230 and a position of the arm portion 233 that comes into contact with the action portion 246. As a result, a force applied from the action portion 246 to the arm portion 233 is larger than a force applied from the arm portion 233 to the action portion 246. The arm portion 233 is pressed and moved by the action portion 246.

The arrangement member 240 rotates (moves) while pressing the arm portion 233. At the same time, the operation member 230 rotates, and thus the arm portion 233 comes into contact with a stopper 211 (refer to FIG. 41) of the mechanism cover 200. The stopper 211 maintains the operation member 230 and the arrangement member 240 at a position where the locking mechanism 109 is not operated by the operation member 230. The operation member 230 does not press the meshing pawl 165 by the press portion 231, and arranges the meshing pawl 165 at the non-mesh position C1. The switching means 220 does not operate the locking mechanism 109, and maintains the locking mechanism 109 in the waiting state. From the state described above, the contact portion 243 comes into contact with the movement member 250 to thereby be moved by the movement member 250 against the urging force of the urging means 221. By a movement of the contact portion 243, the arrangement member 240 rotates (moves) to thereby move the action portion 246. At the same time, by the urging force of the urging means 221, in a state where the arm portion 233 is in contact with the action portion 246, the operation member 230 is rotated. As described above, the arrangement member 240 and the operation member 230 rotate by interlocking with each other.

When the operation member 230 moves in a direction of separating away from the stopper 211, the operation member 230 presses the meshing pawl 165 toward the ratchet wheel 174 by the press portion 231, and then, arranges the meshing pawl 165 at the mesh position C2. Furthermore, the movement member 250 maintains the arrangement member 240 at a position where the locking mechanism 109 is operated by the operation member 230, against the urging force of the urging means 221. At the same time, the operation member 230 is maintained at a position where the locking mechanism 109 is operated by the urging force of the urging means 221. The switching means 220 operates the locking mechanism 109, and thus the locking mechanism 109 is maintained in the operation state.

In the state described above, when the ratchet wheel 174 rotates in the winding direction "M", the meshing pawl 165 is displaced along the teeth 173 of the ratchet wheel 174 and is pressed outward in the radial direction of the ratchet wheel 174. Along with the state described above, the meshing pawl 165 presses the press portion 231 and thus the arm portion 233 is separated away from the action portion 246. As a result, the operation member 230 rotates to thereby further compress the urging means 221. The press portion 231 is maintained in a state being in contact with the meshing pawl 165 by the urging force of the urging means 221, and then, is displaced according to the displacement of the meshing pawl 165. Therefore, the retractor 101 includes a displacement mechanism 222 for displacing of the operation member 230 constituted as described above.

Figure 47:
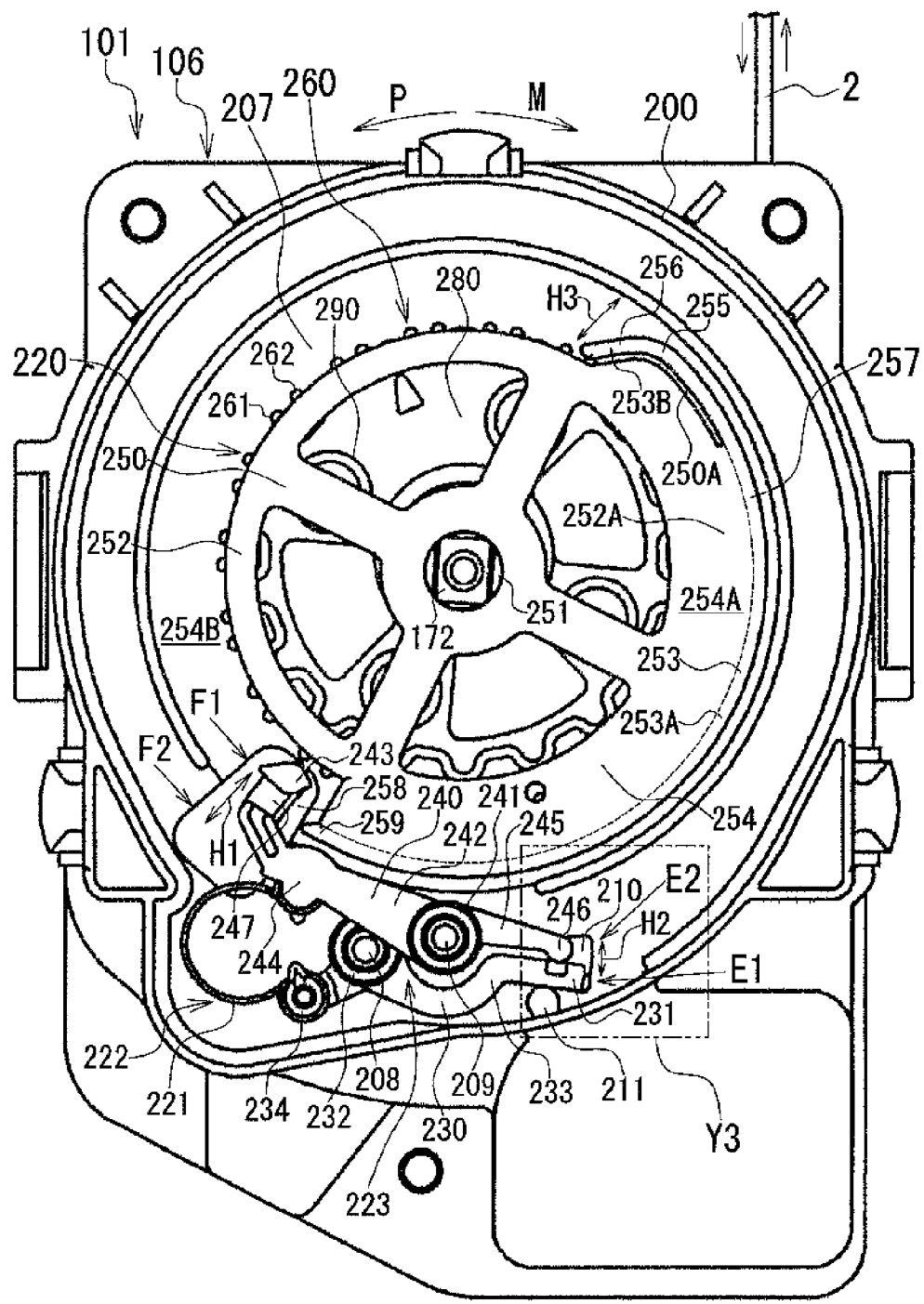
FIG. 47 is a side view of the mechanism cover unit.
Figure 48A:
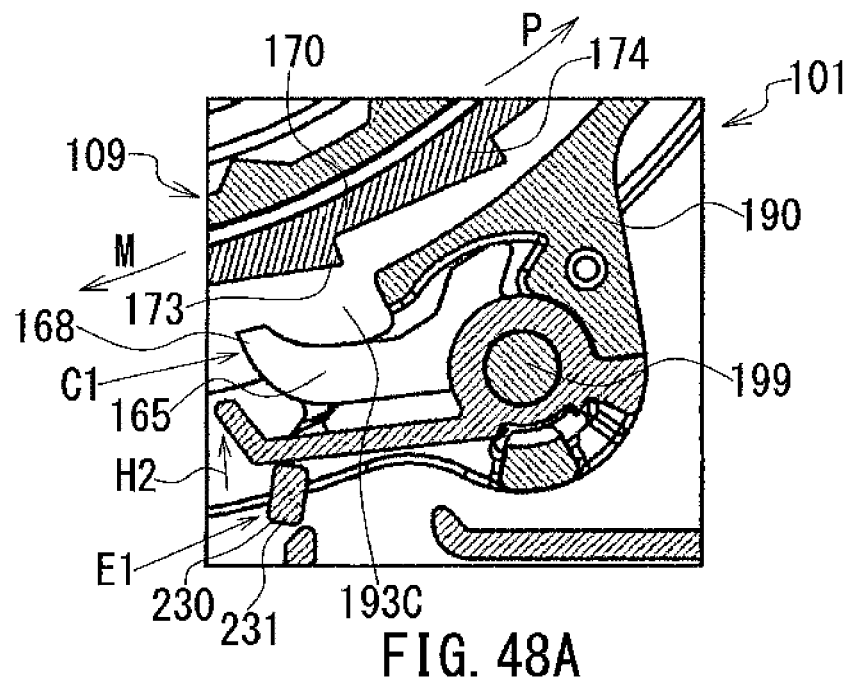
FIGS. 48A and 48B are cross-sectional views of a Y3 portion illustrated in FIG. 47.
Figure 48B:
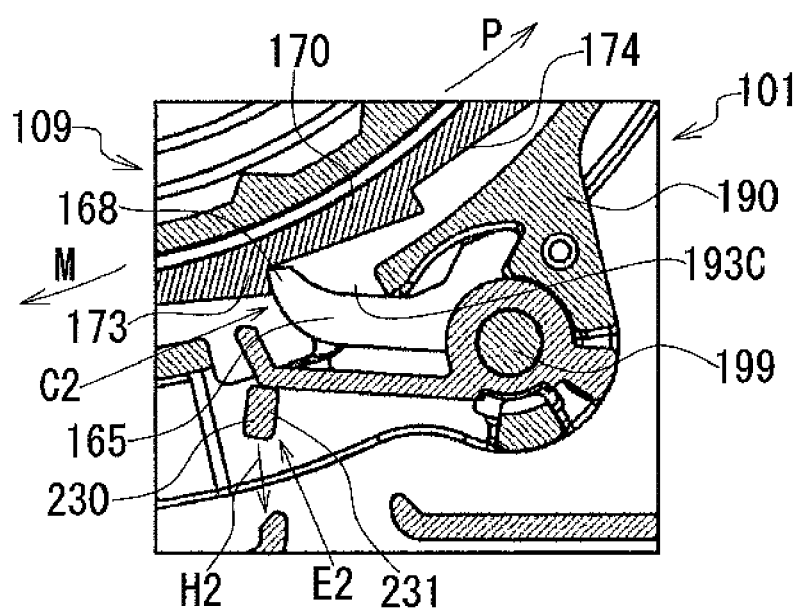

FIG. 47 is a side view of the mechanism cover unit 106, and illustrates the mechanism cover unit 106 viewed in an arrow W9 direction illustrated in FIG. 30. FIGS. 48A and 48B are cross-sectional views of a Y3 portion illustrated in FIG. 47. FIG. 48A illustrates the meshing pawl 165 arranged at the non-mesh position C1. FIG. 48B illustrates the meshing pawl 165 arranged at the mesh position C2.

As illustrated in FIG. 47, the operation member 230 and the arrangement member 240 rotate about the rotational shafts 208 and 209, respectively, to thereby move in the rotational direction. That is, the retractor 101 includes rotation means 223 for rotating to thereby move the operation member 230 and the arrangement member 240, and the rotation means 223 includes two rotational shafts 208 and 209. The arrangement member 240 is rotated to move by the rotation means 223 together with the operation member 230 (arrow H1 illustrated in FIG. 47). By interlocking with the movement (rotation) of the arrangement member 240, the operation member 230 rotates to move (arrow H2 in FIGS. 47, 48A and 48B). Therefore, the operation member 230 moves (rotates) to the non-operation position E1 where the locking mechanism 109 is not operated or the operation position E2 where the locking mechanism 109 is operated.

The non-operation position E1 of the operation member 230 is a position where the meshing pawl 165 is arranged at the non-mesh position C1 (refer to FIG. 48A). The operation member 230 moves to the non-operation position E1 to arrange the meshing pawl 165 at the non-mesh position C1. The meshing pawl 165 does not mesh with the teeth 173 of the ratchet wheel 174, and thus the locking mechanism 109 is maintained in the waiting state. The operation position E2 of the operation member 230 is a position where the meshing pawl 165 is arranged at the mesh position C2 (refer to FIG. 48B). The operation member 230 moves to the operation position E2 to thereby arrange the meshing pawl 165 at the mesh position C2. The meshing pawl 165 is pressed by the press portion 231 to thereby mesh with the teeth 173 of the ratchet wheel 174. The locking mechanism 109 is maintained in the operation position. The operation member 230 is moved from the non-operation position E1 to the operation position E2 by the arrangement member 240, to thereby operate the locking mechanism 109 with the meshing pawl 165. When the teeth 173 and the meshing pawl 165 are meshed with each other, the locking mechanism 109 is operated.

The urging means 221 always urges the operation member 230 toward the operation position E2, and the press portion 231 presses the meshing pawl 165. When the meshing pawl 165 comes into contact with the ratchet wheel 174, the press portion 231 presses the meshing pawl 165 to the ratchet wheel 174. In contrast to this, the urging means 221 always urges the arrangement member 240 in a direction in which the operation member 230 is moved to the non-operation position E1 (direction in which the press portion 231 is separated away from the meshing pawl 165). As illustrated in FIG. 47, the urging means 221 urges the operation member 230 so as to rotate in a counter-clockwise direction and urges the arrangement member 240 so as to rotate in a clockwise direction.

Due to the difference in the torque described above, the operation member 230 is pressed by the arrangement member 240 to thereby come into contact with the stopper 211 (refer to FIG. 47). In the state described above, the contact portion 243 of the arrangement member 240 is positioned near the fixed teeth 261, and the arrangement member 240 is arranged at a first position F1. The first position F1 of the arrangement member 240 is a position where the operation member 230 is arranged at the non-operation position E1, and the arrangement member 240 arranges the operation member 230 at the non-operation position E1. From the state described above, the arrangement member 240 moves toward a second position F2 outside the first position F1 to be arranged at the second position F2. The second position F2 is a position where the operation member 230 is arranged at the operation position E2. By the movement of the arrangement member 240, by the urging force of the urging means 221, the operation member 230 moves toward the operation position E2, and thus the press portion 231 approaches the meshing pawl 165.

The arrangement member 240 is rotated by the rotation means 223 to be arranged at the first position F1 or the second position F2. At the same time, the arrangement member 240 moves together with the operation member 230 to arrange the operation member 230 at the non-operation position E1 or the operation position E2. The urging means 221 urges the arrangement member 240 toward the first position F1. The arrangement member 240 is moved from the second position F2 to the first position F1 by the urging force of the urging means 221, and the operation member 230 is moved from the operation position E2 to the non-operation position E1.

When the movement member 250 moves the arrangement member 240 from the first position F1 to the second position F2, the operation member 230 is moved from the non-operation position E1 to the operation position E2 by the urging force of the urging means 221. Therefore, the meshing pawl 165 is pressed to the ratchet wheel 174 (refer to FIG. 48B). The meshing pawl 165 meshes with only the teeth 173 of the ratchet wheel 174 rotating in the drawing-out direction "P". In the state described above, when the ratchet wheel 174 rotates in the winding direction "M" together with the winding drum 110, the meshing pawl 165 is pressed by the teeth 173 as described above. The meshing pawl 165 is displaced along the teeth 173, and sequentially transfers from tooth to tooth of the plurality of teeth 173. By the displacement of the meshing pawl 165, in a state where the arrangement member 240 stops, the displacement mechanism 222 displaces the operation member 230 against the urging force of the urging means 221.

In a state where the arrangement member 240 is maintained at the second position F2, through the displacement mechanism 222, the meshing pawl 165 is displaced along the teeth 173 of the ratchet wheel 174 rotating in the winding direction "M" together with the winding drum 110. Therefore, during the rotation of the ratchet wheel 174 in the winding direction "M", the meshing pawl 165 is reliably maintained in a state of being ready for meshing with the plurality of teeth 173. When the ratchet wheel 174 rotates in the drawing-out direction "P", the meshing pawl 165 meshes with the teeth 173 again.

The arrangement member 240 (refer to FIGS. 47, 48A and 48B) moves together with the operation member 230 to thereby move, and moves the operation member 230 to the non-operation position E1 or the operation position E2. By the movement described above, the operation member 230 and the arrangement member 240 control the position of the meshing pawl 165, and also switch the state of the locking mechanism 109 and that of the retractor 101. When the arrangement member 240 moves the operation member 230 to the non-operation position E1, the meshing pawl 165 moves to the non-mesh position C1 and the clutch 190 and the locking gear 170 are uncoupled. Therefore, the state of the locking mechanism 109 is switched to the waiting state, and the state of the retractor 101 is switched to the ELR state accordingly. When the arrangement member 240 moves the operation member 230 to the operation position E2, the meshing pawl 165 moves to the mesh position C2, and the clutch 190 is coupled with the locking gear 170. Therefore, the state of the locking mechanism 109 is switched to the operation state, and the state of the retractor 101 is switched to the ALR state.

The movement member 250 arranges the arrangement member 240 to the first position F1 or the second position F2, and arranges the operation member 230 to the non-operation position E1 or the operation position E2. The movement member 250 rotates by interlocking with the rotation of the winding drum 110, and by the rotation, the movement member 250 moves the arrangement member 240 to the first position F1 or the second position F2. The movement member 250 includes the outer circumferential portion 252, the outer edge convex portion 253, a first maintaining portion 254 for maintaining the arrangement member 240 at the first position F1, a changing portion 255, a movement portion 256 for moving the arrangement member 240, a second maintaining portion 257 for maintaining the arrangement member 240 at the second position F2, and a release portion 258. The contact portion 243 of the arrangement member 240 comes into contact with each of the portions 253, 255, 256, and 257 of the movement member 250.

The outer circumferential portion 252 includes an expansion portion 252A expanded outward in the radial direction of the movement member 250, and covers the plurality of fixed teeth 261. The expansion portion 252A is formed in a circular-arc shape at a part of the outer circumferential portion 252. The outer edge convex portion 253 is a convex portion in a circular-arc shape formed at an edge of the expansion portion 252A, and is arranged so as to surround a part of the plurality of fixed teeth 261. The first maintaining portion 254 includes a passage 254A in a circular-arc shape formed between the plurality of fixed teeth 261 and the outer edge convex portion 253 (second maintaining portion 257). The passage 254A of the first maintaining portion 254 includes an open space between the expansion portion 252A and the mechanism cover 200. One end portion of the passage 254A is closed with the movement portion 256, and other end portion of the passage 254A is opened at a terminal portion 259 of the second maintaining portion 257.

The contact portion 243 of the arrangement member 240 enters the passage 254A of the first maintaining portion 254 from the other end portion of the passage 254A, and relatively moves along the outer edge convex portion 253 in the passage 254A. At this time, the outer edge convex portion 253 passes through the passage portion 247 of the arrangement member 240, and the arrangement member 240 (contact portion 243) is arranged at the first position F1 near the fixed teeth 261. When the contact portion 243 is positioned outside the passage 254A, the arrangement member 240 is arranged at the first position F1 near the fixed teeth 261, and relatively moves along the outer circumferential portion 252 of the movement member 250. Therefore, the first maintaining portion 254 of the movement member 250 includes the passage 254A and a peripheral portion 254B of the movement member 250 positioned outside the passage 254A. The peripheral portion 254B is a peripheral open space in a circular-arc shape along the outer circumferential portion 252 of the movement member 250, and is connected to the passage 254A.

The outer edge convex portion 253 includes a circular-arc portion 253A extending in a circumferential direction of the movement member 250 and a leading end portion 253B connected to an end portion of the circular-arc portion 253A, and bends inward in the radial direction of the movement member 250 at a portion between the circular-arc portion 253A and the leading end portion 253B. The second maintaining portion 257 includes the circular-arc portion 253A of the outer edge convex portion 253, and the movement portion 256 includes the leading end portion 253B thereof. The changing portion 255 includes the leading end portion 253B (movement portion 256) and an end portion of the circular-arc portion 253A (second maintaining portion 257) connected to the leading end portion 253B, and is positioned at a terminal portion of the first maintaining portion 254. By a slit 250A formed between the changing portion 255 and the expansion portion 252A, the changing portion 255 is separated away from the expansion portion 252A. When the changing portion 255 passes through the passage portion 247 of the arrangement member 240, the changing portion 255 is pressed by the contact portion 243 of the arrangement member 240 to thereby be elastically deformed outward in the radial direction of the movement member 250 (refer to an arrow H3 illustrated in FIG. 47).

FIGS. 49A to 51B illustrate actions of the switching means 220 by the rotation of the movement member 250, and illustrate the retractor 101 in the same way as that in FIG. 47. FIG. 49C is a cross-sectional view schematically illustrating a Y4 portion illustrated in FIG. 49B.

Figure 51A:
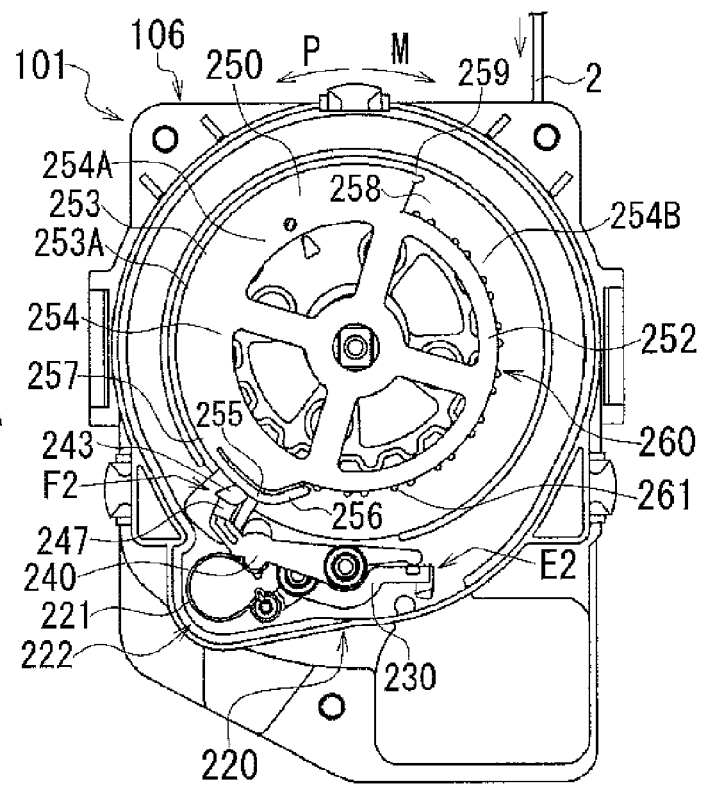
FIGS. 51A and 51B illustrate actions of the switching means by the rotation of the movement member.
Figure 51B:
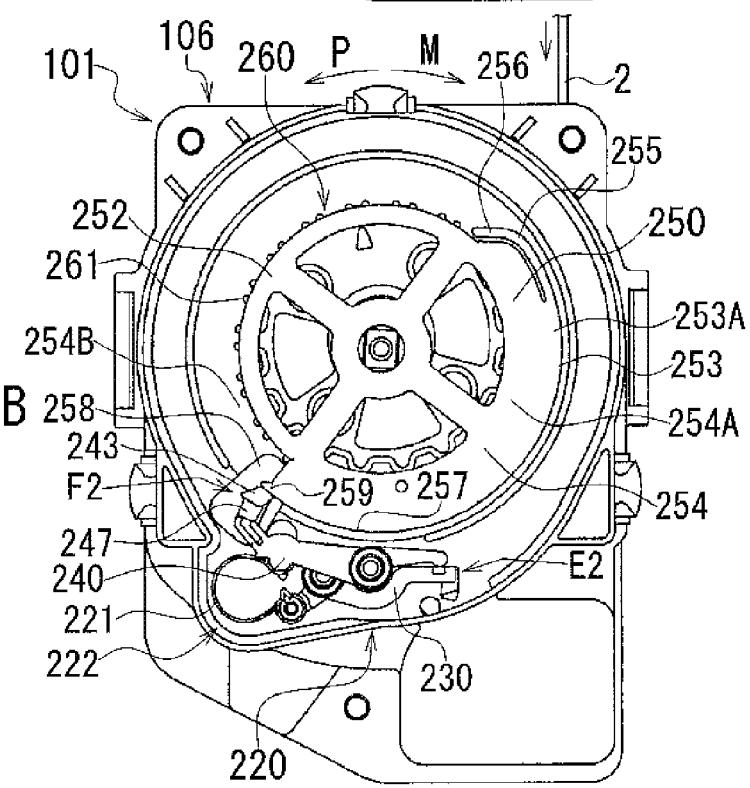

As illustrated in FIGS. 49A and 51B, when the winding drum 110 is rotated in the drawing-out direction "P" or in the winding direction "M" by the drawing-out and winding of the webbing 2, the movement member 250 is rotated in the opposite direction of the rotational direction of the winding drum 110 by the deceleration mechanism 260. Furthermore, by the rotation of the movement member 250, the arrangement member 240 relatively moves in the circumferential direction of the movement member 250 and relatively moves along each of the portions 252 to 257 of the movement member 250.

When the webbing 2 is completely wound onto the winding drum 110, the contact portion 243 of the arrangement member 240 is arranged at the first maintaining portion 254 (peripheral portion 254B) (refer to FIG. 49A). The arrangement member 240 is maintained at the first position F1 and the operation member 230 is maintained at the non-operation position E1 by the first maintaining portion 254. Subsequently, when the movement member 250 is rotated by the drawing-out of the webbing 2, the arrangement member 240 (contact portion 243) relatively moves along the first maintaining portion 254 (passage 254A and peripheral portion 254B). Furthermore, by the drawing-out and winding of the webbing 2, the arrangement member 240 relatively moves in the circumferential direction of the movement member 250 in the first maintaining portion 254. Until the webbing 2 is drawn out from the winding drum 110 by a predetermined length (predetermined drawing-out length), the contact portion 243 is arranged in the first maintaining portion 254, and the arrangement member 240 is maintained at the first position F1 by the first maintaining portion 254. As a result, the state of the locking mechanism 109 is maintained in the waiting state, and the state of the retractor 101 is maintained in the ELR state.

When the predetermined length of the webbing 2 is drawn out from the winding drum 110 (refer to FIG. 49B), the arrangement member 240 is relatively displaced along the changing portion 255, and changing portion 255 changes the position of the arrangement member 240 from the first maintaining portion 254 to a movement position by the movement portion 256. The movement position by the movement portion 256 is a position where the arrangement member 240 becomes being movable by the movement portion 256. After the arrangement member 240 moves to the movement position, the arrangement member 240 is moved by the movement portion 256. Here, by the rotation of the movement member 250 when the webbing 2 is drawn out, the contact portion 243 of the arrangement member 240 approaches the changing portion 255 in the passage 254A of the first maintaining portion 254 (refer to FIG. 49C). Subsequently, the contact portion 243 comes into contact with the changing portion 255 in the passage portion 247, to press the changing portion 255 outward in the radial direction of the movement member 250. Therefore, the changing portion 255 is elastically deformed to pass through the passage portion 247 (refer to FIG. 50A).

The arrangement member 240 elastically deforms the changing portion 255 to change the position of the arrangement member 240 from the first maintaining portion 254 to the movement position by the movement portion 256. Further, when the changing portion 255 completely passes through the passage portion 247, the changing portion 255 recovers into an original shape. At the same time, the movement portion 256 returns to an original position where the movement portion 256 closes the terminal portion (passage 254A) of the first maintaining portion 254, the contact portion 243 is arranged at a position where contact with the movement portion 256 becomes possible.

The movement member 250 is entirely formed of the synthetic resin, and the changing portion 255 that is apart of the movement member 250 is elastically deformed by the arrangement member 240. In contrast to this, only the changing portion 255 may be formed of a component different from other part of the movement member 250. In this case, the changing portion 255 is formed of the elastically deformable material (e.g., synthetic resin, or a plate made of stainless steel), and fixed to the movement member 250.

Figure 50A:
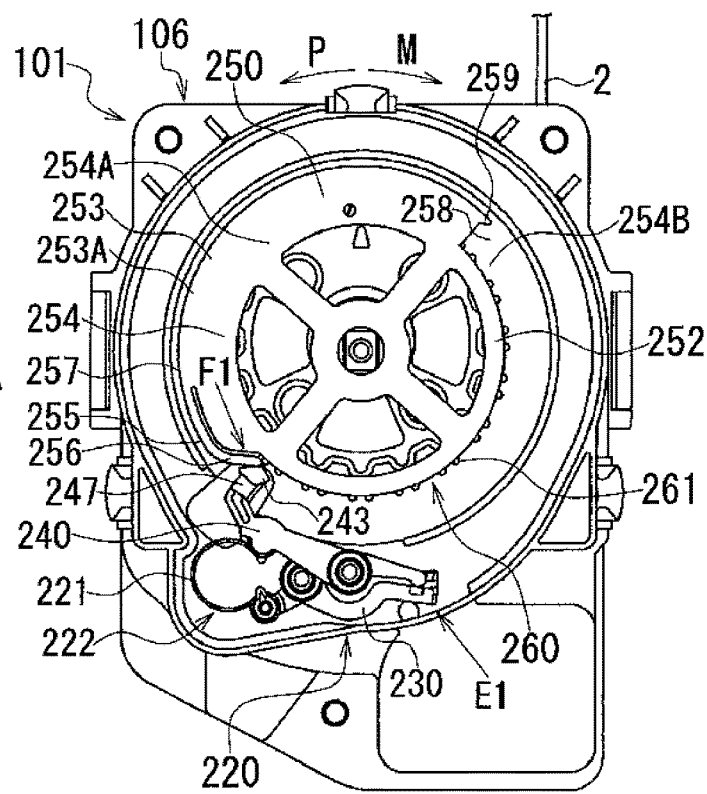
FIGS. 50A and 50B illustrate actions of the switching means by the rotation of the movement member.
Figure 50B:
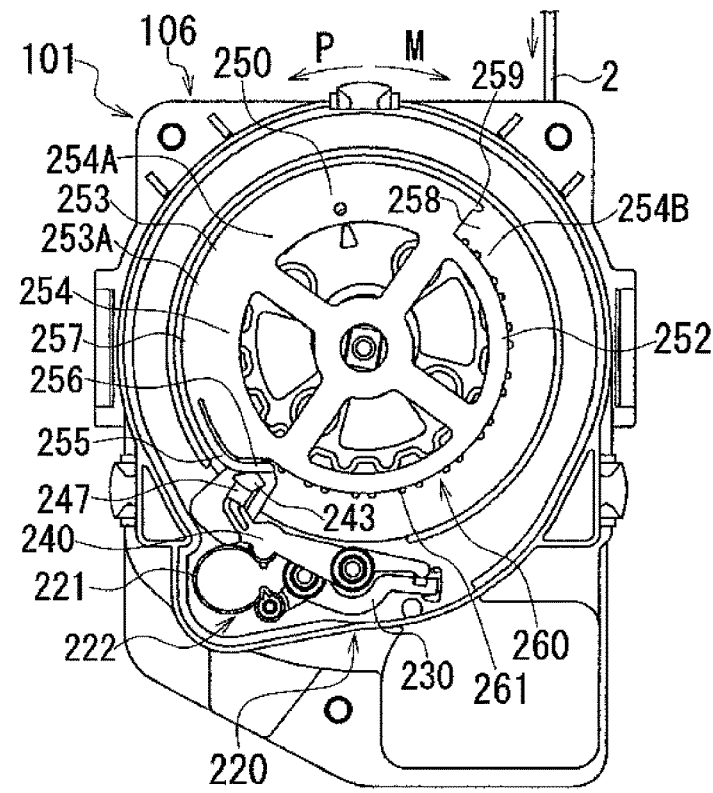

When the webbing 2 is wound onto the winding drum 110 after the predetermined length of the webbing being drawn out from the winding drum, by the rotation of the movement member 250, the movement portion 256 of the movement member 250 moves the arrangement member 240 from the first position F1 to the second position F2 (refer to FIG. 50B). The movement portion 256 includes an inclination portion (here, inclining convex portion) that inclines toward the second maintaining portion 257, and is formed from a position near the fixed teeth 261 to the circular-arc portion 253A (second maintaining portion 257). Further, the movement portion 256 inclines from the movement position by the movement portion 256 toward the second maintaining portion 257 with respect to the rotational direction of the movement member 250, and is connected to a front end portion of the second maintaining portion 257.

By the rotation of the movement member 250 when the webbing 2 is wound, the arrangement member 240 comes into contact with the movement portion 256 and gradually moves along the movement portion 256, and then is guided by the movement portion 256 from the first position F1 to the second position F2. Therefore, the movement portion 256 also functions as a guide portion for guiding the arrangement member 240 from the first position F1 to the second position F2.

When the movement portion 256 moves the arrangement member 240, the contact portion 243 of the arrangement member 240 is guided by the movement portion 256 to move toward the second maintaining portion 257 in a state where the contact portion 243 thereof is pressed to the movement portion 256 by the urging force of the urging means 221. Therefore, the arrangement member 240 moves outward in the radial direction of the movement member 250, and moves from the first position F1 to the second position F2 (refer to FIG. 51A). At the same time, the operation member 230 moves from the non-operation position E1 to the operation position E2, and the state of the locking mechanism 109 is switched from the waiting state to the operation state accordingly. As described above, when the webbing 2 is drawn out from the winding drum 110 by the predetermined length in the ELR state, the switching means 220 switches the state of the locking mechanism 109 to switch the state of the retractor 101 from the ELR state to the ALR state.

Here, when the webbing 2 is completely drawn out from the winding drum 110, the changing portion 255 changes the position of the arrangement member 240 from the first maintaining portion 254 to the movement position by the movement portion 256. Therefore, until the webbing 2 is completely drawn out from the winding drum 110, the first maintaining portion 254 maintains the arrangement member 240 at the first position F1. Further, when the webbing 2 completely drawn out from the winding drum 110 is wound onto the winding drum 110, the movement portion 256 moves the arrangement member 240. When the webbing 2 is completely drawn out from the winding drum 110, the switching means 220 switches the state of the retractor 101 from the ELR state to the ALR state.

At a portion where the movement portion 256 is connected to the second maintaining portion 257, the outer edge convex portion 253 gently bends to form a curving shape. Therefore, the contact portion 243 of the arrangement member 240 smoothly moves from the movement portion 256 to the second maintaining portion 257. The contact portion 243 comes into contact with the second maintaining portion 257 and is pressed to the second maintaining portion 257 by the urging force of the urging means 221. When the second maintaining portion 257 presses the contact portion 243, the second maintaining portion 257 holds the arrangement member 240. The second maintaining portion 257 includes the circular-arc portion 253A formed in a circular-arc shape, with the axis line U1 of the winding drum 110 as a center, outside in a radial direction of the first maintaining portion 254, and surrounds a part of the first maintaining portion 254 (passage 254A). While the webbing 2 is wound onto the winding drum 110 after the predetermined length of the webbing being drawn out from the winding drum, the arrangement member 240 comes into contact with the second maintaining portion 257, and is maintained by the second maintaining portion 257 at the second position F2. Here, while the webbing 2 completely drawn out is being wound, the arrangement member 240 is maintained at the second position F2. The second maintaining portion 257 is formed in a predetermined length along the circumferential direction of the movement member 250.

When the arrangement member 240 is maintained at the second position F2, the operation member 230 is maintained at the operation position E2. The operation member 230 arranged at the operation position E2 (refer to FIG. 48B) arranges the meshing pawl 165 at the mesh position C2 to mesh with the teeth 173 of the ratchet wheel 174. In the state described above, when the webbing 2 is drawn out, the clutch 190 rotates in the drawing-out direction "P" together with the locking gear 170 and the winding drum 110, and the meshing pawl 165 separates away from the operation member 230 (refer to FIG. 39). Further, the locking mechanism 109 is operated to lock the winding drum 110.

When the webbing 2 is wound, the meshing pawl 165 once comes off the teeth 173 of the ratchet wheel 174. Subsequently, the meshing pawl 165 comes into contact with the press portion 231 of the operation member 230 to be pressed up by the press portion 231, and the operation member 230 arranged at the operation position E2 arranges the meshing pawl 165 at the mesh position C2 again (refer to FIG. 48B). As a result, the state of the locking mechanism 109 is maintained in the operation state, and that of the retractor 101 is maintained in the ALR state accordingly. The locking mechanism 109 stops the rotation of the winding drum 110 only in the drawing-out direction "P".

By the rotation of the movement member 250 when the webbing 2 is wound (refer to FIG. 51B), the arrangement member 240 (contact portion 243) relatively moves along the second maintaining portion 257, and also relatively moves toward the terminal portion 259 of the second maintaining portion 257 and the release portion 258 of the movement member 250. Until the webbing 2 is wound onto the winding drum 110 by a predetermined length (predetermined winding length), the second maintaining portion 257 maintains the arrangement member 240 at the second position F2. Further, when the webbing 2 is wound onto the winding drum 110 by the predetermined length, the arrangement member 240 comes off the terminal portion 259 of the second maintaining portion 257 to be released toward the first maintaining portion 254 by the release portion 258. Before the webbing 2 is completely wound onto the winding drum 110, the arrangement member 240 comes off the terminal portion 259.

The contact portion 243 of the arrangement member 240 comes off the second maintaining portion 257 after reaching the terminal portion 259. Therefore, the contact portion 243 is released from the state of being pressed by the second maintaining portion 257, and the arrangement member 240 is released from the second maintaining portion 257. The release portion 258 of the movement member 250 is a portion continuing to the terminal portion 259, and includes a release region formed from the second maintaining portion 257 to the first maintaining portion 254. At the release portion 258, the arrangement member 240 moves from the second maintaining portion 257 to the first maintaining portion 254 inward in the radial direction of the movement member 250 without coming into contact with the movement member 250.

When the webbing 2 is wound onto the winding drum 110 by the predetermined length and the arrangement member 240 comes off the terminal portion 259 of the second maintaining portion 257, the release portion 258 releases the arrangement member 240 from the second maintaining portion 257 toward the first maintaining portion 254 (refer to FIG. 47). By this release, the arrangement member 240 is instantly moved from the second maintaining portion 257 (second position F2) to the first maintaining portion 254 (first position F1) by the urging force of the urging means 221. At the same time, the arrangement member 240 moves the operation member 230 from the operation position E2 to the non-operation position E1, and the state of the locking mechanism 109 is switched from the operation state to the waiting state. As described above, the webbing 2 is wound onto the winding drum 110 by the predetermined length in the ALR state, and then the switching means 220 switches the state of the locking mechanism 109 to instantly switch the state of the retractor 101 from the ALR state to the ELR state. Subsequently, the webbing 2 is wound onto the winding drum 110, or drawn out from the winding drum 110.

As described above, the retractor 101 of the second embodiment is operated in the same way as the retractor 1 of the first embodiment and, thus, the similar effect to that of the retractor 1 can be obtained. Further, since the operation member 230 and the arrangement member 240 are mounted to the different rotational shafts 208 and 209, compared with the retractor 1 of the first embodiment, the arrangement space for the operation member 230 and the arrangement member 240 in shaft directions of the rotational shafts 208 and 209 can be reduced. As a result, compared with the retractor 1 of the first embodiment, the operation member 230 and the arrangement member 240 can be arranged in compact.

The urging means 221 is the arrangement member urging means and also the operation member urging means, and includes one urging member mounted to the arrangement member 240 and the operation member 230. Since the arrangement member 240 and the operation member 230 are urged by the one urging member, the retractor 101 of the second embodiment can reduce the number of components, compared with the retractor 1 of the first embodiment. The arrangement member 240 and the operation member 230 may be rotatably mounted to one rotational shaft, and may be urged by the urging means 221.

According to the second embodiment (refer to FIG. 44B), the transmission mechanism 290 including four pairs of the transmission hole 291 and the transmission protrusion 292 is described, and the transmission mechanism 290 may include two or more pairs of the transmission hole 291 and the transmission protrusion 292. Furthermore, the plural pairs of the transmission hole 291 and the transmission protrusion 292 can be arranged with an arbitrary space of 180 degrees or less. The transmission hole 291 may be a hole passing through the rotational gear 280, or may be a hole not passing through the rotational gear 280 (including a recess formed on the rotational gear 280). Instead for forming the transmission hole 291 in the rotational gear 280, the transmission hole 291 may be formed in the movement member 250. In this case, the inner circumference of the transmission hole 291 of the movement member 250 is pressed by the transmission protrusion 292 formed on the rotational gear 280, whereby the rotation of the rotational gear 280 is transmitted to the movement member 250.

REFERENCE SYMBOLS 1 retractor
2 webbing
3 housing unit
4 winding drum unit
4A movable pawl
4B engagement teeth
4C interlocking pin
5 winding spring unit
6 mechanism cover unit
6A mechanism cover
6B clutch storage
6C sensor storage
6D sensor cover
6E opening
6F circular wall
6G stop portion
6H center support portion
6I insertion hole
6J engagement teeth
6K rotational shaft
6L circular support portion
6M opening
6V outer face cover
7 stopper pin
8 clutch unit
9 locking mechanism
10 winding drum
11 insertion portion
12 first shaft
13 second shaft
14 pawl storage portion
15 concave portion
16 protrusion
17 cap
20 housing
21 back-plate portion
22 first side wall portion
23 second side wall portion
24 fixed plate
25 first opening portion
26 locking teeth
27 second opening portion
30 locking clutch
31 center hole
32 spring holder
33 guide groove
34 through groove
35 teeth
36 ratchet wheel
37 arm support portion
38 support pin
39A, 39B, 39C stopper
40 locking arm
41, 42 end portion
43 through hole
44 engagement portion
45 sliding portion
46 engagement face
50 acceleration sensor
51 sensor holder
52 inertia mass body
53 sensor lever
54 lock claw
56 restraining member
57 pressing portion
60 switching means
61 operation member
62 arrangement member
63 first urging means
64 second urging means 65 rotation means
66 gap
67 displacement mechanism
70 movement member
71 center hole
72 inner convex portion
73 outer convex portion
74 first maintaining portion
75 changing portion
76 movement portion
77 second maintaining portion
78 release portion
79 terminal portion
80 deceleration mechanism
81 drive gear
82 intermediate gear
83 driven gear
101 retractor
103 housing unit
103A protector
104 winding drum unit
105 pretensioner unit
106 mechanism cover unit
107 winding spring unit
109 locking mechanism
110 winding drum
120 ratchet gear
121 ratchet teeth
130 housing
131 back-plate portion
132 first side wall portion
133 second side wall portion
134 fixing plate
135 bracket
136 first opening portion
137 pawl storage portion
138 second opening portion
140 acceleration sensor
141 sensor cover
150 movable pawl
160 torsion bar
163 wire
165 meshing pawl
166 mounting portion
167 reception portion
168 mesh tooth
170 locking gear
171 shaft hole
172 gear shaft portion
173 teeth
174 ratchet wheel
175 arm support portion
176 support pin
177 stopper
180 locking arm
181, 182 end portion
183 through hole
185 sensor spring
190 clutch
191 inner wall
192 clutch gear
193 outer wall
194 center hole
195 elastically-deforming portion
196 movable protrusion
197 guide portion
198 guide hole
199 pawl support portion
200 mechanism cover
201 first storage portion
202 second storage portion
203 drum support portion
204 insertion hole
205 opening
206 fixed protrusion
207 outside face
208 first rotational shaft
209 second rotational shaft
210 through opening
211 stopper
220 switching means
221 urging means
222 displacement mechanism
223 rotation means
230 operation member
240 arrangement member
250 movement member
251 center hole
252 outer circumferential portion
253 outer edge convex portion
254 first maintaining portion
255 changing portion
256 movement portion
257 second maintaining portion
258 release portion
259 terminal portion
260 deceleration mechanism
261 fixed teeth
262 fixed gear
270 eccentric member
280 rotational gear
290 transmission mechanism
291 transmission hole
292 transmission protrusion
L lock-operating direction
M winding direction
P drawing-out direction

What is claimed is:
1. A seat belt retractor comprising:
a winding drum capable of rotating in a winding direction and a drawing-out direction of a webbing;
a locking mechanism that stops only rotation in the drawing-out direction of the winding drum; and
an operation member that moves to a non-operation position, where the locking mechanism is not operated, or an operation position, where the locking mechanism is operated, the seat belt retractor further comprising:
an arrangement member that moves the operation member to thereby arrange the operation member at the non-operation position or the operation position;
a movement member that is rotated by a single revolution by interlocking with and responding to multiple rotations of the winding drum to thereby move the arrangement member to a first position, where the operation member is arranged at the non-operation position, or a second position, where the operation member is arranged at the operation position; and
arrangement member urging means configured to urge the arrangement member toward the first position,
wherein the movement member includes a first maintaining portion to allow the arrangement member at the first position for multiple rotations of the winding drum until a predetermined length of the webbing being drawn out from the winding drum and the movement member rotates a partial revolution, a movement portion continuous to the first maintaining portion and coming in contact with the arrangement member to move the arrangement member from the first position to the second position when winding the webbing onto the winding drum after the predetermined length of the webbing being drawn out from the winding drum, a second maintaining portion continuous to the movement portion and coming in contact with the arrangement member to maintain the arrangement member at the second position while winding the webbing onto the winding drum, a terminal of the second maintaining portion which allows the arrangement member to freely move from the second maintaining portion to the first maintaining portion by the arrangement member urging means without coming in contact with the movement member, before the predetermined length of the webbing being wound onto the winding drum, thereby the arrangement member is moved from the second position to the first position.

2. The seat belt retractor according to claim 1, wherein the movement member includes a changing portion for changing a position of the arrangement member from the first maintaining portion to a movement position to be moved by the movement portion when the predetermined length of the webbing is drawn out from the winding drum.

3. The seat belt retractor according to claim 2, wherein the changing portion of the movement member elastically deforms the arrangement member to thereby change the position of the arrangement member from the first maintaining portion to the movement position to be moved by the movement portion.

4. The seat belt retractor according to claim 2, wherein the changing portion of the movement member is elastically deformed by the arrangement member to thereby change the position of the arrangement member from the first maintaining portion to the movement position to be moved by the movement portion.

5. The seat belt retractor according to claim 1, wherein the movement portion of the movement member includes an inclined portion that inclines toward the second maintaining portion to thereby guide the arrangement member from the first position to the second position by rotation of the movement member.

6. The seat belt retractor according to claim 1, wherein the second maintaining portion of the movement member is formed in a circular-arc shape around an axis line of the winding drum as a center, and outward in a radial direction of the first maintaining portion.

7. The seat belt retractor according to claim 1, further comprising operation member urging means configured to urge the operation member toward the operation position.

8. The seat belt retractor according to claim 7, wherein the arrangement member urging means and the operation member urging means include one urging member mounted to the arrangement member and the operation member.

9. The seat belt retractor according to claim 1, further comprising a deceleration mechanism having multiple gears and operative to rotate the movement member at a decelerated speed, with respect to rotation of the winding drum.

10. The seat belt retractor according to claim 1, wherein the locking mechanism includes a ratchet wheel including a plurality of teeth capable of rotating together with the winding drum and a meshing pawl meshing only with the teeth of the ratchet wheel rotating in the drawing-out direction, and operates by meshing the teeth of the ratchet wheel with the meshing pawl; and
wherein the operation member, by its movement to the operation position, arranges the meshing pawl at a position where the meshing pawl is meshed with the teeth of the ratchet wheel, or by its movement to the non operation position, arranges the meshing pawl at a position where the meshing pawl is not meshed with the teeth of the ratchet wheel.

11. The seat belt retractor according to claim 10, further comprising a displacement mechanism to displace the meshing pawl along the teeth of the ratchet wheel rotating in the winding direction, in a state where the arrangement member is maintained at the second position.

12. The seat belt retractor according to claim 10, wherein the meshing pawl is formed on the operation member.

13. The seat belt retractor according to claim 1, further comprising rotation means to move the operation member and the arrangement member by rotation.

14. The seat belt retractor according to claim 13, wherein the rotation means includes one rotational shaft to which the operation member and the arrangement member are rotatably mounted.

15. The seat belt retractor according to claim 13, wherein the rotation means includes an operation member rotational shaft to which the operation member is rotatably mounted, and an arrangement member rotational shaft to which the arrangement member is rotatably mounted.

* * * * *